United States Patent [19]

Hitz et al.

[11] Patent Number: 5,819,292

[45] Date of Patent: Oct. 6, 1998

[54] METHOD FOR MAINTAINING CONSISTENT STATES OF A FILE SYSTEM AND FOR CREATING USER-ACCESSIBLE READ-ONLY COPIES OF A FILE SYSTEM

[75] Inventors: David Hitz, Sunnyvale; Michael Malcolm, Los Altos; James Lau, Cupertino; Byron Rakitzis, Mountain View, all of Calif.

[73] Assignee: Network Appliance, Inc., Santa Clara, Calif.

[21] Appl. No.: 454,921

[22] Filed: May 31, 1995

Related U.S. Application Data

[63] Continuation of Ser. No. 71,643, Jun. 3, 1993, abandoned.

[51] Int. Cl.[6] .................................................. G06F 17/30
[52] U.S. Cl. ............................................. 707/203; 707/205
[58] Field of Search ..................................... 395/621, 619

[56] References Cited

U.S. PATENT DOCUMENTS

| | | | |
|---|---|---|---|
| 4,075,691 | 2/1978 | Davis et al. | 395/884 |
| 4,156,907 | 5/1979 | Rawlings et al. | 395/200.01 |
| 4,333,144 | 6/1982 | Whiteside et al. | 395/672 |
| 4,377,843 | 3/1983 | Garringer et al. | 395/890 |
| 4,399,503 | 8/1983 | Hawley | 395/440 |
| 4,456,957 | 6/1984 | Schieltz | 395/824 |
| 4,459,664 | 7/1984 | Pottier et al. | 395/675 |
| 4,488,231 | 12/1984 | Yu et al. | 395/868 |
| 4,527,232 | 7/1985 | Bechtolsheim | 395/416 |
| 4,550,368 | 10/1985 | Bechtolsheim | 395/416 |
| 4,685,125 | 8/1987 | Zave | 379/96 |
| 4,710,868 | 12/1987 | Cocke et al. | 395/311 |
| 4,719,569 | 1/1988 | Ludemann et al. | 395/729 |
| 4,742,447 | 5/1988 | Duvall et al. | 364/200 |
| 4,761,785 | 8/1988 | Clark et al. | 371/51 |
| 4,766,534 | 8/1988 | DeBenedictis | 395/200.14 |
| 4,780,821 | 10/1988 | Crossley | 395/670 |

(List continued on next page.)

OTHER PUBLICATIONS

Bach, "The Design of the UNIX Operating System", Prentice–Hall, 1986, pp. 38–90 and 325–329, Jan. 1986.

Beach, Richard J., et al., "The Message is The Medium: Multiprocess Structuring of an Interactive Paint Program", Computer Graphics, vol. 16, No. 3, Jul. 1982, pp. 277–287.

Britton, Dianne E. et al., "A Interprocess Communication Facility for Distributed Applications", RCA Laboratories, David Sarnoff Research Center. Princeton, N.J., Copyright 1980 IEEE, Jan. 1980.

Carr, Robert et al., The Power of PenPoint, Ch 5, the Class Manager, Copyright 1991, Addison–Wesley, Jan. 1991.

Cashin, "Interprocess Communication", Bell–Northern Research, Document No. 8005014, Jan. 1980.

(List continued on next page.)

*Primary Examiner*—Paul R. Lintz
*Attorney, Agent, or Firm*—D'Alessandro & Ritchie

[57] ABSTRACT

A method is disclosed for maintaining consistent states of a file system. The file system progresses from one self-consistent state to another self-consistent state. The set of self-consistent blocks on disk that is rooted by a root inode is referred to as a consistency point. The root inode is stored in a file system information structure. To implement consistency points, new data is written to unallocated blocks on disk. A new consistency point occurs when the file system information structure is updated by writing a new root inode into it. Thus, as long as the root inode is not updated, the state of the file system represented on disk does not change. The method also creates snapshots that are user-accessible read-only copies of the file system. A snapshot uses no disk space when it is initially created. It is designed so that many different snapshots can be created for the same file system. Unlike prior art file systems that create a done by duplicating an entire inode file and all indirect blocks, the method of the present invention duplicates only the inode that describes the inode file. A multi-bit free-block map file is used to prevent data referenced by snapshots from being overwritten on disk.

20 Claims, 39 Drawing Sheets

U.S. PATENT DOCUMENTS

| | | | |
|---|---|---|---|
| 4,783,730 | 11/1988 | Fischer | 395/825 |
| 4,803,621 | 2/1989 | Kelly | 395/405 |
| 4,819,159 | 4/1989 | Shipley et al. | 395/182.17 |
| 4,825,354 | 4/1989 | Agrawal et al. | 395/610 |
| 4,875,159 | 10/1989 | Cary et al. | 364/200 |
| 4,887,204 | 12/1989 | Johnson et al. | 395/610 |
| 4,897,781 | 1/1990 | Chang et al. | 395/617 |
| 4,914,583 | 4/1990 | Weisshaar et al. | 395/600 |
| 5,043,871 | 8/1991 | Nishigaki et al. | 395/600 |
| 5,043,876 | 8/1991 | Terry | 395/600 |
| 5,134,619 | 7/1992 | Henson et al. | 371/40.1 |
| 5,155,835 | 10/1992 | Belsan | 395/425 |
| 5,163,131 | 11/1992 | Row et al. | 395/200 |
| 5,163,148 | 11/1992 | Walls | 395/600 |
| 5,195,100 | 3/1993 | Katz et al. | 371/66 |
| 5,218,695 | 6/1993 | Noveck et al. | 395/600 |
| 5,218,696 | 6/1993 | Baird et al. | 395/600 |
| 5,235,601 | 8/1993 | Stallmo et al. | 371/40.1 |
| 5,255,270 | 10/1993 | Yanai et al. | 371/10.2 |
| 5,274,799 | 12/1993 | Brant et al. | 395/575 |
| 5,274,807 | 12/1993 | Hoshen et al. | 395/650 |
| 5,276,840 | 1/1994 | Yu | 395/425 |
| 5,276,867 | 1/1994 | Kenley et al. | 395/600 |
| 5,305,326 | 4/1994 | Solomon et al. | 371/11.1 |
| 5,313,626 | 5/1994 | Jones et al. | 395/575 |
| 5,315,602 | 5/1994 | Noya et al. | 371/40.4 |
| 5,355,453 | 10/1994 | Row et al. | |
| 5,357,509 | 10/1994 | Ohizumi | 371/10.1 |
| 5,379,417 | 1/1995 | Lui et al. | 395/575 |

OTHER PUBLICATIONS

Chao, Chia et al., "MIME: A High Performance Storage Device With Strong Recovery Guarantees", Hewlett–Packard Co, Mar. 18, 1992.

Charlton, David, The Thoth System: Multiprocess Structuring and Portability, Ch2 Thoth Program Environment, and Ch 3: THoth Kernel Design, (1982, North–Holland), Jan. 1982.

Cohen, Jacques, Garbage Collection of Linked Data Structures < Department of Physics, Brandeis University, Waltham, Ma, Computing Surveys, vol. 13, No. 3, Sep. 1981.

Deitel, An Introduction to Operating Structures, Addison–Wesley, Jan. 1984, pp. 302–334.

de Jonge, Wiebrand et al., The Logical Disk, A New Approach to Inmproving File Systems, Jan. 1984, p. 1–14, unpublished.

English et al., Loge: A Self–Organizing Disk Controller, Software and Systems Laboratory, Jan. 1991 (Hewlett–Packard.

Anonymous, File Systems, Chapter 5, pp. 251–273, Jan. 1995.

Mulqueen, John T., Product Analysis Review, Communications Week, vol. 452, pp. 25, May 3, 1993.

Hitz et al., File System for an NFS File Server Appliance, Abstract only from INSPEC Abstravt # C9502–6120–020, Proceedings of the 1994 UNIX Winter Conference, 17–21 Jan. 1994.

Simpson, David, "'Appliances' Take Over File Server Role", Digital News and Review, vol. 11, No. 6, pp. 1–2, Mar. 21, 1994.

Chutani et al, "The Episode File System", USENIX— Winter 1992, pp. 43–60.

Tan, et al., "SOS—Stan's Own Server: A NFS File Server for the IBM PC," Computer Science Research Department, Information and Computing Sciences Division, Lawrence Berkeley Laboratory, Aug. 17, 1988.

Sandberg, "The Sun Network File System: Design, Implementation and Experience," Sun Microsystems, Inc. Technical Report, 1986.

Hitz, "A System Administrator's Performance Monitor for Tuning NFS Network Servers," Auspex Systems, Inc. Technical Report 7, May 1991.

Nelson, Benchmark Methodology and Preliminary Performance Specifications for the Auspect NS5000 Network Server, Auspex Systems, Inc. Technical Report 2, Oct. 1989.

Nelson, et al., "How and Why SCSI Is Better than IPI for NFS," Auspex Systems, Inc. Technical Report 6, 2nd edition, Jul. 1992.

Schröder, "PEACE: The Distributed SUPRENUM Operating System," Parallel Computing, vol. 7 (1988) pp. 325–333.

Malcolm, "A Process Abstraction and its Application," Proc. Eighth Manitoba Conference on Numerical Math and Computing, University of Manitoba at Winnipeg, 1978, pp. 33–50.

Nelson, et al., "The Myth of MIPS for I/O: An Overview of Functional Multiprocessing for NFS Network Servers," Auspex Systems, Inc., Technical Report 1, 6th edition, 2nd printing, Aug. 1992.

Cheriton, et al., "Thoth, a Portable Real–Time Operating System," Communications of the ACM, Feb. 1979, vol. 22, No. 2, pp. 102–115.

Cheriton, "Multi–Process Structuring and the Thoth Operating System," Ph.D. Thesis submitted to Department of Computer Science, University of British Columbia at Vancouver, 1979.

Chutani, Sailesh, et al., "The Episode File System", USENIX Winter Conference, Jan. 30–24, 1992.

Sun Microsystems, "Network Programming Guide", Chapter 4, Remote Procedure Call Programming Guide, Revision A of 27 Mar. 1990, pp. 65–128.

Osadzinski, Alex, "The Network File System (NFS)", 8202 Computer Standards & Interfaces, 8 (1988/89) No. 1, pp. 45–48, Amsterdam, The Netherlands.

Tannebaum, Andrew S., "Computer Networks" (1988), 2nd Edition, Prentice–Hall, pp. 35, 36, Chap. 9.

IEEE Computer, "I/O subsystem", Sep. 1988, pp. 23–25 and 106.

Carlson, et al., "HP AdvanceNet: A Growth–Oriented Computer Networking Architectural Strategy", Hewlett–Packard Journal (Oct. 1986), p. 2, pp. 6–10.

Tribby, David M., "Network Services for HP Real–Time Computers", Hewlett–Packard Journal (Oct. 1986), pp. 22–27.

Motorola, Inc., Microsystems Products Technical Data Sheet (1986), MicoMAP1–7, "MicroMAP MAnufacturing Automation Protocol Software".

Hammond, Richard A. *Expression with the Series/1 Distributed System*, Department of Electrical Engineering, U of Delaware, Newark, Delaware, © 1980 IEEE.

Hanson, Per Brinch (editor), brochure: *RC 400 Software Multiprogramming System*, Ch 4: Process Communication, A/s Regnecentralen, Copenhagen—Apr. 1969.

Hartman, John H., et al., *The Zebra Striped Network File System*.

Hitz, David, *Technical Report TR01: An NFS File Server Appliance*, Network Appliance Corporation.

Hitz, Dave et al., *Technical Report: 3002: File System Design for an NFS File Server Appliance*Network Appliance, Jan. 19, 1994.

Hitz, David, et al., *Using Unix as One Component of a Lightweight Distributed Kernel for Multiprocessor File Servers*, Auspex Technical Report 5, ©1990 Auspex Systems Inc.

Jones, Anita K., et al., *StarOS, a Multiprocessor Operating System for the Support of Task Forces*, Association for Computing Machinery, 1979, pp. 117–127.

Lantz, Keith A., et al., *Rochester's Intelligent Gateway*, Computer © 1982 IEEE.

Leffler, et al., *The Design and Implementation of the 4.3BSD UNIX Operating System*, Addison–Wesley, 1989, pp. 187–245.

Ousterhout, John, et al., *Beating the I/O Bottleneck: A Case for Log–Structured File Systems*, Oct. 30, 1988.

Patterson, David A., et al., A Case for Redundant Arrays of Inexpensive Disks (RAID), UC Berkeley.

Plum, Thomas, *Reliable Data Structures in C*, section 4.9: Pointers to Functions, © 1985 Plum Hall, Inc., pp. 4–23 to 4–27.

Rashid, Richard F. et al., *Accent: A communication oriented network operating system kernel*, Department of Computer Science, Carnegie–Mellon University, Pittsburgh, PA © 981.

Ritchie, D.M. *The UNIX System: A Stream Input–Output System*, AT&T Bell Laboratories Technical Journal, Oct. 1984, vol. 63, No. 8 Part 2, © 1984 AT&T.

Robertazzi, Thomas G., *Computer Networks and Systems: Queuing Theory and Performance Evaluation*, Ch 1: The Queuing Paradigm, © 1990 Springer–Verlag.

Row, John, *Lan Software Links Diverse Machines, OS's*, Mini–Micro Systems, Sep. 1965, pp. 141–146.

Row, John, et al., *Operating System Extensions Link Disparate Systems*, Computer Design, Jul. 1984, pp. 171–183.

Schwartz, Allan M., et al., *LFS—A Local File System for Multiprocessor NFS Network Servers*, Auspex Technical Report 4, © 1989 Auspex Systems, Inc.

Seltzer, Margo, et al., *An Implementation of a Log–Structured File System for UNIX, 1993 Winter UNIX*, San Diego, CA.

Seltzer, Margo, *File System Performance and Transaction Support*, 1992.

Sessions, Roger, *Class Construction in C and C++ Object Oriented Programming Fundamentals*, International Business Machines Corporation, section 4.4: Object Method Inflexibility, © 1992 Prentice–Hall, NJ.

Silberschatz, Abraham, et al., *Operating Concepts*, Ch 3.7: Interprocess Communication, pp. 127–147, © 1988 Addison–Wesley Publishing Company, Inc.

Sincoskie, W., David, et al., *The Series/1 Distributed Operating System: Description and Comments*, IEEE, 1980, pp. 579–584.

Stern, Hal, *Managing NFS and NIS*, NFS Daemons, © 1991 O'Reilly & Associates, Inc.

Tanenbaum, Andrew S., *Operating Systems Design and Implementation*, pp. 251–273.

Tweten, David, *Hiding Mass Storage Under Unix: NASA's MSS II Architecture*, IEEE, 1990, pp. 140–145.

Unix System Laboratories, Inc., *Unix System V Release 4 Programmer's Guide: STREAMS*, section 2: What is STREAMS?, AT & T Unix System Laboratories, Inc., Unix System V Release 4 Programmers's Guide: STREAMS. 1990 Prentice Hall.

UNIX International, *UI–Atlas Distributed Computing Architecture: A Technical Overview*, Oct. 1991.

*VRTX Versatile Real–Time Executive for the Microprocessors C: User's Guide*, Software Release 1, Document No. 541331001, Apr. 1987.

*VRTX32/68020 Versatile Real–Time Executive for the MC68020 Microprocessor: User's Guide*, Software Release 3, Document No. 592103003, Jan. 1987.

Walton, Robert L., *Rational for a Queueable Object Distributed Interprocess Communication System*, IEEE Transactions on Communications, vol. Com–30, No. 6, Jun. 1982, pp. 1417–1425.

Wood, B.J., et al., *A Local–Area Network Architecture Based on Message–Passing Operating System Concepts*, 7th Conference on Local Computer Networks, Miniapolis, MN, Oct. 1932.

Sun Microsystems, Inc., Sun OS5.0 Network Interfaces Programmer's Guide, p. 108, Jun. 1992.

FIG. 17D

| Block # | BIT 31 (CP-BIT) | | BIT 1 | BIT 0 (FS-BIT) | | 4 KB BLOCK 2324 |
|---|---|---|---|---|---|---|
| 2304 | 1 | ••• | 1 | 1 | 2324A | |
| 2306 | 1 | ••• | 1 | 1 | 2324B | |
| 2308 | 0 | ••• | 0 | 0 | 2324C | |
| 2310 | 1 | ••• | 1 | 1 | 2324D | |
| 2312 | 1 | ••• | 1 | 1 | 2324E | |
| 2314 | 1 | ••• | 1 | 0 | 2324F | |
| 2316 | 1 | ••• | 1 | 1 | 2324G | |
| 2318 | 1 | ••• | 1 | 1 | 2324H | |
| 2320 | 1 | ••• | 1 | 1 | 2324I | |
| 2322 | 0 | ••• | 0 | 0 | 2324J | |
| 2324 | 1 | ••• | 1 | 1 | 2324K | |
| 2326 | 0 | ••• | 0 | 0 | 2324L | |
| 2328 | 0 | ••• | 0 | 0 | 2324M | |

FIG. 17J

| BLOCK # | BIT 31 (CP-BIT) | | BIT 1 | BIT 0 (FS-BIT) | | 4 KB BLOCK 2326 |
|---|---|---|---|---|---|---|
| 2304 | 1 | ••• | 1 | 1 | 2326A | |
| 2306 | 0 | ••• | 1 | 0 | 2326B | |
| 2308 | 1 | ••• | 0 | 1 | 2326C | |
| 2310 | 1 | ••• | 1 | 1 | 2326D | |
| 2312 | 1 | ••• | 1 | 1 | 2326E | |
| 2314 | 0 | ••• | 1 | 0 | 2326F | |
| 2316 | 1 | ••• | 1 | 1 | 2326G | |
| 2318 | 1 | ••• | 1 | 1 | 2326H | |
| 2320 | 0 | ••• | 1 | 0 | 2326I | |
| 2322 | 1 | ••• | 0 | 1 | 2326J | |
| 2324 | 0 | ••• | 1 | 0 | 2326K | |
| 2326 | 1 | ••• | 0 | 1 | 2326L | |
| 2328 | | ••• | | | | |

METHOD FOR MAINTAINING CONSISTENT STATES OF A FILE SYSTEM AND FOR CREATING USER-ACCESSIBLE READ-ONLY COPIES OF A FILE SYSTEM

CROSS-REFERENCE TO RELATED APPLICATION

This is a file-wrapper continuation of patent application Ser. No. 08/071,643, filed Jun. 3, 1993, now abandoned.

BACKGROUND OF THE INVENTION

1. Field of the Invention

The present invention is related to the field of methods and apparatus for maintaining a consistent file system and for creating read-only copies of the file system.

2. Background Art

All file systems must maintain consistency in spite of system failure. A number of different consistency techniques have been used in the prior art for this purpose.

One of the most difficult and time consuming issues in managing any file server is making backups of file data. Traditional solutions have been to copy the data to tape or other off-line media. With some file systems, the file server must be taken off-line during the backup process in order to ensure that the backup is completely consistent. A recent advance in backup is the ability to quickly "clone" (i.e., a prior art method for creating a read-only copy of the file system on disk) a file system, and perform a backup from the clone instead of from the active file system. With this type of file system, it allows the file server to remain on-line during the backup.

File System Consistency

A prior art file system is disclosed by Chuntani et al. in an article entitled *The Episode File System,* USENIX, Winter 1992, at pages 43–59. The article describes the Episode file system which is a file system using meta-data (i.e., inode tables, directories, bitmaps, and indirect blocks). It can be used as a stand-alone or as a distributed file system. Episode supports a plurality of separate file system hierarchies. Episode refers to the plurality of file systems collectively as an "aggregate". In particular, Episode provides a clone of each file system for slowly changing data.

In Episode, each logical file system contains an "anode" table. An anode table is the equivalent of an inode table used in file systems such as the Berkeley Fast File System. It is a 252-byte structure. Anodes are used to store all user data as well as meta-data in the Episode file system. An anode describes the root directory of a file system including auxiliary files and directories. Each such file system in Episode is referred to as a "fileset". All data within a fileset is locatable by iterating through the anode table and processing each file in turn. Episode creates a read-only copy of a file system, herein referred to as a "clone", and shares data with the active file system using Copy-On-Write (COW) techniques.

Episode uses a logging technique to recover a file system (s) after a system crashes. Logging ensures that the file system meta-data are consistent. A bitmap table contains information about whether each block in the file system is allocated or not. Also, the bitmap table indicates whether or not each block is logged. All meta-data updates are recorded in a log "container" that stores a transaction log of the aggregate. The log is processed as a circular buffer of disk blocks. The transaction logging of Episode uses logging techniques originally developed for databases to ensure file system consistency. This technique uses carefully ordered writes and a recovery program that are supplemented by database techniques in the recovery program.

Other prior art systems including JFS of IBM and VxFS of Veritas Corporation use various forms of transaction logging to speed the recovery process, but still require a recovery process.

Another prior art method is called the "ordered write" technique. It writes all disk blocks in a carefully determined order so that damage is minimized when a system failure occurs while performing a series of related writes. The prior art attempts to ensure that inconsistencies that occur are harmless. For instance, a few unused blocks or inodes may be marked as allocated. The primary disadvantage of this technique is that the restrictions it places on disk order make it hard to achieve high performance.

Yet another prior art system is an elaboration of the second prior art method referred to as an "ordered write with recovery" technique. In this method, inconsistencies can be potentially harmful. However, the order of writes is restricted so that inconsistencies can be found and fixed by a recovery program. Examples of this method include the original UNIX file system and Berkeley Fast File System (FFS). This technique does not reduce disk ordering sufficiently to eliminate the performance penalty of disk ordering. Another disadvantage is that the recovery process is time consuming. It typically is proportional to the size of the file system. Therefore, for example, recovering a 5 gigabyte FFS file system requires an hour or more to perform.

File System Clones

FIG. 1 is a prior art diagram for the Episode file system illustrating the use of copy-on-write (COW) techniques for creating a fileset clone. Anode 110 comprises a first pointer 110A having a COW bit that is set. Pointer 110A references data block 114 directly. Anode 110 comprises a second pointer 110B having a COW bit that is cleared. Pointer 110B of anode references indirect block 112. Indirect block 112 comprises a pointer 112A that references data block 124 directly. The COW bit of pointer 112A is set. Indirect block 112 comprises a second pointer 112B that references data block 126. The COW bit of pointer 112B is cleared.

A clone anode 120 comprises a first pointer 120A that references data block 114. The COW bit of pointer 120A is cleared. The second pointer 120B of clone anode 120 references indirect block 122. The COW bit of pointer 120B is cleared. In turn, indirect block 122 comprises a pointer 122A that references data block 124. The COW bit of pointer 122A is cleared.

As illustrated in FIG. 1, every direct pointer 110A, 112A–112B, 120A, and 122A and indirect pointer 110B and 120B in the Episode file system contains a COW bit. Blocks that have not been modified since the clone was created are contained in both the active file system and the clone, and have set (1) COW bits. The COW bit is cleared (0) when a block that is referenced to by the pointer has been modified and, therefore, is part of the active file system but not the done.

When a clone is created in Episode, the entire anode table is copied, along with all indirect blocks that the anodes reference. The new copy describes the clone, and the original copy continues to describe the active file system. In the original copy, the COW bits in all pointers are set to indicate that they point to the same data blocks as the clone. Thus, when anode 110 in FIG. 1 was cloned, it was copied to clone anode 120, and indirect block 112 was copied to done indirect block 122. In addition, the COW bit of pointer 112A was set to indicate that indirect blocks 112 and 122 both point to data block 124. In FIG. 1, data block 124 has not been modified since the clone was created, so it is still referenced by pointers 112A and 112B, and the COW bit in 112A is still set. Data block 126 is not part of the done, and so pointer 112B which references it does not have its COW bit set.

When an Episode clone is created, every anode and every indirect block in the file system must be copied, which consumes many mega-bytes and takes a significant mount of time to write to disk.

A fileset "clone" is a read-only copy of an active fileset wherein the active fileset is readable and writable. Clones are implemented using COW techniques, and share data blocks with an active fileset on a block-by-block basis. Episode implements cloning by copying each anode stored in a fileset. When initially cloned, both the writable anode of the active fileset and the cloned anode both point to the same data block(s). However, the disk addresses for direct and indirect blocks in the original anode are tagged as COW. Thus, an update to the writable fileset does not affect the done. When a COW block is modified, a new block is allocated in the file system and updated with the modification. The COW flag in the pointer to this new block is cleared.

The prior art Episode system creates clones that duplicate the entire inode file and all of the indirect blocks in the file system. Episode duplicates all inodes and indirect blocks so that it can set a Copy-On-Write (COW) bit in all pointers to blocks that are used by both the active file system and the clone. In Episode, it is important to identify these blocks so that new data written to the active file system does not overwrite "old" data that is part of the done and, therefore, must not change.

Creating a clone in the prior art can use up as much as 32 MB on a 1 GB disk. The prior art requires 256 MB of disk space on a 1 GB disk (for 4 KB blocks) to keep eight clones of the file system. Thus, the prior art cannot use large numbers of clones to prevent loss of data. Instead it is used to facilitate backup of the file system onto an auxiliary storage means other than the disk drive, such as a tape backup device. Clones are used to backup a file system in a consistent state at the instant the clone is made. By cloning the file system, the done can be backed up to the auxiliary storage means without shutting down the active file system, and thereby preventing users from using the file system. Thus, clones allow users to continue accessing an active file system while the file system, in a consistent state is backed up. Then the clone is deleted once the backup is completed. Episode is not capable of supporting multiple clones since each pointer has only one COW bit. A single COW bit is not able to distinguish more than one clone. For more than one clone, there is no second COW bit that can be set.

A disadvantage of the prior art system for creating file system clones is that it involves duplicating all of the inodes and all of the indirect blocks in the file system. For a system with many small files, the inodes alone can consume a significant percentage of the total disk space in a file system. For example, a 1 GB file system that is filled with 4 KB files has 32 MB of inodes. Thus, creating an Episode done consumes a significant amount of disk space, and generates large amounts (i.e., many megabytes) of disk traffic. As a result of these conditions, creating a clone of a file system takes a significant amount of time to complete.

Another disadvantage of the prior art system is that it makes it difficult to create multiple clones of the same file system. The result of this is that clones tend to be used, one at a time, for short term operations such as backing up the file system to tape, and are then deleted.

SUMMARY OF THE INVENTION

The present invention provides a method for maintaining a file system in a consistent state and for creating read-only copies of a file system. Changes to the file system are tightly controlled to maintain the file system in a consistent state. The file system progresses from one self-consistent state to another self-consistent state. The set of self-consistent blocks on disk that is rooted by the root inode is referred to as a consistency point (CP). To implement consistency points, WAFL always writes new data to unallocated blocks on disk. It never overwrites existing data. A new consistency point occurs when the fsinfo block is updated by writing a new root inode for the inode file into it. Thus, as long as the root inode is not updated, the state of the file system represented on disk does not change.

The present invention also creates snapshots, which are virtual read-only copies of the file system. A snapshot uses no disk space when it is initially created. It is designed so that many different snapshots can be created for the same file system. Unlike prior art file systems that create a clone by duplicating the entire inode file and all of the indirect blocks, the present invention duplicates only the inode that describes the inode file. Thus, the actual disk space required for a snapshot is only the 128 bytes used to store the duplicated inode. The 128 bytes of the present invention required for a snapshot is significantly less than the many megabytes used for a clone in the prior art.

The present invention prevents new data written to the active file system from overwriting "old" data that is part of a snapshot(s). It is necessary that old data not be overwritten as long as it is part of a snapshot. This is accomplished by using a multi-bit free-block map. Most prior art file systems use a free block map having a single bit per block to indicate whether or not a block is allocated. The present invention uses a block map having 32-bit entries. A first bit indicates whether a block is used by the active file system, and 20 remaining bits are used for up to 20 snapshots, however, some bits of the 31 bits may be used for other purposes.

BRIEF DESCRIPTION OF THE DRAWINGS

FIGS. 17A, 17B, 17C, 17D, 17E, 17F, 17G, 17H, 17I, 17J, 17K and 17L are diagrams illustrating the generation of a consistency point.

DETAILED DESCRIPTION OF THE PRESENT INVENTION

A system for creating read-only copies of a file system is described. In the following description, numerous specific details, such as number and nature of disks, disk block sizes, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

WRITE ANYWHERE FILE-SYSTEM LAYOUT

The present invention uses a Write Anywhere File-system Layout (WAFL). This disk format system is block based (i.e., 4 KB blocks that have no fragments), uses inodes to describe its files, and includes directories that are simply specially formatted files. WAFL uses files to store meta-data that describes the layout of the file system. WAFL meta-data files include: an inode file, a block map (blkmap) file, and an inode map (inomap) file. The inode file contains the inode table for the file system. The blkmap file indicates which disk blocks are allocated. The inomap file indicates which inodes are allocated. On-disk and incore WAFL inode distinctions are discussed below.

On-Disk WAFL Inodes

Figure 3:
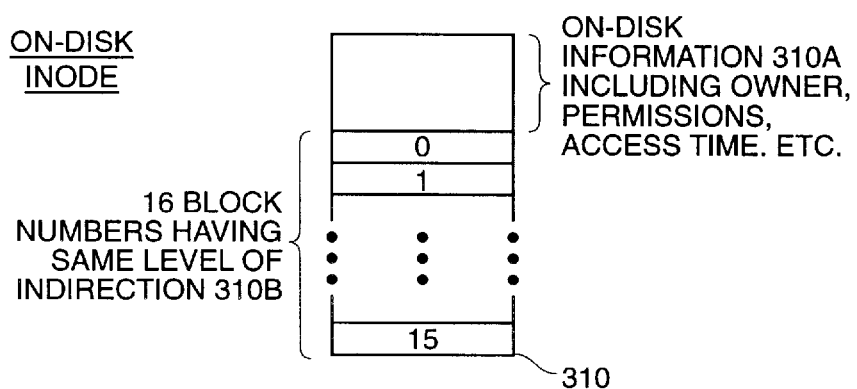
FIG. 3 is a diagram illustrating an on-disk inode of WAFL.

WAFL inodes are distinct from prior art inodes. Each on-disk WAFL inode points to 16 blocks having the same level of indirection. A block number is 4-bytes long. Use of block numbers having the same level of indirection in an inode better facilitates recursive processing of a file. FIG. 3 is a block diagram illustrating an on-disk inode 310. The on-disk inode 310 is comprised of standard inode information 310A and 16 block number entries 310B having the same level of indirection. The inode information 310A comprises information about the owner of a file, permissions, file size, access time, etc. that are well-known to a person skilled in the art. On-disk inode 310 is unlike prior art inodes that comprise a plurality of block numbers having different levels of indirection. Keeping all block number entries 310B in an inode 310 at the same level of indirection simplifies file system implementation.

Figure 4A:
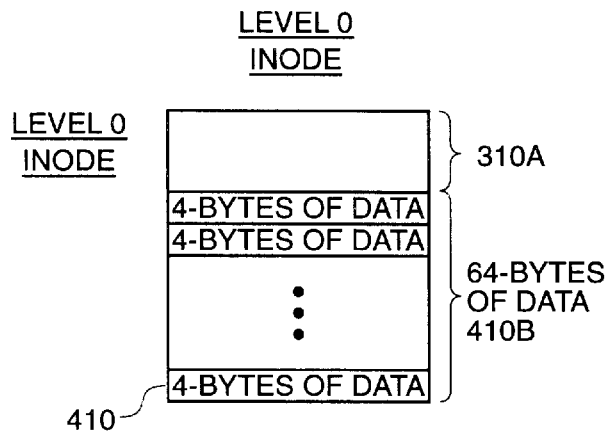
FIGS. 4A, 4B, 4C and 4D are diagrams illustrating on-disk inodes of WAFL having different levels of indirection.

For a small file having a size of 64 bytes or less, data is stored directly in the inode itself instead of the 16 block numbers. FIG. 4A is a diagram illustrating a Level 0 inode 410 that is similar to inode 310 shown in FIG. 3. However, inode 410 comprises 64-bytes of data 410B instead of 16 block numbers 310B. Therefore, disk blocks do not need to be allocated for very small files.

Figure 4B:
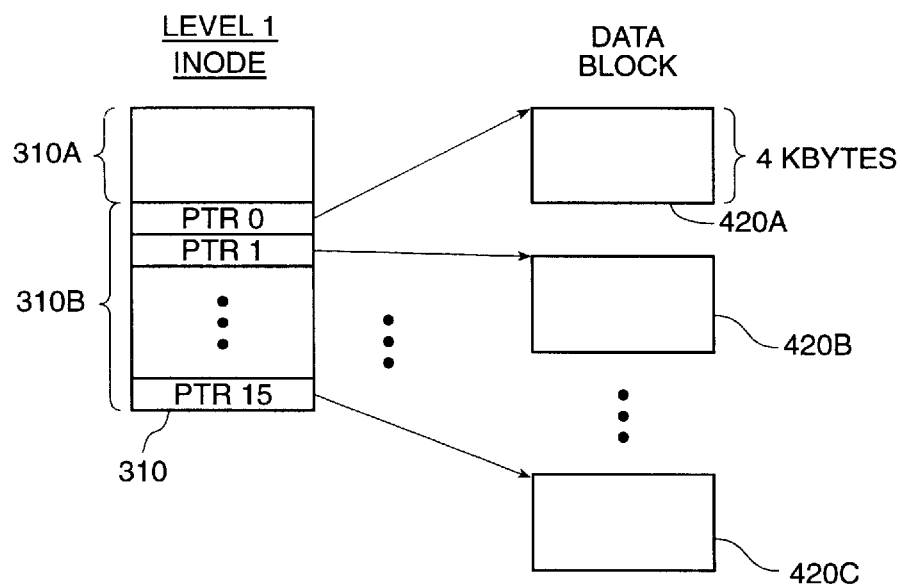

For a file having a size of less than 64 KB, each of the 16 block numbers directly references a 4 KB data block. FIG. 4B is a diagram illustrating a Level 1 inode 310 comprising 16 block numbers 310B. The block number entries 0–15 point to corresponding 4 KB data blocks 420A–420C.

Figure 4C:
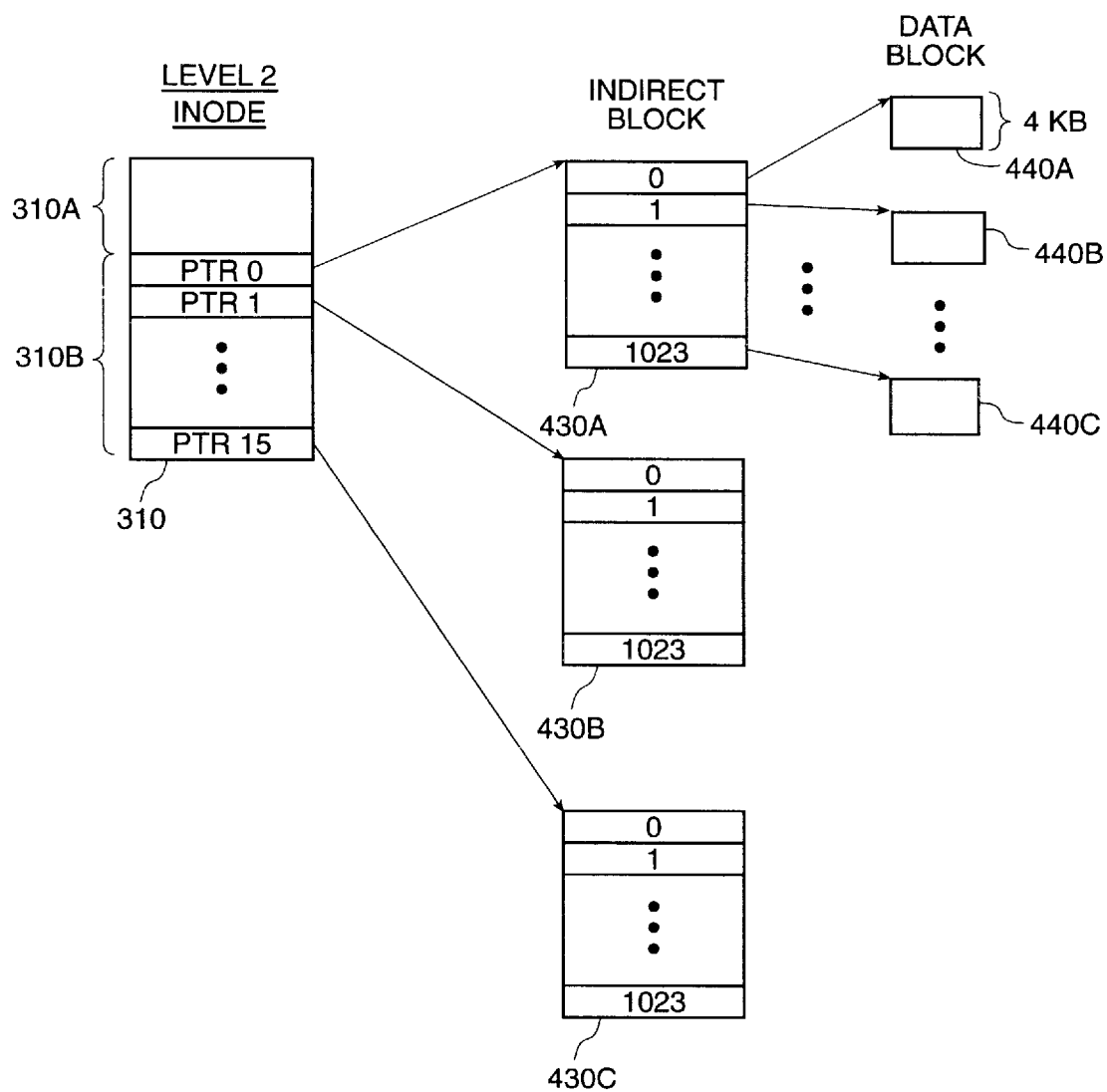

For a file having a size that is greater than or equal to 64 KB and is less than 64 MB, each of the 16 block numbers references a single-indirect block. In turn, each 4 KB single-indirect block comprises 1024 block numbers that reference 4 KB data blocks. FIG. 4C is a diagram illustrating a Level 2 inode 310 comprising 16 block numbers 310B that reference 16 single-indirect blocks 430A–430C. As shown in FIG. 4C, block number entry 0 points to single-indirect block 430A. Single-indirect block 430A comprises 1024 block numbers that reference 4 KB data blocks 440A–440C. Similarly, single-indirect blocks 430B–430C can each address up to 1024 data blocks.

Figure 4D:
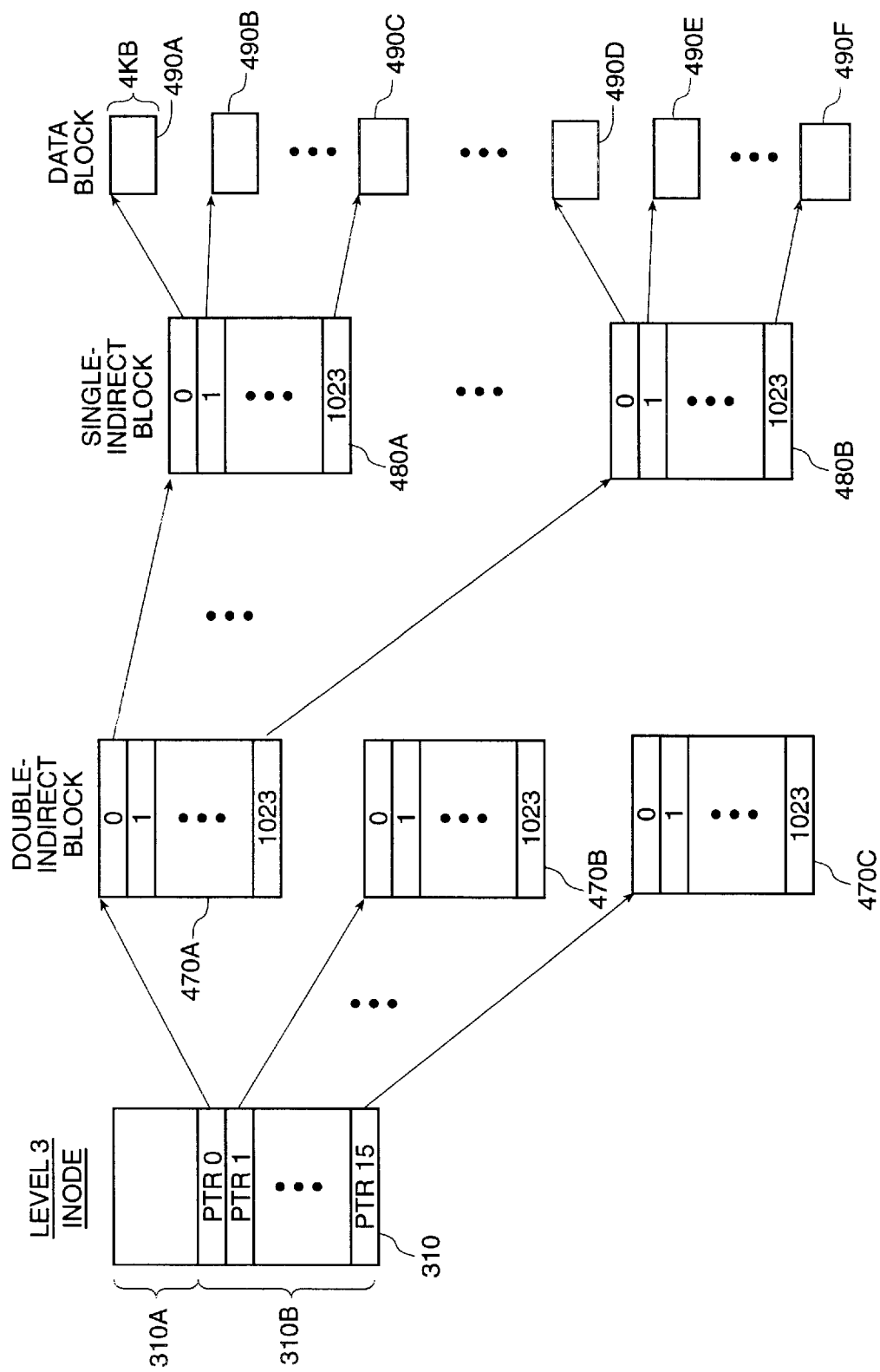

For a file size greater than 64 MB, the 16 block numbers of the inode reference double-indirect blocks. Each 4 KB double-indirect block comprises 1024 block numbers pointing to corresponding single-indirect blocks. In turn, each single-indirect block comprises 1024 block numbers that point to 4 KB data blocks. Thus, up to 64 GB can be addressed. FIG. 4D is a diagram illustrating a Level 3 inode 310 comprising 16 block numbers 310B wherein block number entries 0, 1, and 15 reference double-indirect blocks 470A, 470B, and 470C, respectively. Double-indirect block 470A comprises 1024 block number entries 0–1023 that point to 1024 single-indirect blocks 480A–480B. Each single-indirect block 480A–480B, in turn, references 1024 data blocks. As shown in FIG. 4D, single-indirect block 480A references 1024 data blocks 490A–490C and single-indirect block 480B references 1024 data blocks 490C–490F.

Incore WAFL Inodes

Figure 8:
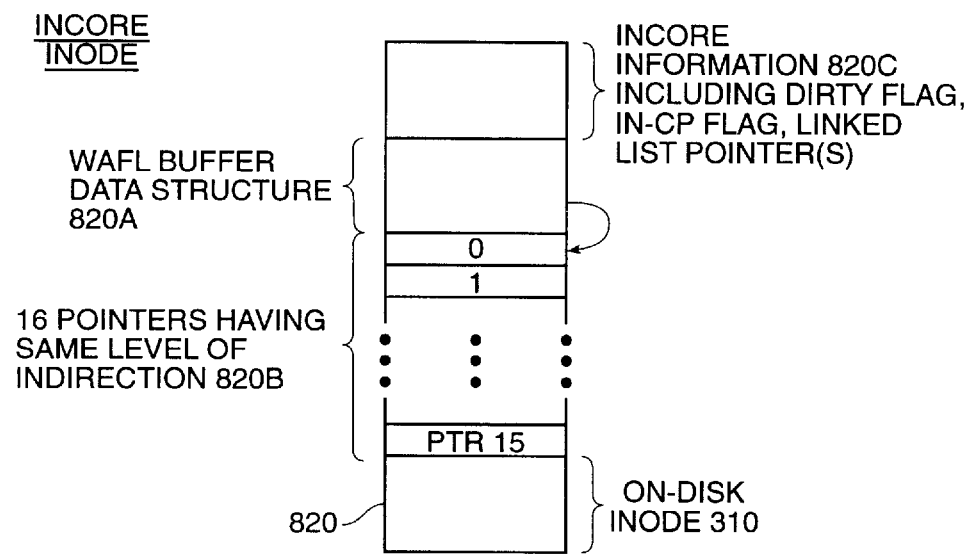
FIG. 8 is a diagram illustrating an incore inode of WAFL according to the present invention.

FIG. 8 is a block diagram illustrating an incore WAFL inode 820. The incore inode 820 comprises the information of on-disk inode 310 (shown in FIG. 3), a WAFL buffer data structure 820A, and 16 buffer pointers 820B. A WAFL incore inode has a size of 300 bytes. A WAFL buffer is an incore (in memory) 4 KB equivalent of the 4 KB blocks that are stored on disk. Each incore WAFL inode 820 points to 16 buffers having the same levels of indirection. A buffer pointer is 4-bytes long. Keeping all buffer pointers 820B in an inode 820 at the same level of indirection simplifies file system implementation. Incore inode 820 also contains incore information 820C comprising a dirty flag, an in-consistency point (IN_CP) flag, and pointers for a linked list. The dirty flag indicates that the inode itself has been modified or that it references buffers that have changed. The IN_CP flag is used to mark an inode as being in a consistency point (described below). The pointers for a linked list are described below.

Figure 10:
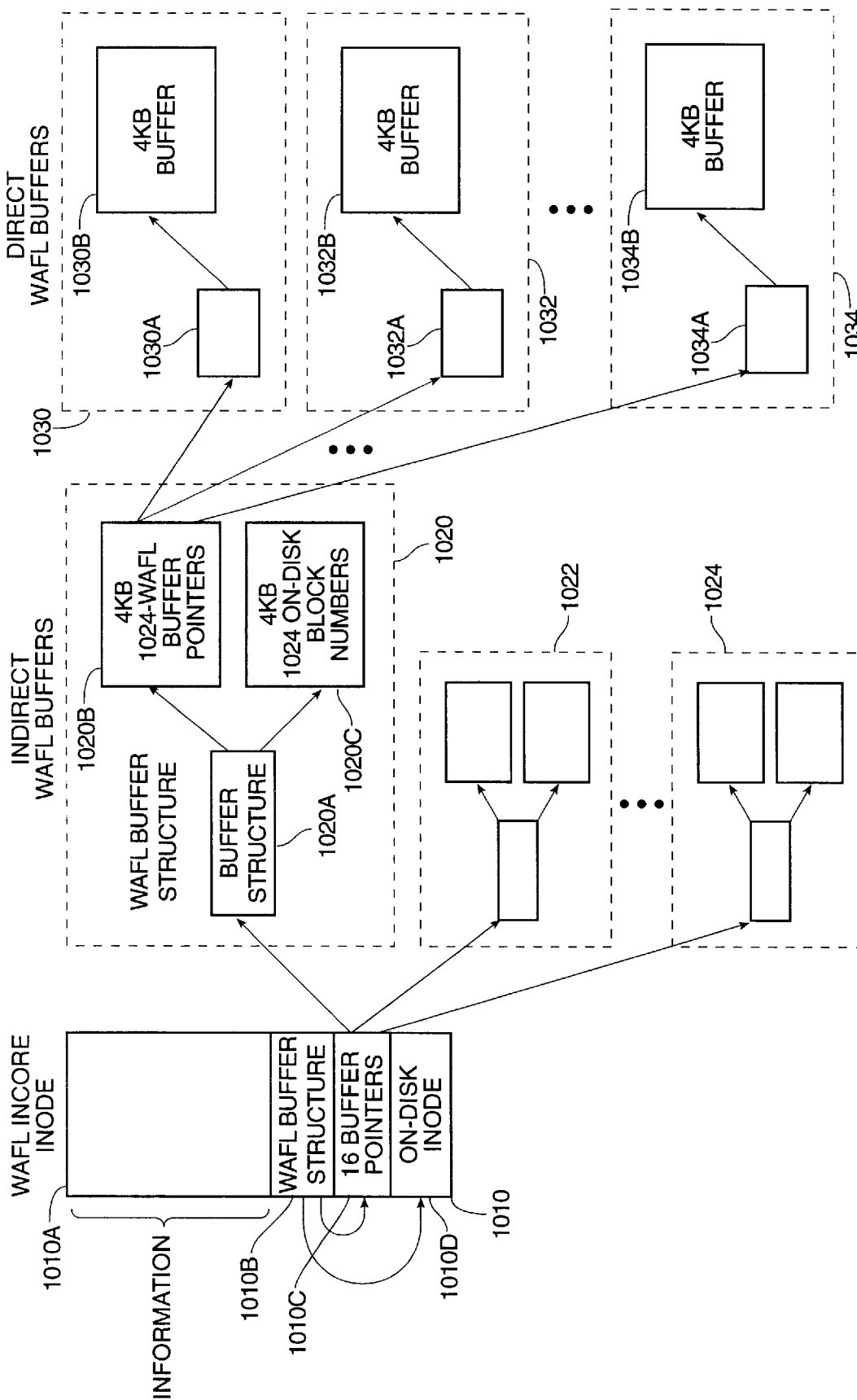
FIG. 10 is a diagram illustrating an incore inode 1020 for a file.

FIG. 10 is a diagram illustrating a file referenced by a WAFL inode 1010. The file comprises indirect WAFL buffers 1020–1024 and direct WAFL buffers 1030–1034. The WAFL in-core inode 1010 comprises standard inode information 1010A (including a count of dirty buffers), a WAFL buffer data structure 1010B, 16 buffer pointers 1010C and a standard on-disk inode 1010D. The incore WAFL inode 1010 has a size of approximately 300 bytes. The on-disk inode is 128 bytes in size. The WAFL buffer data structure 1010B comprises two pointers where the first one references the 16 buffer pointers 1010C and the second references the on-disk block numbers 1010D.

Each inode 1010 has a count of dirty buffers that it references. An inode 1010 can be put in the list of dirty inodes and/or the list of inodes that have dirty buffers. When all dirty buffers referenced by an inode are either scheduled to be written to disk or are written to disk, the count of dirty buffers of inode 1010 is set to zero. The inode 1010 is then requeued according to its flag (i.e., no dirty buffers). This inode 1010 is cleared before the next inode is processed. Further the flag of the inode indicating that it is in a consistency point is cleared. The inode 1010 itself is written to disk in a consistency point.

The WAFL buffer structure is illustrated by indirect WAFL buffer 1020. WAFL buffer 1020 comprises a WAFL buffer data structure 1020A, a 4 KB buffer 1020B comprising 1024 WAFL buffer pointers and a 4 KB buffer 1020C comprising 1024 on-disk block numbers. The WAFL buffer data structure is 56 bytes in size and comprises 2 pointers. One pointer of WAFL buffer data structure 1020A references 4 KB buffer 1020B and a second pointer references buffer 1020C. In FIG. 10, the 16 buffer pointers 1010C of WAFL inode 1010 point to the 16 single-indirect WAFL buffers 1020–1024. In turn, WAFL buffer 1020 references 1024 direct WAFL buffer structures 1030–1034. WAFL buffer 1030 is representative of direct WAFL buffers.

Direct WAFL buffer 1030 comprises WAFL buffer data structure 1030A and a 4 KB direct buffer 1030B containing a cached version of a corresponding on-disk 4 KB data block. Direct WAFL buffer 1030 does not comprise a 4 KB buffer such as buffer 1020C of indirect WAFL buffer 1020. The second buffer pointer of WAFL buffer data structure 1030A is zeroed, and therefore does not point to a second 4 KB buffer. This prevents inefficient use of memory because memory space would be assigned for an unused buffer otherwise.

In the WAFL file system as shown in FIG. 10, a WAFL in-core inode structure 1010 references a tree of WAFL buffer structures 1020–1024 and 1030–1034. It is similar to a tree of blocks on disk referenced by standard inodes comprising block numbers that point to indirect and/or direct blocks. Thus, WAFL inode 1010 contains not only the on-disk inode 1010D comprising 16 volume block numbers, but also comprises 16 buffer pointers 1010C pointing to WAFL buffer structures 1020–1024 and 1030–1034. WAFL buffers 1030–1034 contain cached contents of blocks referenced by volume block numbers.

The WAFL incore inode 1010 contains 16 buffer pointers 1010C. In turn, the 16 buffer pointers 1010C are referenced by a WAFL buffer structure 1010B that roots the tree of WAFL buffers 1020–1024 and 1030–1034. Thus, each WAFL inode 1010 contains a WAFL buffer structure 1010B that points to the 16 buffer pointers 1010C in the inode 1010. This facilitates algorithms for handling trees of buffers that are implemented recursively. If the 16 buffer pointers 1010C in the inode 1010 were not represented by a WAFL buffer structure 1010B, the recursive algorithms for operating on an entire tree of buffers 1020–1024 and 1030–1034 would be difficult to implement.

Figure 9A:
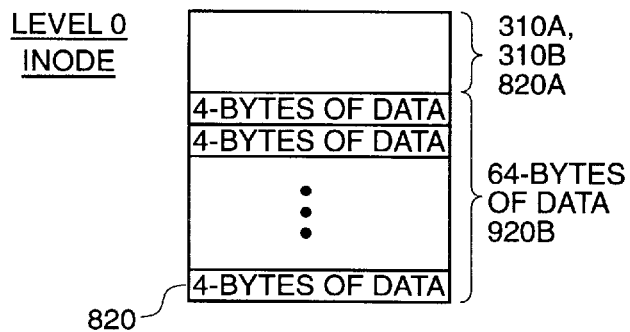
FIGS. 9A, 9B, 9C, 9D are diagrams illustrating incore inodes of WAFL having different levels of indirection according to the present invention.

FIGS. 9A–9D are diagrams illustrating inodes having different levels of indirection. In FIGS. 9A–9D, simplified indirect and direct WAFL buffers are illustrated to show indirection. However, it should be understood that the WAFL buffers of FIG. 9 represent corresponding indirect and direct buffers of FIG. 10. For a small file having a size of 64 bytes or less, data is stored directly in the inode itself instead of the 16 buffer pointers. FIG. 9A is a diagram illustrating a Level 0 inode 820 that is the same as inode 820 shown in FIG. 8 except that inode 820 comprises 64-bytes of data 920B instead of 16 buffer pointers 820B. Therefore, additional buffers are not allocated for very small files.

Figure 9B:
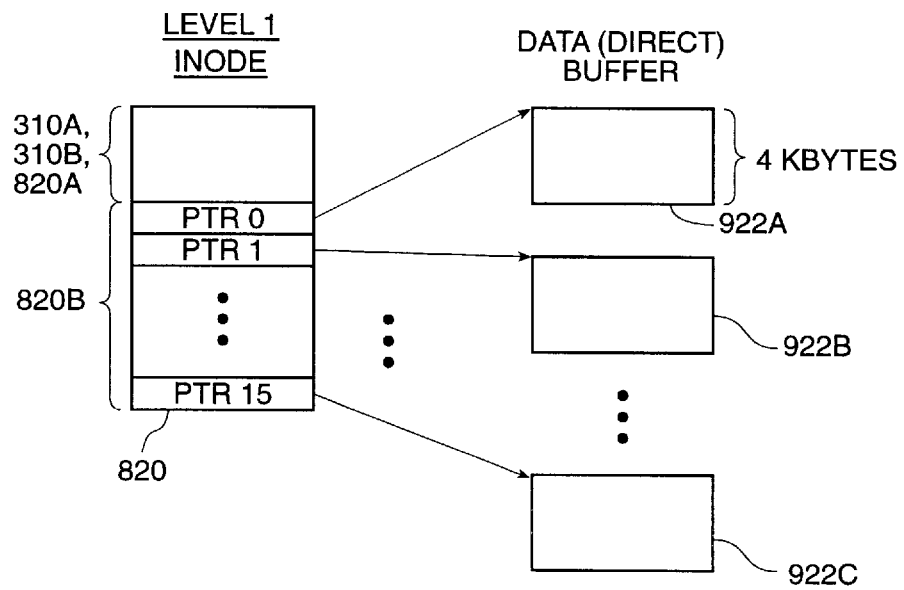

For a file having a size of less than 64 KB, each of the 16 buffer pointers directly references a 4 KB direct WAFL buffer. FIG. 9B is a diagram illustrating a Level 1 inode 820 comprising 16 buffer pointers 820B. The buffer pointers PTR0–PTR15 point to corresponding 4 KB direct WAFL buffers 922A–922C.

Figure 9C:
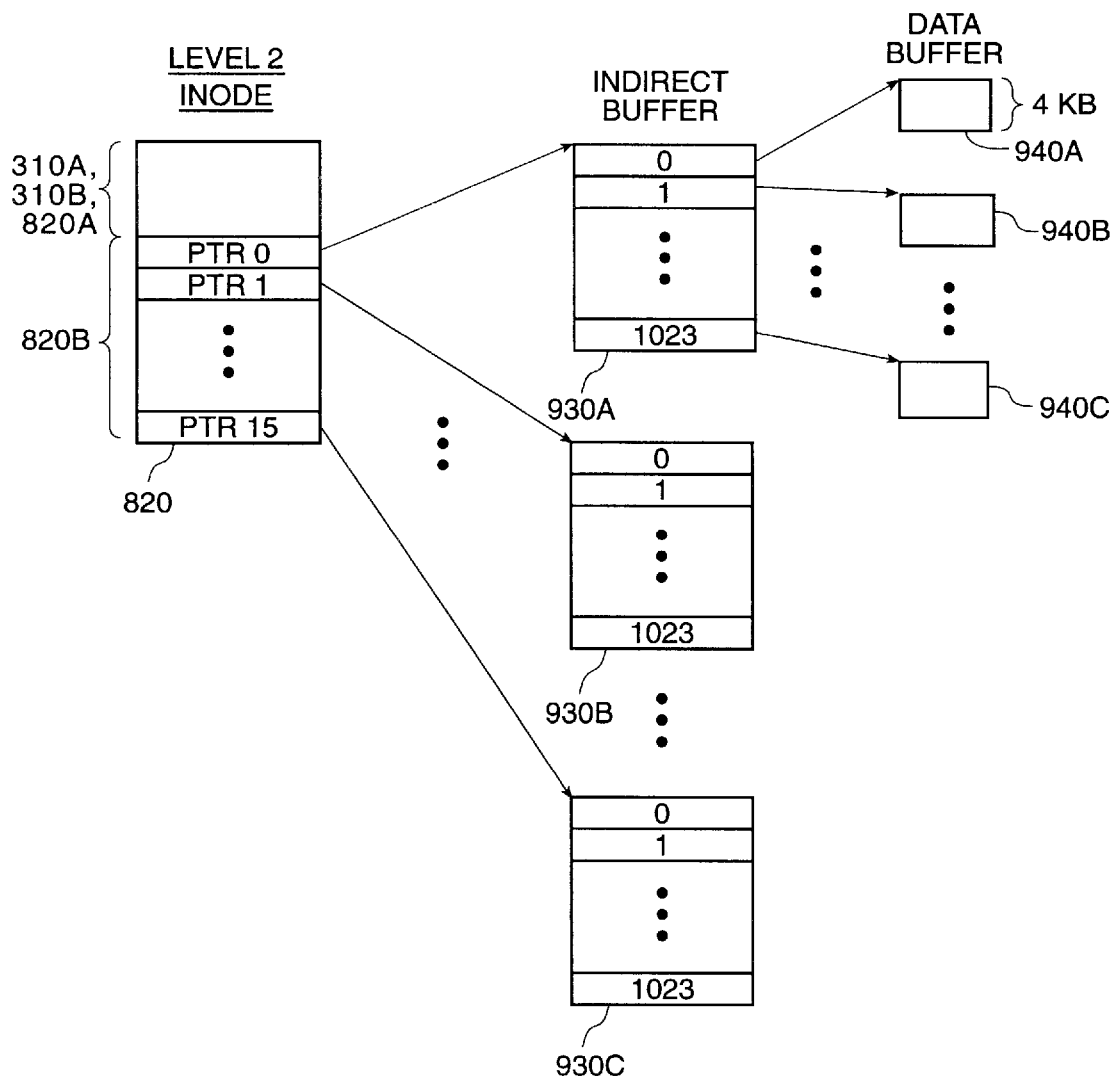

For a file having a size that is greater than or equal to 64 KB and is less than 64 MB, each of the 16 buffer pointers references a single-indirect WAFL buffer. In turn, each 4 KB single-indirect WAFL buffer comprises 1024 buffer pointers that reference 4 KB direct WAFL buffers. FIG. 9C is a diagram illustrating a Level 2 inode 820 comprising 16 buffer pointers 820B that reference 16 single-indirect WAFL buffers 930A–930C. As shown in FIG. 9C, buffer pointer PTR0 points to single-indirect WAFL buffer 930A. Single-indirect WAFL buffer 930A comprises 1024 pointers that reference 4 KB direct WAFL buffers 940A–940C. Similarly, single-indirect WAFL buffers 930B–930C can each address up to 1024 direct WAFL buffers.

Figure 9D:
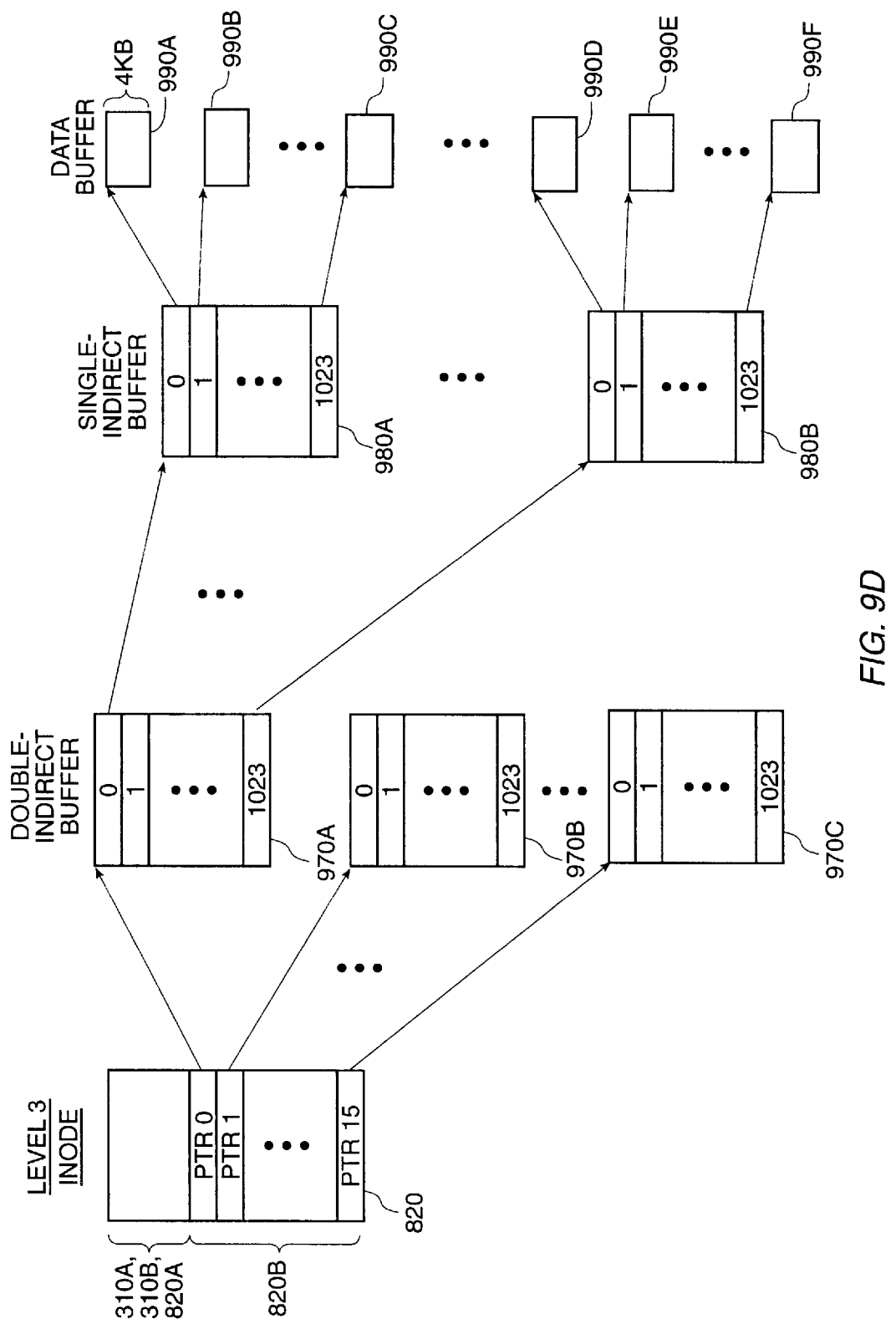

For a file size greater than 64 MB, the 16 buffer pointers of the inode reference double-indirect WAFL buffers. Each 4 KB double-indirect WAFL buffer comprises 1024 pointers pointing to corresponding single-indirect WAFL buffers. In turn, each single-indirect WAFL buffer comprises 1024 pointers that point to 4 KB direct WAFL buffers. Thus, up to 64 GB can be addressed. FIG. 9D is a diagram illustrating a Level 3 inode 820 comprising 16 pointers 820B wherein pointers PTR0, PTR1, and PTR15 reference double-indirect WAFL buffers 970A, 970B, and 970C, respectively. Double-indirect WAFL buffer 970A comprises 1024 pointers that point to 1024 single-indirect WAFL buffers 980A–980B. Each single-indirect WAFL buffer 980A–980B, in turn, references 1024 direct WAFL buffers. As shown in FIG. 9D, single-indirect WAFL buffer 980A references 1024 direct WAFL buffers 990A–990C and single-indirect WAFL buffer 980B references 1024 direct WAFL buffers 990D–990F.

Directories

Figure 14:
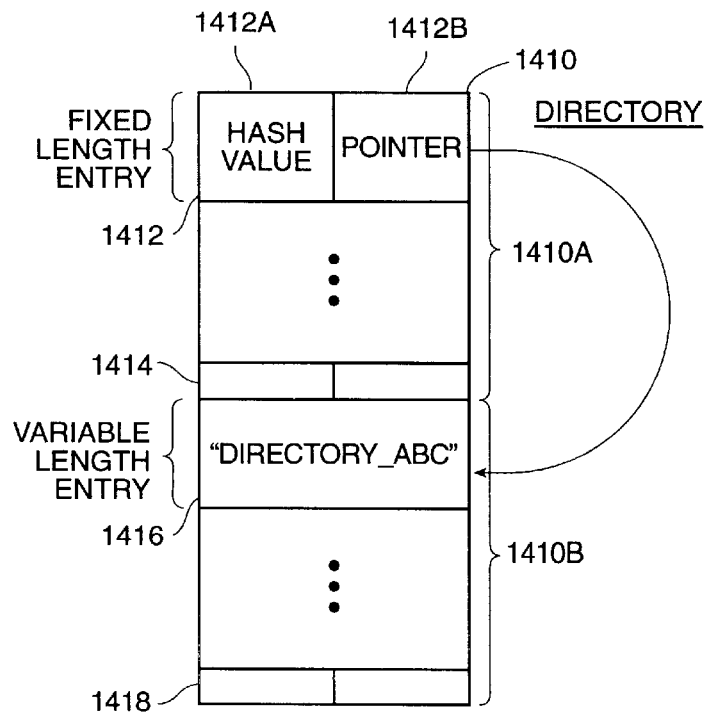
FIG. 14 is a diagram illustrating a directory according to the present invention.

Directories in the WAFL system are stored in 4 KB blocks that are divided into two sections. FIG. 14 is a diagram illustrating a directory block 1410 according to the present invention. Each directory block 1410 comprises a first section 1410A comprising fixed length directory entry structures 1412–1414 and a second section 1410B containing the actual directory names 1416–1418. Each directory entry also contains a file id and a generation. This information identifies what file the entry references. This information is well-known in the art, and therefore is not illustrated in FIG.

14. Each entry 1412–1414 in the first section 1410A of the directory block has a pointer to its name in the second section 1410B. Further, each entry 1412–1414 includes a hash value dependent upon its name in the second section 1410B so that the name is examined only when a hash hit (a hash match) occurs. For example, entry 1412 of the first section 1410A comprises a hash value 1412A and a pointer 1412B. The hash value 1412A is a value dependent upon the directory name "DIRECTORY_ABC" stored in variable length entry 1416 of the second section 1410B. Pointer 1412B of entry 1410 points to the variable length entry 1416 of second section 1410B. Using fixed length directory entries 1412–1414 in the first section 1410A speeds up the process of name lookup. A calculation is not required to find the next entry in a directory block 1410. Further, keeping entries 1412–1414 in the first section small 1410A improves the hit rate for file systems with a line-fill data cache.

Meta-Data

WAFL keeps information that describes a file system in files known as meta-data. Meta-data comprises an inode file, inomap file, and a blkmap file. WAFL stores its meta-data in files that may be written anywhere on a disk. Because all WAFL meta-data is kept in files, it can be written to any location just like any other file in the file system.

Figure 12:
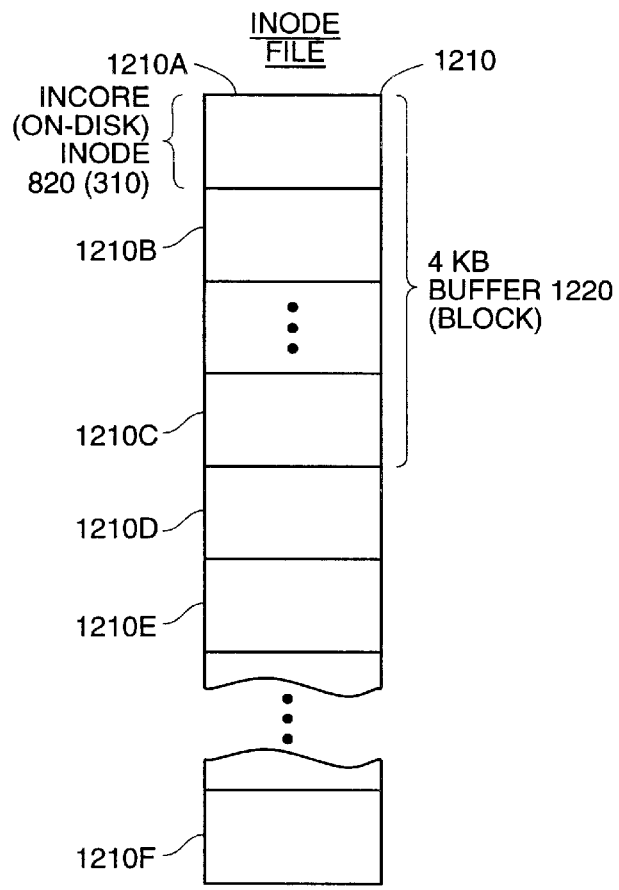
FIG. 12 is a diagram illustrating an inode file according to the present invention.

A first meta-data file is the "inode file" that contains inodes describing all other files in the file system. FIG. 12 is a diagram illustrating an inode file 1210. The inode file 1210 may be written anywhere on a disk unlike prior art systems that write "inode tables" to a fixed location on disk. The inode file 1210 contains an inode 1210A–1210F for each file in the file system except for the inode file 1210 itself. The inode file 1210 is pointed to by an inode referred to as the "root inode". The root inode is kept in a fixed location on disk referred to as the file system information (fsinfo) block described below. The inode file 1210 itself is stored in 4 KB blocks on disk (or 4 KB buffers in memory). FIG. 12 illustrates that inodes 1210A–1210C are stored in a 4 KB buffer 1220. For on-disk inode sizes of 128 bytes, a 4 KB buffer (or block) comprises 32 inodes. The incore inode file 1210 is composed of WAFL buffers 1220. When an incore inode (i.e., 820) is loaded, the on-disk inode part of the incore inode 820 is copied from the buffer 1220 of the inode file 1210. The buffer data itself is loaded from disk. Writing data to disk is done in the reverse order. The incore inode 820, which contains a copy of the ondisk mode, is copied to the corresponding buffer 1220 of the inode file 1210. Then, the inode file 1210 is write-allocated, and the data stored in the buffer 1220 of the inode file 1210 is written to disk.

Figure 11A:
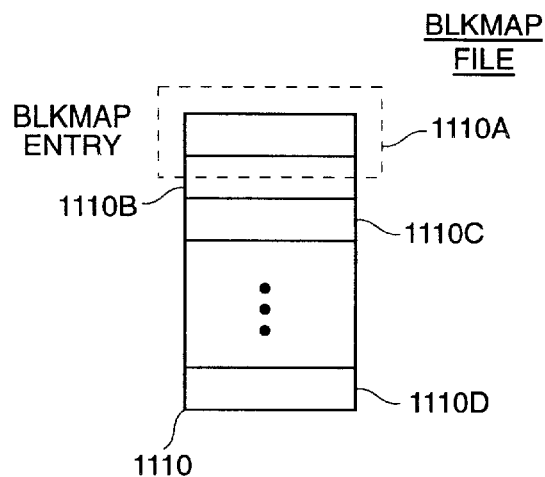
FIGS. 11A, 11B, 11C and 11D are diagrams illustrating a block map (blkmap) file according to the present invention.
Figure 11B:
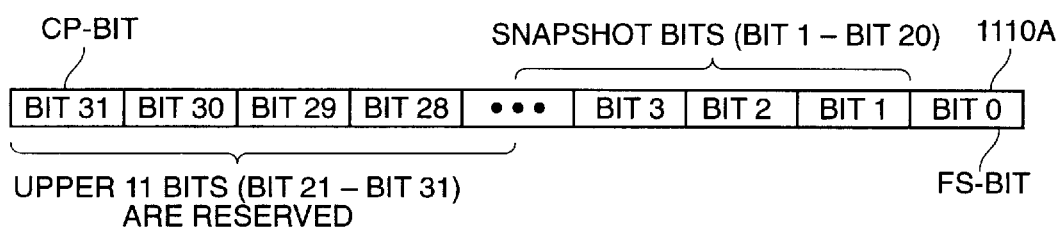

Another meta-data file is the "block map" (blkmap) file. FIG. 11A is a diagram illustrating a blkmap file 1110. The blkmap file 1110 contains a 32-bit entry 1110A–1110D for each 4 KB block in the disk system. It also serves as a free-block map file. The blkmap file 1110 indicates whether or not a disk block has been allocated. FIG. 11B is a diagram of a block entry 1110A of blkmap file 1110 (shown in FIG. 11A). As shown in FIG. 11B, entry 1110A is comprised of 32 bits (BIT0–BIT31). Bit 0 (BIT0) of entry 1110A is the active file system bit (FS-BIT). The FS-bit of entry 1110A indicates whether or not the corresponding block is part of the active file system. Bits 1–20 (BIT1–BIT20) of entry 1110A are bits that indicate whether the block is part of a corresponding snapshot 1–20. The next upper 10 bits (BIT21–BIT30) are reserved. Bit 31 (BIT31) is the consistency point bit (CP-BIT) of entry 1110A.

Figure 11C:
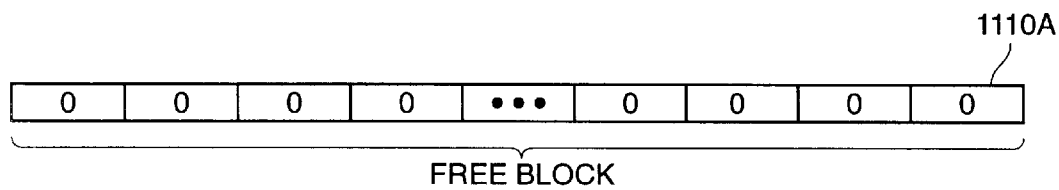
Figure 11D:
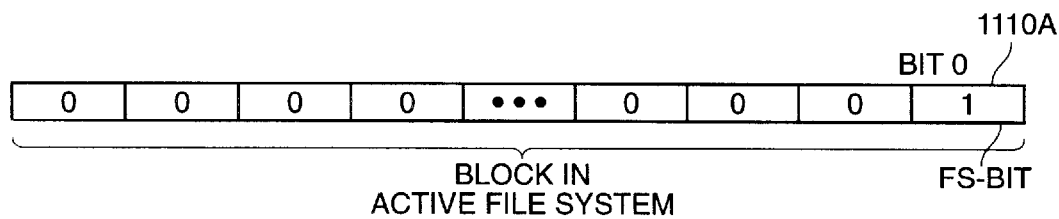

A block is available as a free block in the file system when all bits (BIT0–BIT31) in the 32-bit entry 1110A for the block are clear (reset to a value of 0). FIG. 11C is a diagram illustrating entry 1110A of FIG. 11A indicating the disk block is free. Thus, the block referenced by entry 1110A of blkmap file 1110 is free when bits 0–31 (BIT0–BIT31) all have values of 0. FIG. 11D is a diagram illustrating entry 1110A of FIG. 11A indicating an allocated block in the active file system. When bit 0 (BIT0), also referred to as the FS-bit, is set to a value of 1, the entry 1110A of blkmap file 1110 indicates a block that is part of the active file system. Bits 1–20 (BIT1–BIT20) are used to indicate corresponding snapshots, if any, that reference the block. Snapshots are described in detail below. If bit 0 (BIT0) is set to a value of 0, this does not necessarily indicate that the block is available for allocation. All the snapshot bits must also be zero for the block to be allocated. Bit 31 (BIT31) of entry 1110A always has the same state as bit 0 (BIT0) on disk, however, when loaded into memory bit 31 (BIT31) is used for bookkeeping as part of a consistency point.

Figure 13A:
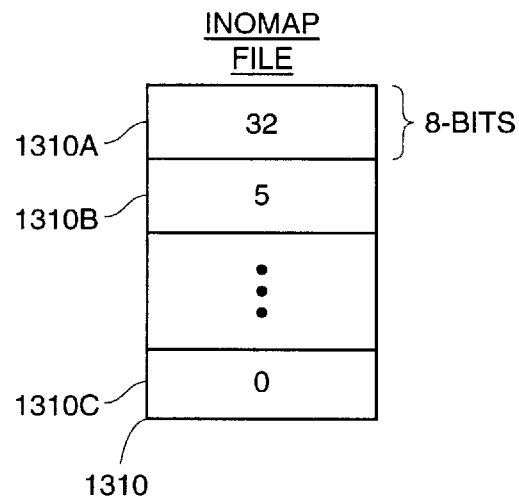
FIGS. 13A and 13B are diagrams illustrating an inode map (inomap) file according to the present invention.

Another meta-data file is the "inode map" (inomap) file that serves as a free inode map. FIG. 13A is a diagram illustrating an inomap file 1310. The inomap file 1310 contains an 8-bit entry 1310A–1310C for each block in the inode file 1210 shown in FIG. 12. Each entry 1310A–1310C is a count of allocated inodes in the corresponding block of the inode file 1210. FIG. 13A shows values of 32, 5, and 0 in entries 1310A–1310C, respectively. The inode file 1210 must still be inspected to find which inodes in the block are free, but does not require large numbers of random blocks to be loaded into memory from disk. Since each 4 KB block 1220 of inode file 1210 holds 32 inodes, the 8-bit inomap entry 1310A–1310C for each block of inode file 1210 can have values ranging from 0 to 32. When a block 1220 of an inode file 1210 has no inodes in use, the entry 1310A–1310C for it in inomap file 1310 is 0. When all the inodes in the block 1220 inode file 1210 are in use, the entry 1310A–1310C of the inomap file 1310 has a value of 32.

Figure 13B:
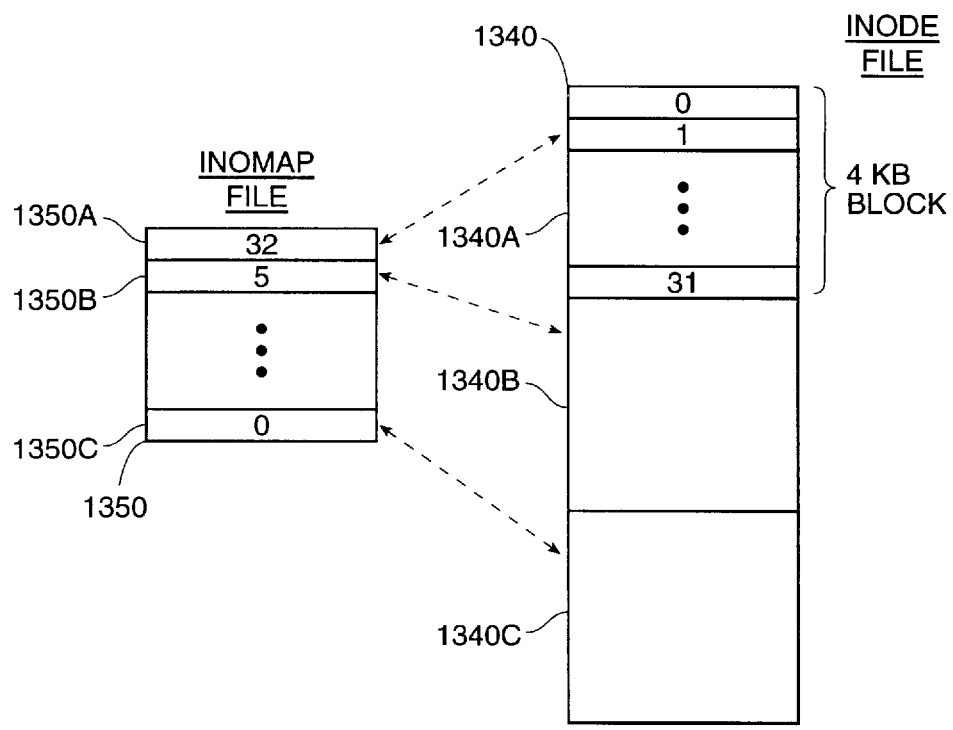

FIG. 13B is a diagram illustrating an inomap file 1350 that references the 4 KB blocks 1340A–1340C of inode file 1340. For example, inode file 1340 stores 37 inodes in three 4 KB blocks 1340A–1340C. Blocks 1340A–1340C of inode file 1340 contain 32, 5, and 0 used inodes, respectively. Entries 1350A–1350C of blkmap file 1350 reference blocks 1340A–1340C of inode file 1340, respectively. Thus, the entries 1350A–1350C of inomap file have values of 32, 5, and 0 for blocks 1340A–1340C of inode file 1340. In turn, entries 1350A–1350C of inomap file indicate 0, 27, and 32 free inodes in blocks 1340A–1340C of inode file 1340, respectively.

Referring to FIGS. 13A and 13B using a bitmap for the entries 1310A–1310C of inomap file 1310 instead of counts is disadvantageous since it would require 4 bytes per entry 1310A–1310C for block 1220 of the inode file 1210 (shown in FIG. 12) instead of one byte. Free inodes in the block(s) 1220 of the inode file 1210 do not need to be indicated in the inomap file 1310 because the inodes themselves contain that information.

Figure 15:
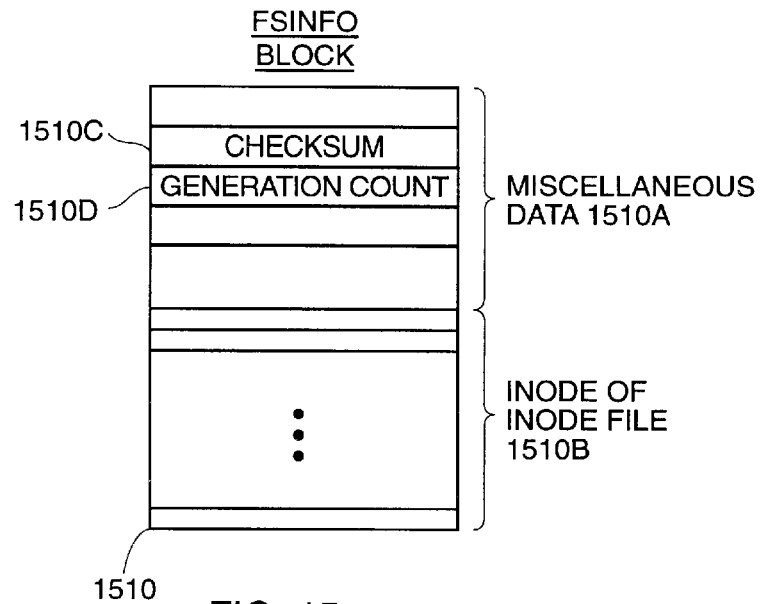
FIG. 15 is a diagram illustrating a file system information (fsinfo) structure.

FIG. 15 is a diagram illustrating a file system information (fsinfo) structure 1510. The root inode 1510B of a file system is kept in a fixed location on disk so that it can be located during booting of the file system. File system information structure 1510 is not a meta-data file but is part of the WAFL system. The root inode 1510B is an inode referencing the inode file 1210. It is part of the file system information (fsinfo) structure 1510 that also contains information 1510A including the number of blocks in the file system, the creation time of the file system, etc. The miscellaneous information 1510A further comprises a checksum 1510C (described below). Except for the root inode 1510B itself, this information 1510A can be kept in a meta-data file in an alternate embodiment. Two identical copies of the fsinfo structure 1510 are kept in fixed locations on disk.

Figure 16:
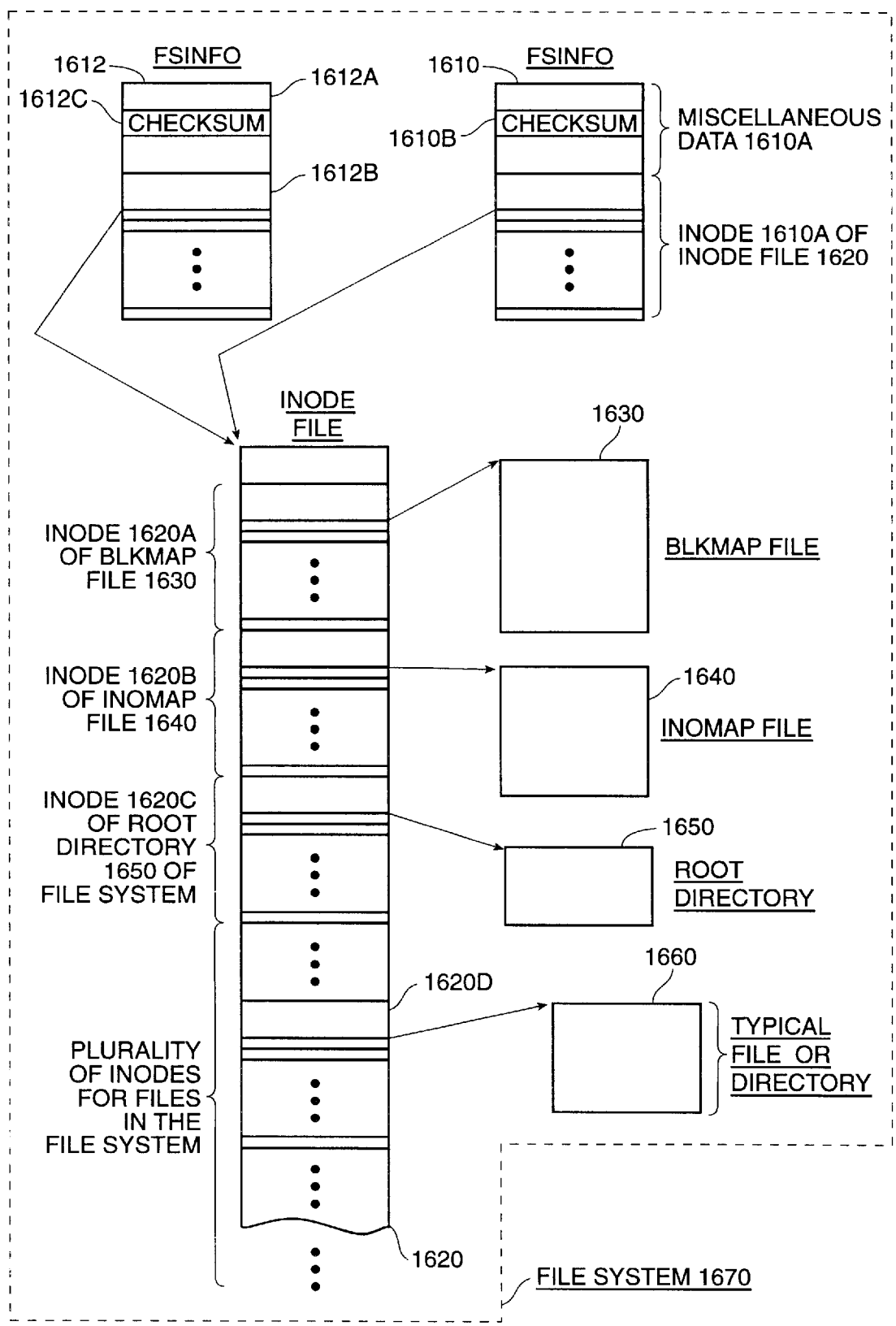
FIG. 16 is a diagram illustrating the WAFL file system.

FIG. 16 is a diagram illustrating the WAFL file system 1670 in a consistent state on disk comprising two fsinfo blocks 1610 and 1612, inode file 1620, blkmap file 1630, inomap file 1640, root directory 1650, and a typical file (or directory) 1660. Inode file 1620 is comprised of a plurality of inodes 1620A–1620D that reference other files 1630–1660 in the file system 1670. Inode 1620A of inode file 1620 references blkmap file 1630. Inode 1620B references inomap file 1640. Inode 1620C references root directory 1650. Inode 1620D references a typical file (or directory) 1660. Thus, the inode file points to all files 1630–1660 in the file system 1670 except for fsinfo blocks 1610 and 1612. Fsinfo blocks 1610 and 1612 each contain a copy 1610B and 1612B of the inode of the inode file 1620, respectively. Because the root inode 1610B and 1612B of fsinfo blocks 1610 and 1612 describes the inode file 1620, which in turn describes the rest of the files 1630–1660 in the file system 1670 including all meta-data files 1630–1640, the root inode 1610B and 1612B is viewed as the root of a tree of blocks. The WAFL system 1670 uses this tree structure for its update method (consistency point) and for implementing snapshots, both described below.

List of Inodes Having Dirty Blocks

Figure 1:
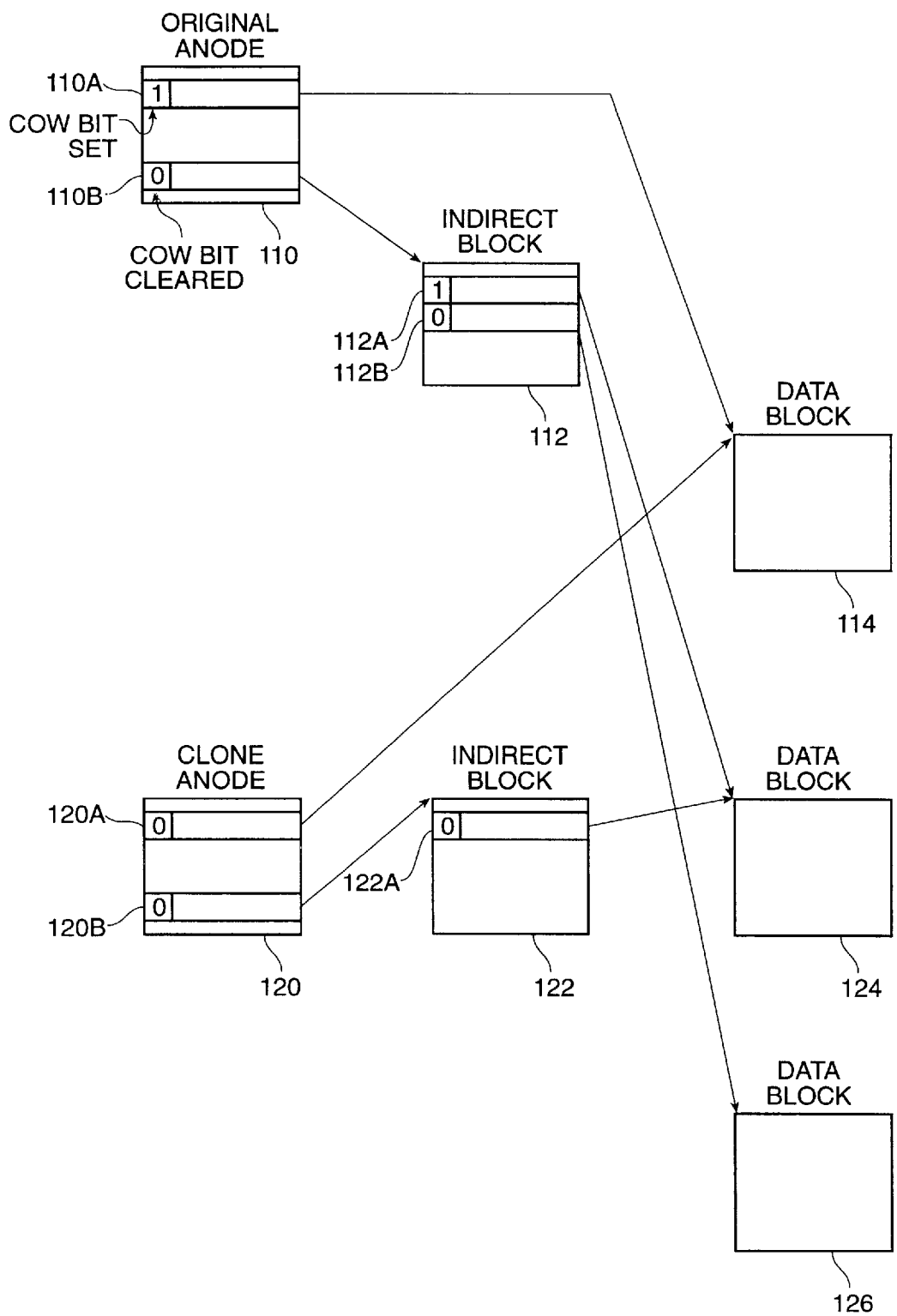
FIG. 1 is a block diagram of a prior art "clone" of a file system.
Figure 2:
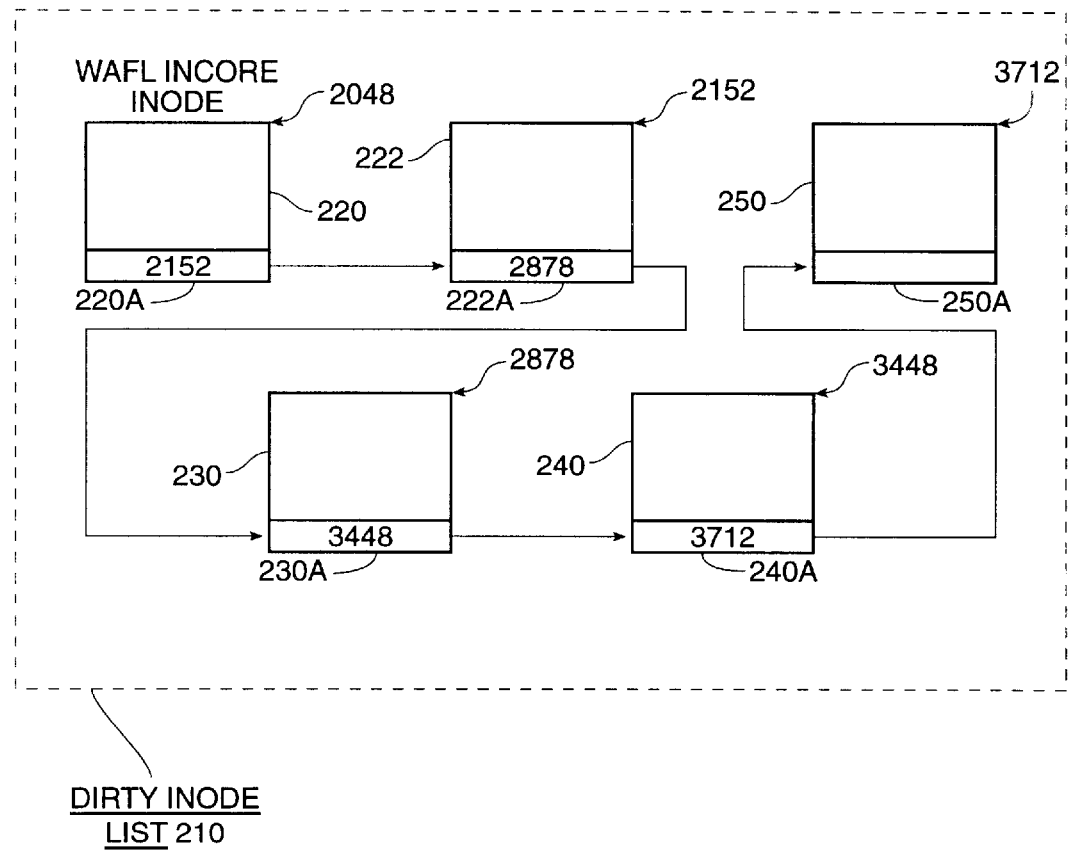
FIG. 2 is a diagram illustrating a list of inodes having dirty buffers.

WAFL in-core inodes (i.e., WAFL inode 1010 shown in FIG. 10) of the WAFL file system are maintained in different linked lists according to their status. Inodes that reference dirty blocks are kept in a dirty inode list as shown in FIG. 2. Inodes containing valid data that is not dirty are kept in a separate list and inodes that have no valid data are kept in yet another, as is well-known in the art. The present invention utilizes a list of inodes having dirty data blocks that facilitates finding all of the inodes that need write allocations to be done.

FIG. 2 is a diagram illustrating a list 210 of dirty inodes according to the present invention. The list 210 of dirty inodes comprises WAFL in-core inodes 220–250. As shown in FIG. 2, each WAFL in-core inode 220–250 comprises a pointer 220A–250A, respectively, that points to another inode in the linked list. For example, WAFL inodes 220–250 are stored in memory at locations 2048, 2152, 2878, 3448 and 3712, respectively. Thus, pointer 220A of inode 220 contains address 2152. It points therefore to WAFL inode 222. In turn, WAFL inode 222 points to WAFL inode 230 using address 2878. WAFL inode 230 points to WAFL inode 240. WAFL inode 240 points to inode 250. The pointer 250A of WAFL inode 250 contains a null value and therefore does not point to another inode. Thus, it is the last inode in the list 210 of dirty inodes. Each inode in the list 210 represents a file comprising a tree of buffers as depicted in FIG. 10. At least one of the buffers referenced by each inode 220–250 is a dirty buffer. A dirty buffer contains modified data that must be written to a new disk location in the WAFL system. WAFL always writes dirty buffers to new locations on disk.

CONSISTENCY POINTS

The WAFL disk structure described so far is static. In the present invention, changes to the file system 1670 are tightly controlled to maintain the file system 1670 in a consistent state. The file system 1670 progresses from one self-consistent state to another self-consistent state. The set (or tree) of self-consistent blocks on disk that is rooted by the root inode 1510B is referred to as a consistency point (CP). To implement consistency points, WAFL always writes new data to unallocated blocks on disk. It never overwrites existing data. Thus, as long as the root inode 1510B is not updated, the state of the file system 1670 represented on disk does not change. However, for a file system 1670 to be useful, it must eventually refer to newly written data, therefore a new consistency point must be written.

Referring to FIG. 16, a new consistency point is written by first flushing all file system blocks to new locations on disk (including the blocks in meta-data files such as the inode file 1620, blkmap file 1630, and inomap file 1640). A new root inode 1610B and 1612B for the file system 1670 is then written to disk. With this method for atomically updating a file system, the on-disk file system is never inconsistent. The on-disk file system 1670 reflects an old consistency point up until the root inode 1610B and 1612B is written. Immediately after the root inode 1610B and 1612B is written to disk, the file system 1670 reflects a new consistency point. Data structures of the file system 1670 can be updated in any order, and there are no ordering constraints on disk writes except the one requirement that all blocks in the file system 1670 must be written to disk before the root inode 1610B and 1612B is updated.

To convert to a new consistency point, the root inode 1610B and 1612B must be updated reliably and atomically. WAFL does this by keeping two identical copies of the fsinfo structure 1610 and 1612 containing the root inode 1610B and 1612B. During updating of the root inode 1610B and 1612B, a first copy of the fsinfo structure 1610 is written to disk, and then the second copy of the fsinfo structure 1612 is written. A checksum 1610C and 1612C in the fsinfo structure 1610 and 1612, respectively, is used to detect the occurrence of a system crash that corrupts one of the copies of the fsinfo structure 1610 or 1612, each containing a copy of the root mode, as it is being written to disk. Normally, the two fsinfo structures 1610 and 1612 are identical.

Algorithm for Generating a Consistency Point

Figure 5:
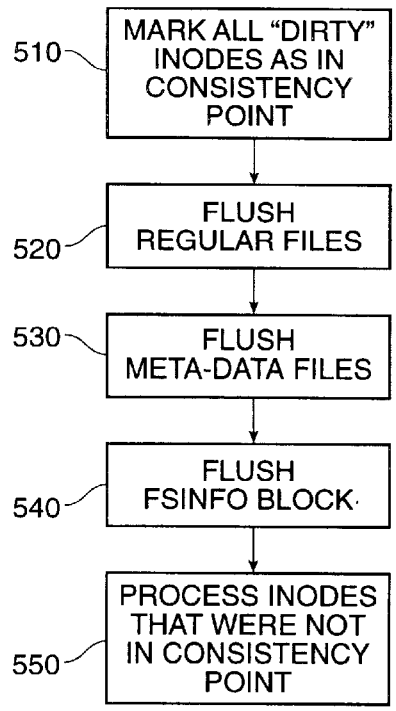
FIG. 5 is a flow diagram illustrating the method for generating a consistency point.

FIG. 5 is a diagram illustrating the method of producing a consistency point. In step 510, all "dirty" inodes (inodes that point to new blocks containing modified data) in the system are marked as being in the consistency point. Their contents, and only their contents, are written to disk. Only when those writes are complete are any writes from other inodes allowed to reach disk. Further, during the time dirty writes are occurring, no new modifications can be made to inodes that have their consistency point flag set In addition to setting the consistency point flag for all dirty inodes that are part of the consistency point, a global consistency point flag is set so that user-requested changes behave in a tightly controlled manner. Once the global consistency point flag is set, user-requested changes are not allowed to affect inodes that have their consistency point flag set. Further, only inodes having a consistency point flag that is set are allocated disk space for their dirty blocks. Consequently, the state of the file system will be flushed to disk exactly as it was when the consistency point began.

In step 520, regular files are flushed to disk. Flushing regular files comprises the steps of allocating disk space for dirty blocks in the regular files, and writing the corresponding WAFL buffers to disk. The inodes themselves are then flushed (copied) to the inode file. All inodes that need to be written are in either the list of inodes having dirty buffers or the list of inodes that are dirty but do not have dirty buffers. When step 520 is completed, there are no more ordinary inodes with the consistency point flag set, and all incoming I/O requests succeed unless the requests use buffers that are still locked up for disk I/O operations.

In step 530, special files are flushed to disk. Flushing special files comprises the steps of allocating disk space for dirty blocks in the two special files (the inode file and the blkmap file), updating the consistency bit (CP-bit) to match the active file system bit (FS-bit) for each entry in the blkmap file, and then writing the blocks to disk. Write allocating the inode file and the blkmap is complicated because the process of write allocating them changes the files themselves. Thus, in step 530 writes are disabled while changing these files to prevent important blocks from locking up in disk I/O operations before the changes are completed.

Also, in step 530, the creation and deletion of snapshots, described below, are performed because it is the only point in time when the file system, except for the fsinfo block, is completely self consistent and about to be written to disk. A snapshot is deleted from the file system before a new one is created so that the same snapshot inode can be used in one pass.

Figure 6:
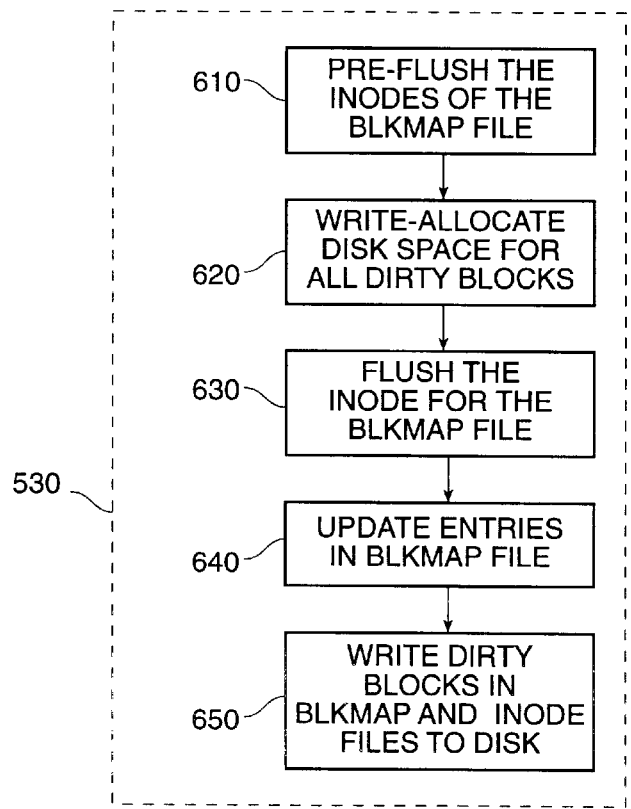
FIG. 6 is a flow diagram illustrating step 530 of FIG. 5 for generating a consistency point.

FIG. 6 is a flow diagram illustrating the steps that step 530 comprises. Step 530 allocates disk space for the blkmap file and the inode file and copies the active FS-bit into the CP-bit for each entry in the blkmap file. In step 610, the inode for the blkmap file is pre-flushed to the inode file. This ensures that the block in the inode file that contains the inode of the blkmap file is dirty so that step 620 allocates disk space for it.

In step 620, disk space is allocated for all dirty blocks in the inode and blkmap files. The dirty blocks include the block in the inode file containing the inode of the blkmap file.

In step 630, the inode for the blkmap file is flushed again, however this time the actual inode is written to the pre-flushed block in the inode file. Step 610 has already dirtied the block of the inode file that contains the inode of the blkmap file. Thus, another write-allocate, as in step 620, does not need to be scheduled.

In step 640, the entries for each block in the blkmap file are updated. Each entry is updated by copying the active FS-bit to the CP-bit (i.e., copying bit 0 into bit 31) for all entries in dirty blocks in the blkmap file.

In step 650, all dirty blocks in the blkmap and inode files are written to disk.

Only entries in dirty blocks of the blkmap file need to have the active file system bit (FS-bit) copied to the consistency point bit (CP-bit) in step 640. Immediately after a consistency point, all blkmap entries have the same value for both the active FS-bit and CP-bit. As time progresses, some active FS-bits of blkmap file entries for the file system are either cleared or set. The blocks of the blkmap file containing the changed FS-bits are accordingly marked dirty. During the following consistency point, blocks that are clean do not need to be re-copied. The clean blocks are not copied because they were not dirty at the previous consistency point and nothing in the blocks has changed since then. Thus, as long as the file system is initially created with the active FS-bit and the CP-bit having the same value in all blkmap entries, only entries with dirty blocks need to be updated at each consistency point.

Referring to FIG. 5, in step 540, the file system information (fsinfo) block is first updated and then flushed to disk. The fsinfo block is updated by writing a new root inode for the inode file into it. The fsinfo block is written twice. It is first written to one location and then to a second location. The two writes are performed so that when a system crash occurs during either write, a self-consistent file system exists on disk. Therefore, either the new consistency point is available if the system crashed while writing the second fsinfo block or the previous consistency point (on disk before the recent consistency point began) is available if the first fsinfo block failed. When the file system is restarted after a system failure, the highest generation count for a consistency point in the fsinfo blocks having a correct checksum value is used. This is described in detail below.

In step 550, the consistency point is completed. This requires that any dirty inodes that were delayed because they were not part of the consistency point be requeued. Any inodes that had their state change during the consistency point are in the consistency point wait (CP_WAIT) queue. The CP_WAIT queue holds inodes that changed before step 540 completed, but after step 510 when the consistency point started. Once the consistency point is completed, the inodes in the CP_WAIT queue are re-queued accordingly in the regular list of inodes with dirty buffers and list of dirty inodes without dirty buffers.

Single Ordering Constraint of Consistency Point

Figure 20A:
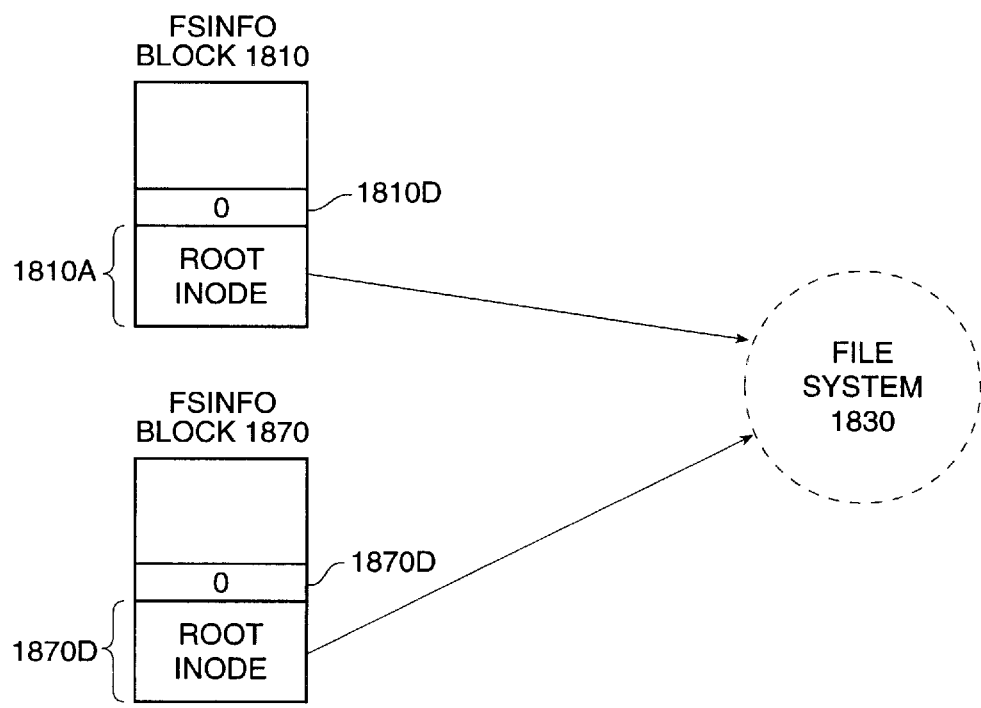
FIGS. 20A, 20B and 20C are diagrams illustrating fsinfo blocks used for maintaining a file system in a consistent state.
Figure 20B:
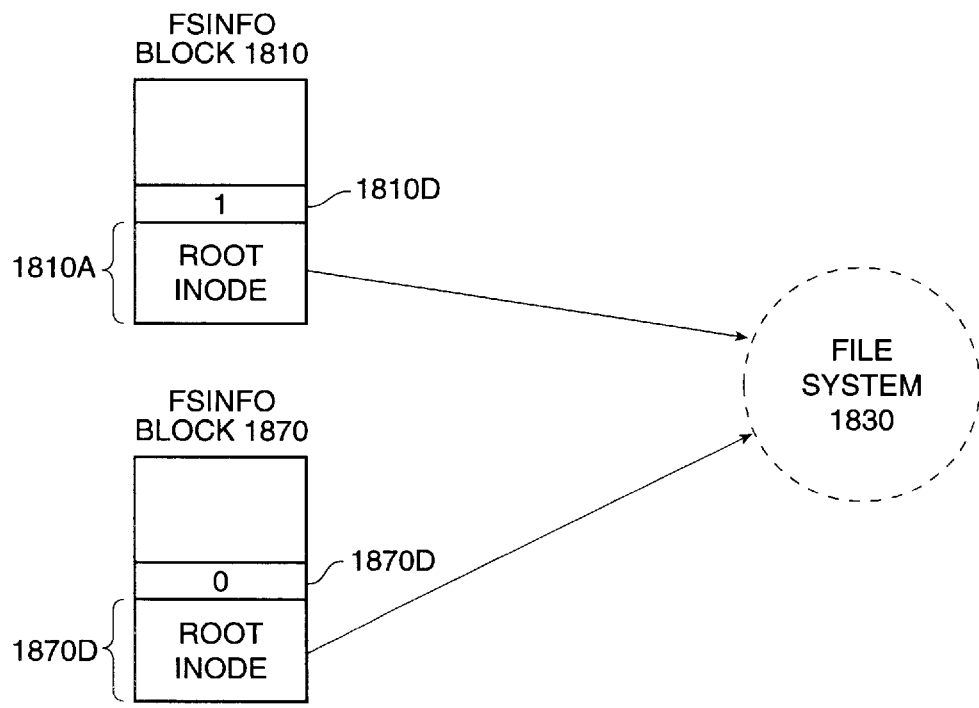
Figure 20C:
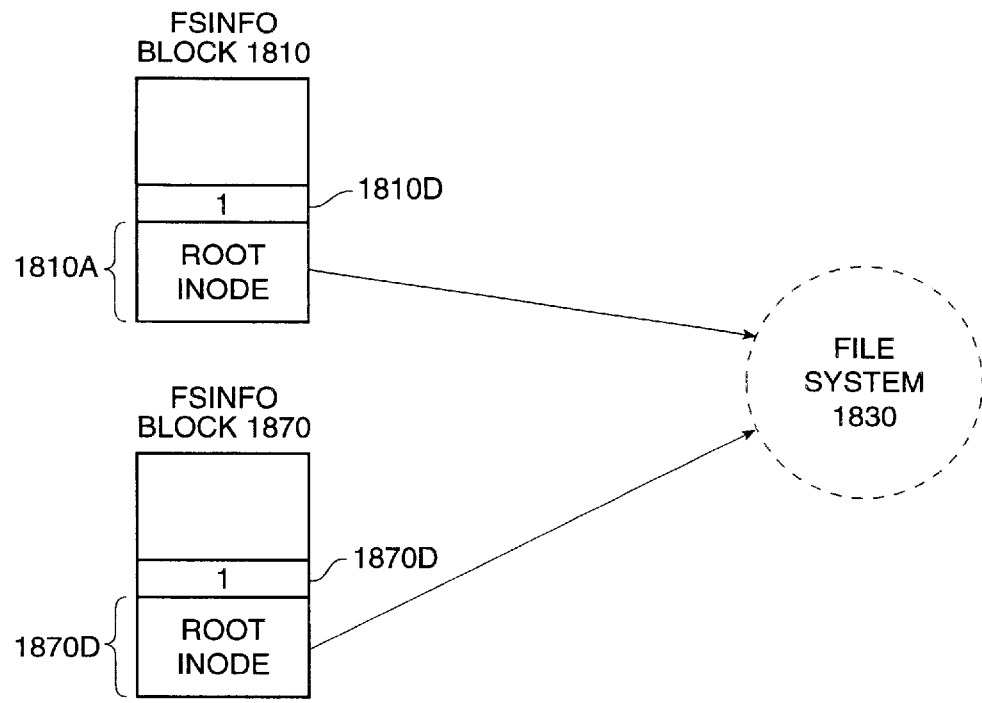

The present invention, as illustrated in FIGS. 20A–20C, has a single ordering constraint. The single ordering constraint is that the fsinfo block 1810 is written to disk only after all the other blocks are written to disk. The writing of the fsinfo block 1810 is atomic, otherwise the entire file system 1830 could be lost. Thus, the WAFL file system requires the fsinfo block 1810 to be written at once and not be in an inconsistent state. As illustrated in FIG. 15, each of the fsinfo blocks 1510 contains a checksum 1510C and a generation count 1510D.

FIG. 20A illustrates the updating of the generation count 1810D and 1870D of fsinfo blocks 1810 and 1870. Each time a consistency point (or snapshot) is performed, the generation count of the fsinfo block is updated. FIG. 20A illustrates two fsinfo blocks 1810 and 1870 having generation counts 1810D and 1870D, respectively, that have the same value of N indicating a consistency point for the file system. Both fsinfo blocks reference the previous consistency point (old file system on disk) 1830. A new version of the file system exists on disk and is referred to as new consistency point 1831. The generation count is incremented every consistency point.

In FIG. 20B, the generation count 1810D of the first fsinfo block 1810 is updated and given a value of N+1. It is then written to disk. FIG. 20B illustrates a value of N+1 for generation count 1810D of fsinfo block 1810 whereas the generation count 1870D of the second fsinfo block 1870 has a value of N. Fsinfo block 1810 references new consistency point 1831 whereas fsinfo block 1870 references old consistency point 1830. Next, the generation count 1870D of fsinfo block 1870 is updated and written to disk as illustrated in FIG. 20C. In FIG. 20C, the generation count 1870D of fsinfo block 1870 has a value of N+1. Therefore the two fsinfo blocks 1810 and 1870 have the same generation count value of N+1.

When a system crash occurs between fsinfo block updates, each copy of the fsinfo block 1810 and 1870 has a self consistent checksum (not shown in the diagram), but one of the generation numbers 1810D or 1870D has a higher value. That is, a system crash occurs when the file system is in the state illustrated in FIG. 20B. For example, in the preferred embodiment of the present invention as illustrated in FIG. 20B, the generation count 1810D of fsinfo block 1810 is updated before the second fsinfo block 1870.

Therefore, the generation count 1810D (value of N+1) is greater than the generation count 1870(value of N)D of fsinfo block 1870. Because the generation count of the first fsinfo block 1810 is higher, it is selected for recovering the file system after a system crash. This is done because the first fsinfo block 1810 contains more current data as indicated by its generation count 1810D. For the case when the first fsinfo block is corrupted because the system crashes while it is being updated, the other copy 1870 of the fsinfo block is used to recover the file system 1830 into a consistent state.

It is not possible for both fsinfo blocks 1810 and 1870 to be updated at the same time in the present invention. Therefore, at least one good copy of the fsinfo block 1810 and 1870 exists in the file system. This allows the file system to always be recovered into a consistent state.

WAFL does not require special recovery procedures. This is unlike prior art systems that use logging, ordered writes, and mostly ordered writes with recovery. This is because only data corruption, which RAID protects against, or software can corrupt a WAFL file system. To avoid losing data when the system fails, WAFL may keep a non-volatile transaction log of all operations that have occurred since the most recent consistency point. This log is completely independent of the WAFL disk format and is required only to prevent operations from being lost during a system crash. However, it is not required to maintain consistency of the file system.

Generating A Consistency Point

As described above, changes to the WAFL file system are tightly controlled to maintain the file system in a consistent state. FIGS. 17A–17L illustrate the generation of a consistency point for a WAFL file system. The generation of a consistency point is described with reference to FIGS. 5 and 6.

In FIGS. 17A–17L, buffers that have not been modified do not have asterisks beside them. Therefore, these buffers contain the same data as corresponding on-disk blocks. Thus, a block may be loaded into memory but it has not changed with respect to its on disk version. A buffer with a single asterisk (*) beside it indicates a dirty buffer in memory (its data is modified). A buffer with a double asterisk () beside it indicates a dirty buffer that has been allocated disk space. Finally, a buffer with a triple asterisk (*) is a dirty buffer that is written into a new block on disk. This convention for denoting the state of buffers is also used with respect to FIGS. 21A–21E.

Figure 17A:
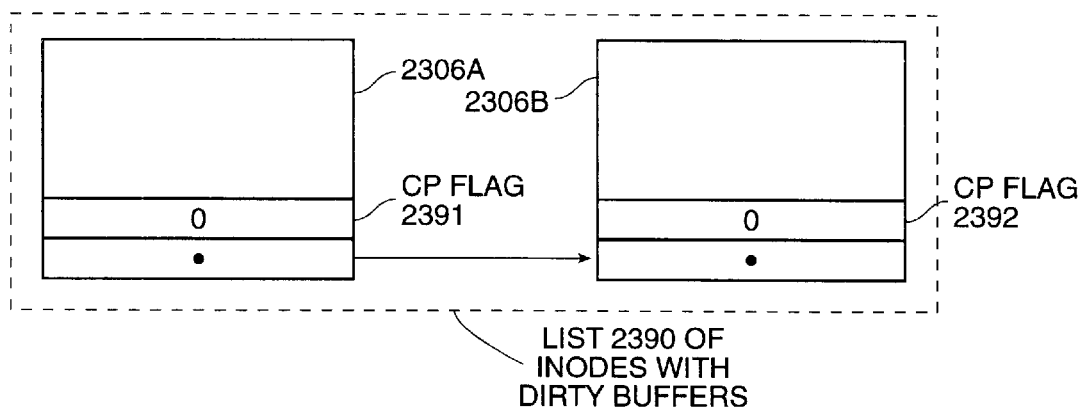

FIG. 17A illustrates a list 2390 of inodes with dirty buffers comprising inodes 2306A and 2306B. Inodes 2306A and 2306B reference trees of buffers where at least one buffer of each tree has been modified. Initially, the consistency point flags 2391 and 2392 of inodes 2306A and 2306B are cleared (0). While a list 2390 of inodes with dirty buffers is illustrated for the present system, it should be apparent to a person skilled in the art that other lists of inodes may exist in memory. For instance, a list of inodes that are dirty but do not have dirty buffers is maintained in memory. These inodes must also be marked as being in the consistency point. They must be flushed to disk also to write the dirty contents of the inode file to disk even though the dirty inodes do not reference dirty blocks. This is done in step 520 of FIG. 5.

Figure 17I:
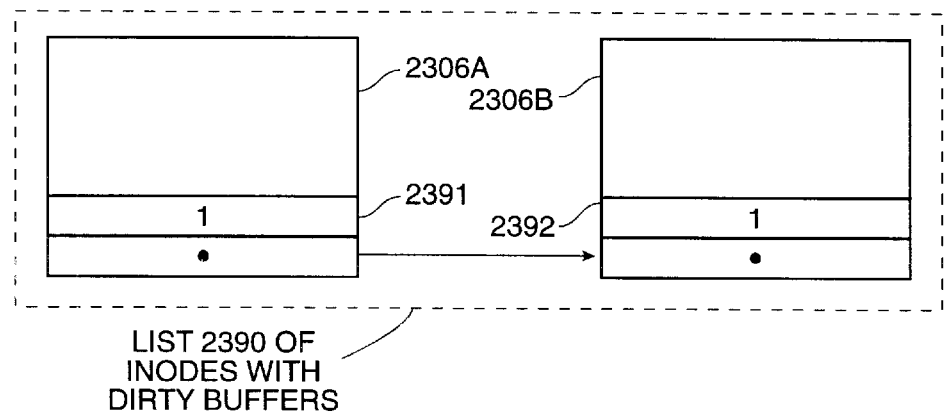
Figure 17B:
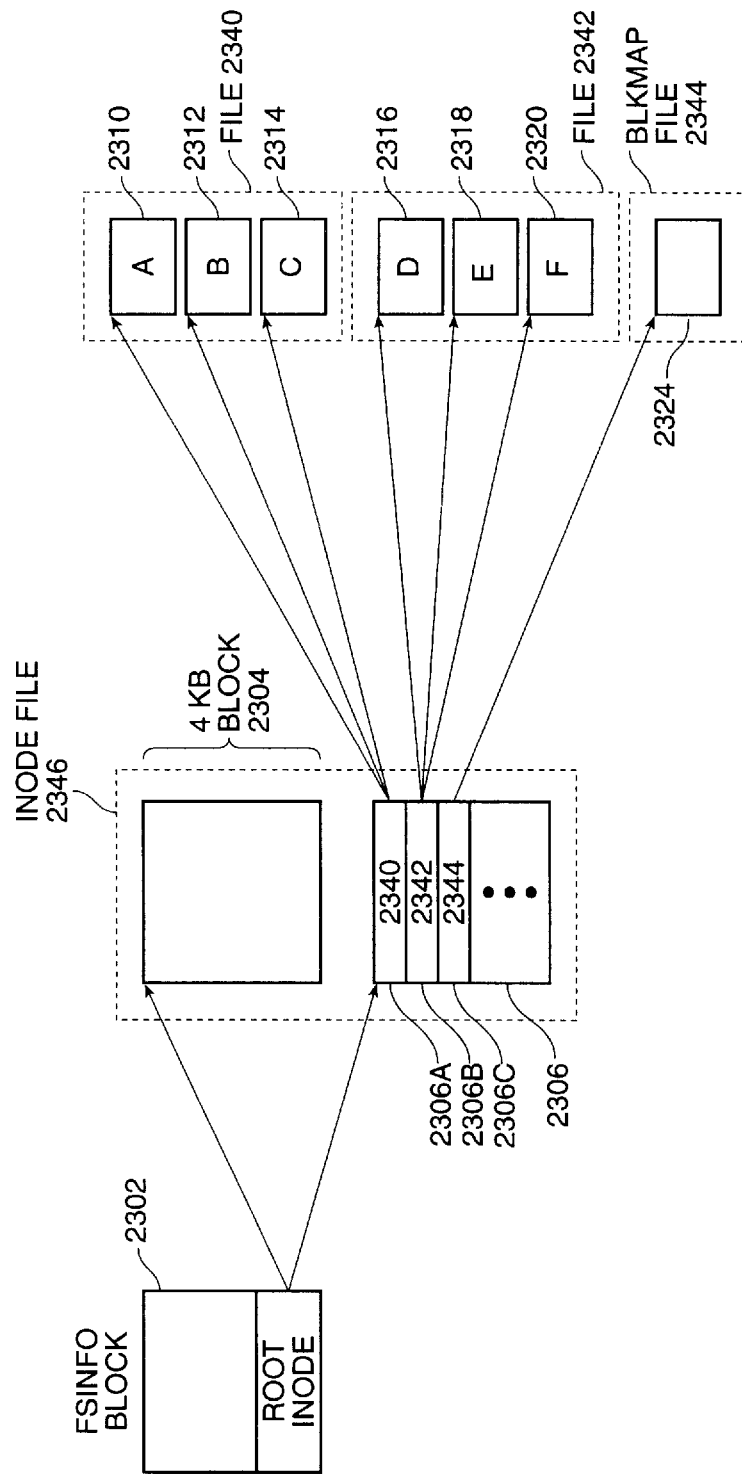

FIG. 17B is a diagram illustrating a WAFL file system of a previous consistency point comprising fsinfo block 2302, inode file 2346, blkmap file 2344 and files 2340 and 2342. File 2340 comprises blocks 2310–2314 containing data "A", "B", and "C", respectively. File 2342 comprises data blocks 2316–2320 comprising data "D", "E", and "F", respectively.

Blkmap file 2344 comprises block 2324. The inode file 2346 comprises two 4 KB blocks 2304 and 2306. The second block 2306 comprises inodes 2306A–2306C that reference file 2340, file 2342, and blkmap file 2344, respectively. This is illustrated in block 2306 by listing the file number in the inode. Fsinfo block 2302 comprises the root inode. The root inode references blocks 2304 and 2306 of inode file 2346. Thus, FIG. 17B illustrates a tree of buffers in a file system rooted by the fsinfo block 2302 containing the root inode.

Figure 17C:
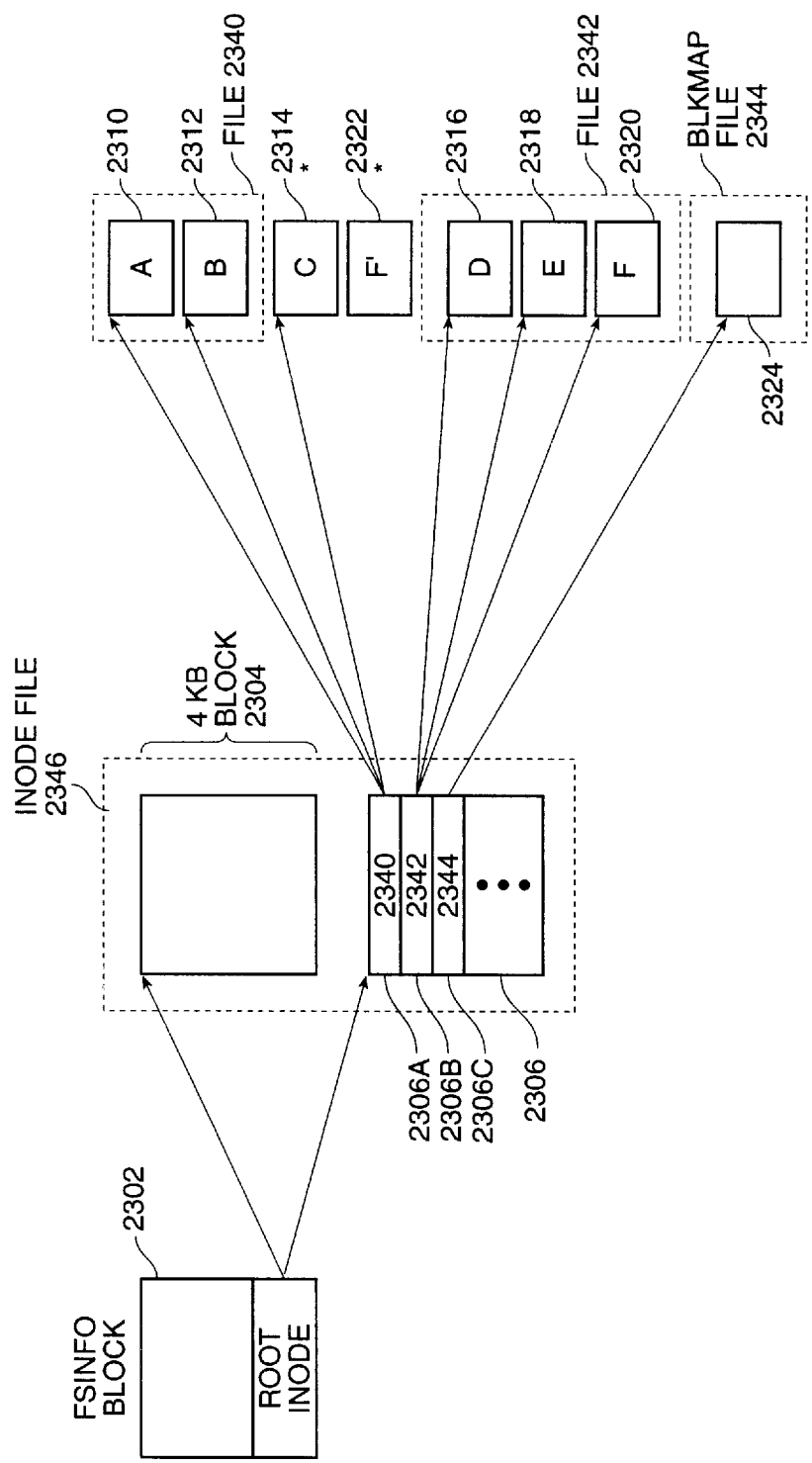

FIG. 17C is a diagram illustrating two modified buffers for blocks 2314 and 2322 in memory. The active file system is modified so that the block 2314 containing data "C" is deleted from file 2340. Also, the data "F" stored in block 2320 is modified to "F-prime", and is stored in a buffer for disk block 2322. It should be understood that the modified data contained in buffers for disk blocks 2314 and 2322 exists only in memory at this time. All other blocks in the active file system in FIG. 17C are not modified, and therefore have no asterisks beside them. However, some or all of these blocks may have corresponding clean buffers in memory.

FIG. 17D is a diagram illustrating the entries 2324A–2324M of the blkmap file 2344 in memory. Entries 2324A–2324M are contained in a buffer for 4 KB block 2324 of blkmap file 2344. As described previously, BIT0 and BIT31 are the FS-BIT and CP-BIT, respectively. The consistency point bit (CP-BIT) is set during a consistency point to ensure that the corresponding block is not modified once a consistency point has begun, but not finished. BIT1 is the first snapshot bit (described below). Blkmap entries 2324A and 2324B illustrate that, as shown in FIG. 17B, the 4 KB blocks 2304 and 2306 of inode file 2346 are in the active file system (FS-BIT equal to 1) and in the consistency point (CP-BIT equal to 1). Similarly, the other blocks 2310–2312 and 2316–2320 and 2324 are in the active file system and in the consistency point. However, blocks 2308, 2322, and 2326–2328 are neither in the active file system nor in the consistency point (as indicated by BIT0 and BIT31, respectively). The entry for deleted block 2314 has a value of 0 in the FS-BIT indicating that it has been removed from the active file system.

Figure 17E:
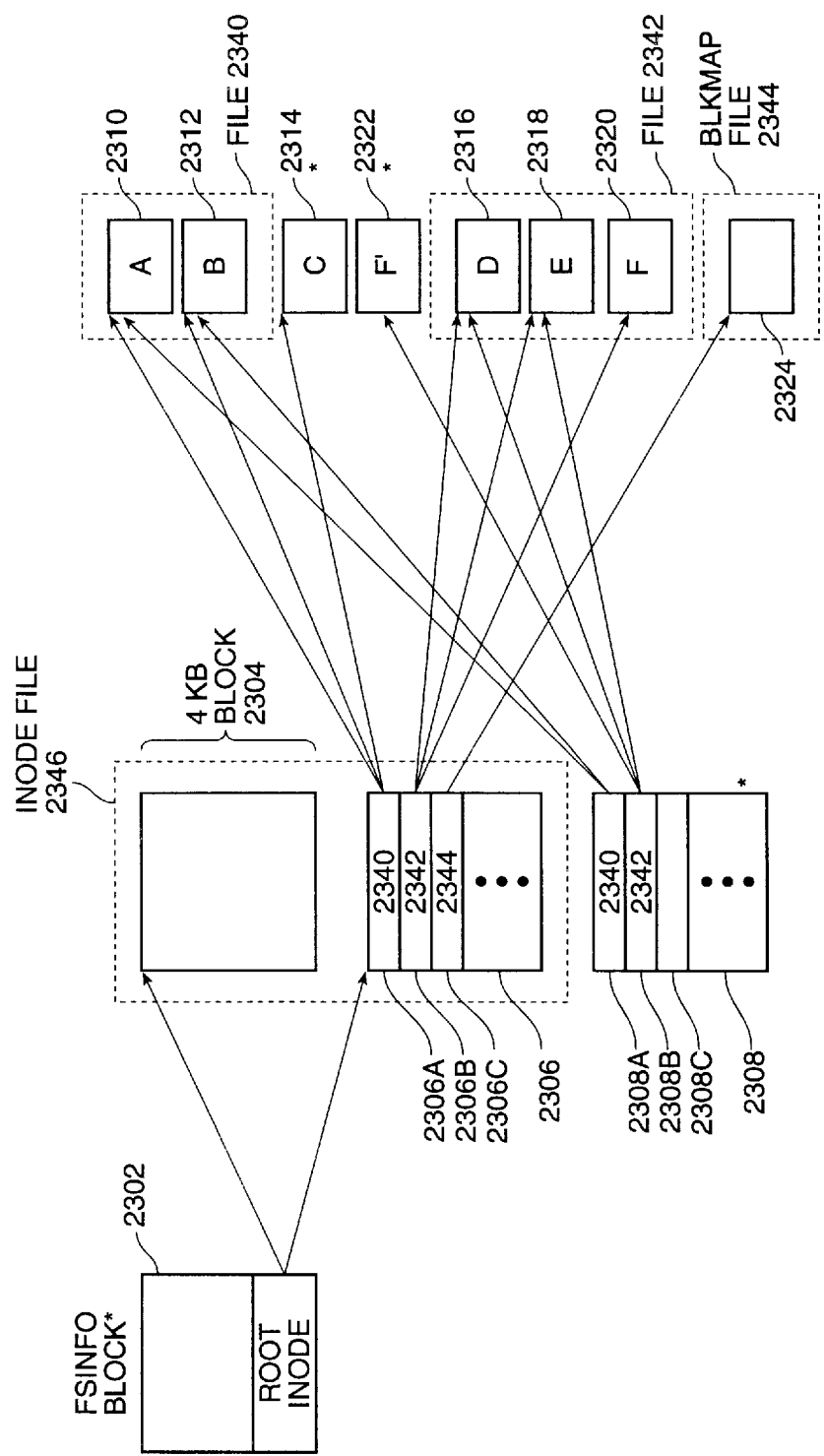

In step 510 of FIG. 5, all "dirty" inodes in the system are marked as being in the consistency point. Dirty inodes include both inodes that are dirty and inodes that reference dirty buffers. FIG. 17I illustrates a list of inodes with dirty buffers where the consistency point flags 2391 and 2392 of inodes 2306A and 2306B are set (1). Inode 2306A references block 2314 containing data "C" of file 2340 which is to be deleted from the active file system. Inode 2306B of block 2306 of inode file 2346 references file 2342. Block 2320 containing data "Fprime" has been modified and a new block containing data "F" must be allocated. This is illustrated in FIG. 17E.

Figure 17F:
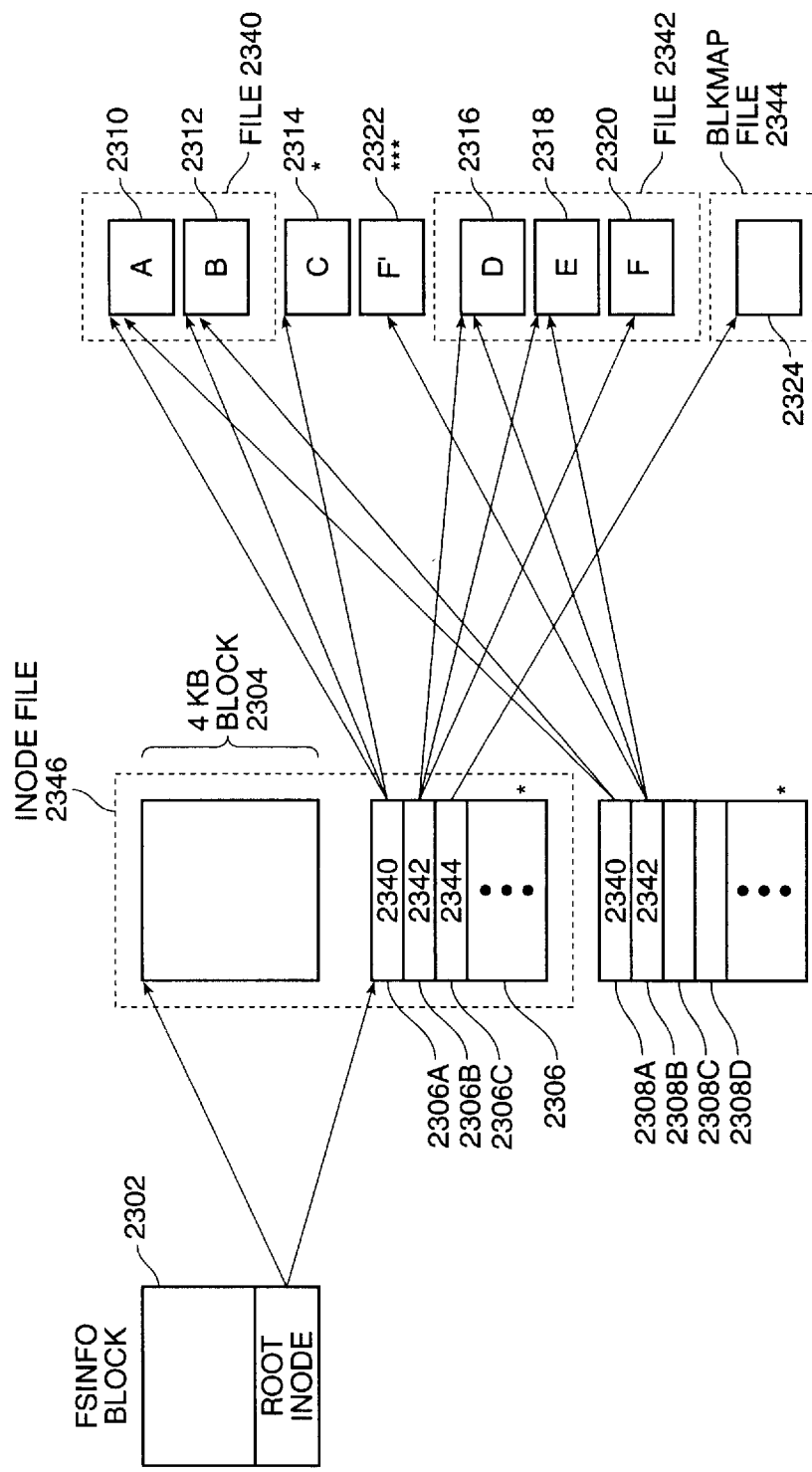

In step 520, regular files are flushed to disk. Thus, block 2322 is allocated disk space. Block 2314 of file 2340 is to be deleted, therefore nothing occurs to this block until the consistency point is subsequently completed. Block 2322 is written to disk in step 520. This is illustrated in FIG. 17F where buffers for blocks 2322 and 2314 have been written to disk (marked by *). The intermediate allocation of disk space () is not shown. The incore copies of inodes 2308A and 2308B of block 2308 of inode file 2346 are copied to the inode file. The modified data exists in memory only, and the buffer 2308 is marked dirty. The consistency point flags 2391 and 2392 of inodes 2306A and 2306B are then cleared (0) as illustrated in FIG. 17A. This releases the inodes for use by other processes. Inode 2308A of block 2308 references blocks 2310 and 2312 of file 2346. Inode 2308B references blocks 2316, 2318, and 2322 for file 2342. As illustrated in FIG. 17F, disk space is allocated for direct block 2322 for file 2342 and that block is written to disk. However, the file system itself has not been updated. Thus, the file system remains in a consistent state.

Figure 17G:
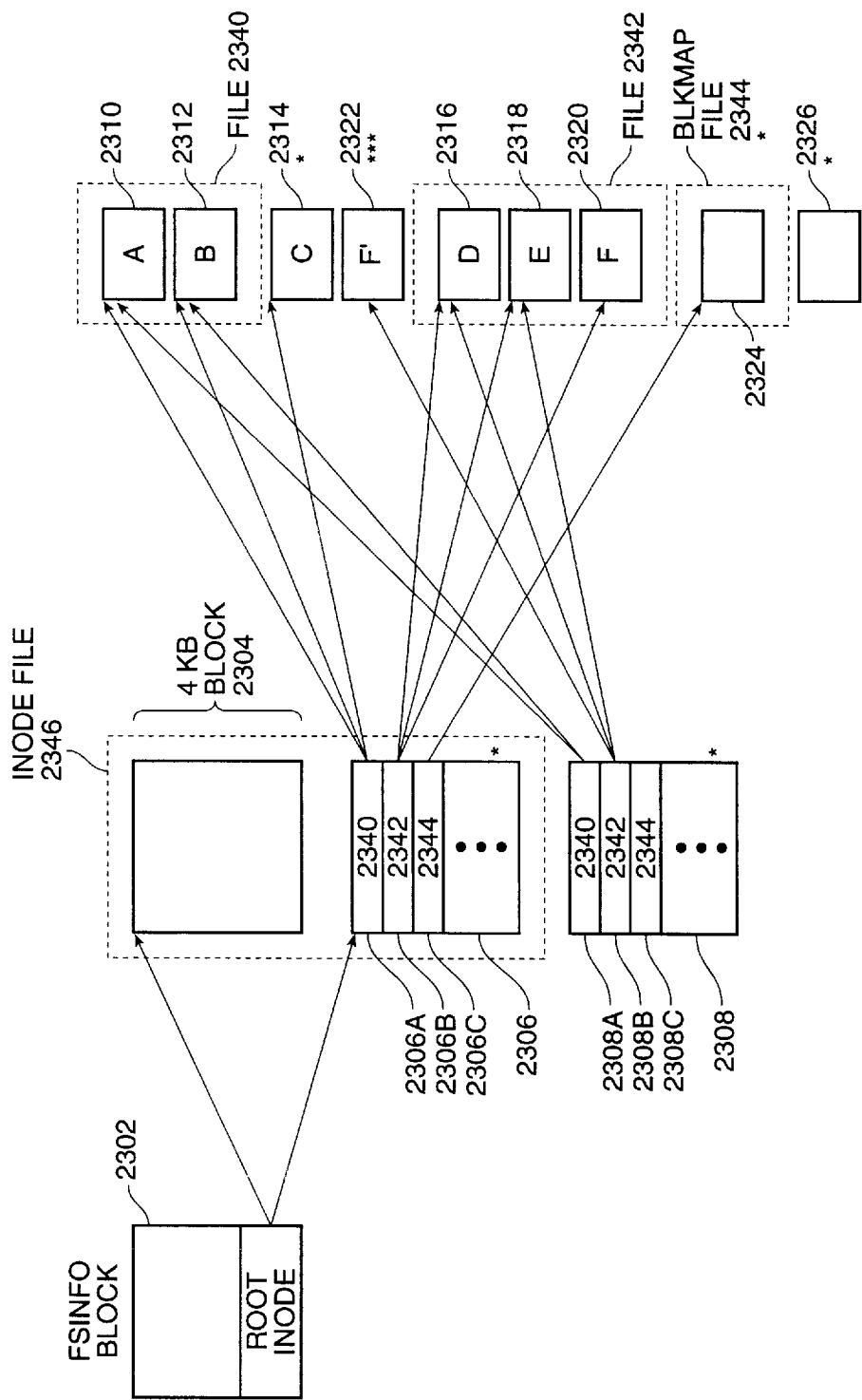

In step 530, the blkmap file 2344 is flushed to disk. This is illustrated in FIG. 17G where the blkmap file 2344 is indicated as being dirty by the asterisk.

Figure 17H:
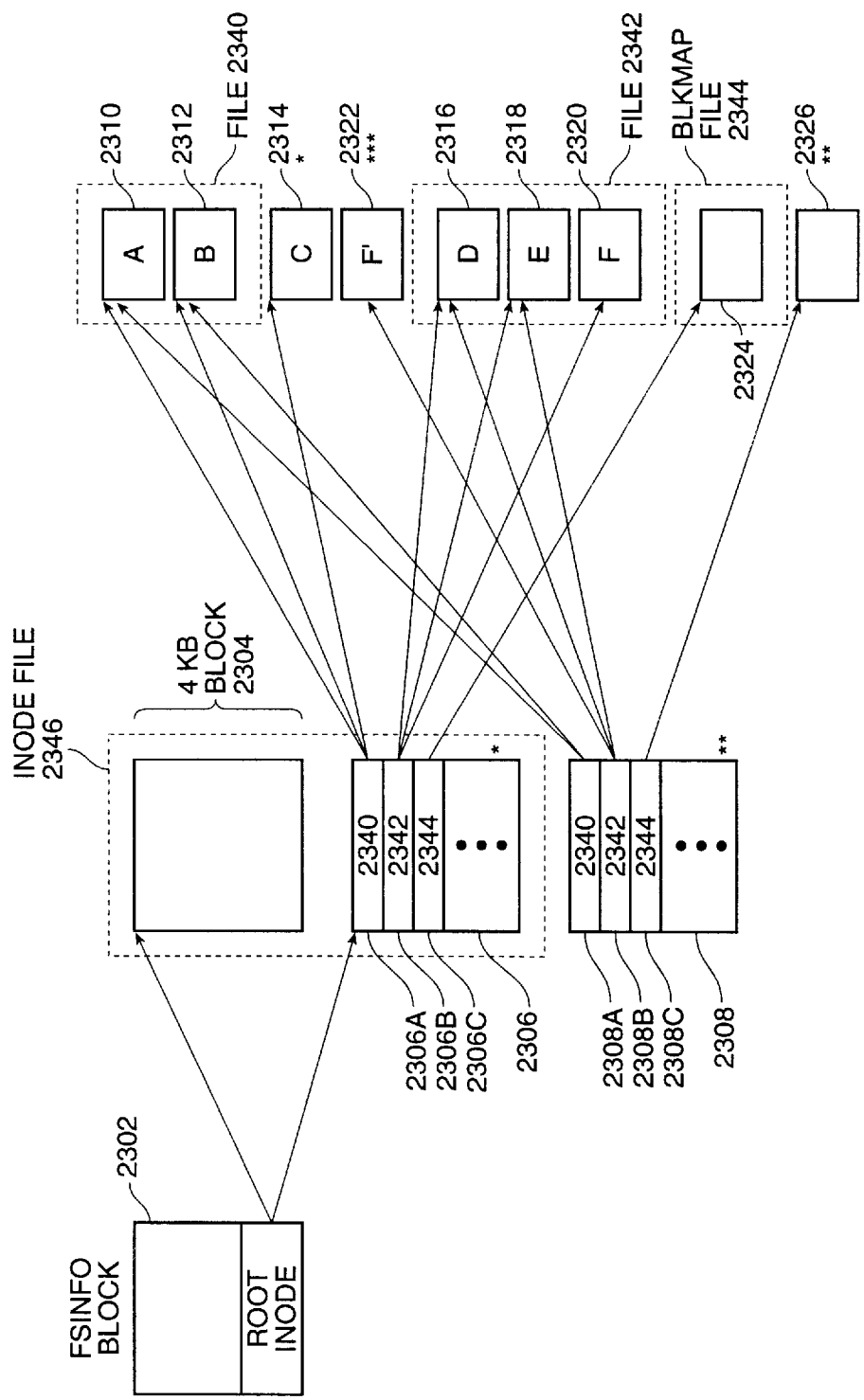

In step 610 of FIG. 6, the inode for the blkmap file is pre-flushed to the inode file as illustrated in FIG. 17H. Inode 2308C has been flushed to block 2308 of inode file 2346. However, inode 2308C still references block 2324. In step 620, disk space is allocated for blkmap file 2344 and inode file 2346. Block 2308 is allocated for inode file 2346 and block 2326 is allocated for blkmap file 2344. As described above, block 2308 of inode file 2346 contains a pre-flushed inode 2308C for blkmap file 2344. In step 630, the inode for the blkmap file 2344 is written to the pre-flushed block 2308C in inode file 2346. Thus, incore inode 2308C is updated to reference block 2326 in step 620, and is copied into the buffer in memory containing block 2306 that is to be written to block 2308. This is illustrated in FIG. 17H where inode 2308C references block 2326.

Figure 17K:
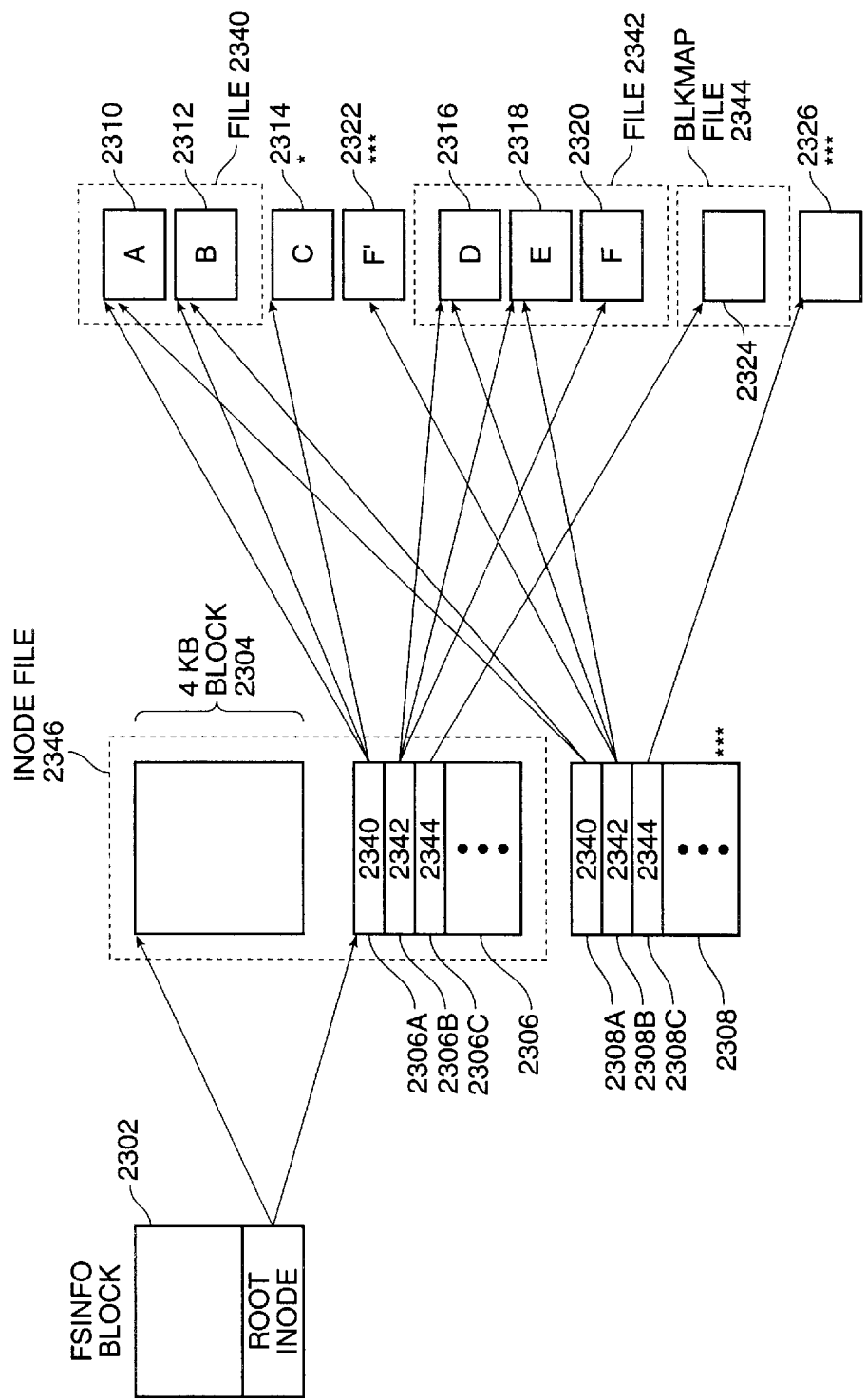

In step 640, the entries 2326A–2326L for each block 2304–2326 in the blkmap file 2344 are updated in FIG. 17J. Blocks that have not changed since the consistency point began in FIG. 17B have the same values in their entries. The entries are updated by copying BIT0 (FS-bit) to the consistency point bit (BIT31). Block 2306 is not part of the active file system, therefore BIT0 is equal to zero (BIT0 was turned off in step 620 when block 2308 was allocated to hold the new data for that part of the inode file). This is illustrated in FIG. 17J for entry 2326B. Similarly, entry 2326F for block 2314 of file 2340 has BIT0 and BIT31 equal to zero. Block 2320 of file 2342 and block 2324 of blkmap file 2344 are handled similarly as shown in entries 2362I and 2326K, respectively. In step 650, dirty block 2308 of inode file 2346 and dirty block 2326 of blkmap file 2344 are written to disk. This is indicated in FIG. 17K by a triple asterisk (\*\*\*) beside blocks 2308 and 2326.

Figure 17L:
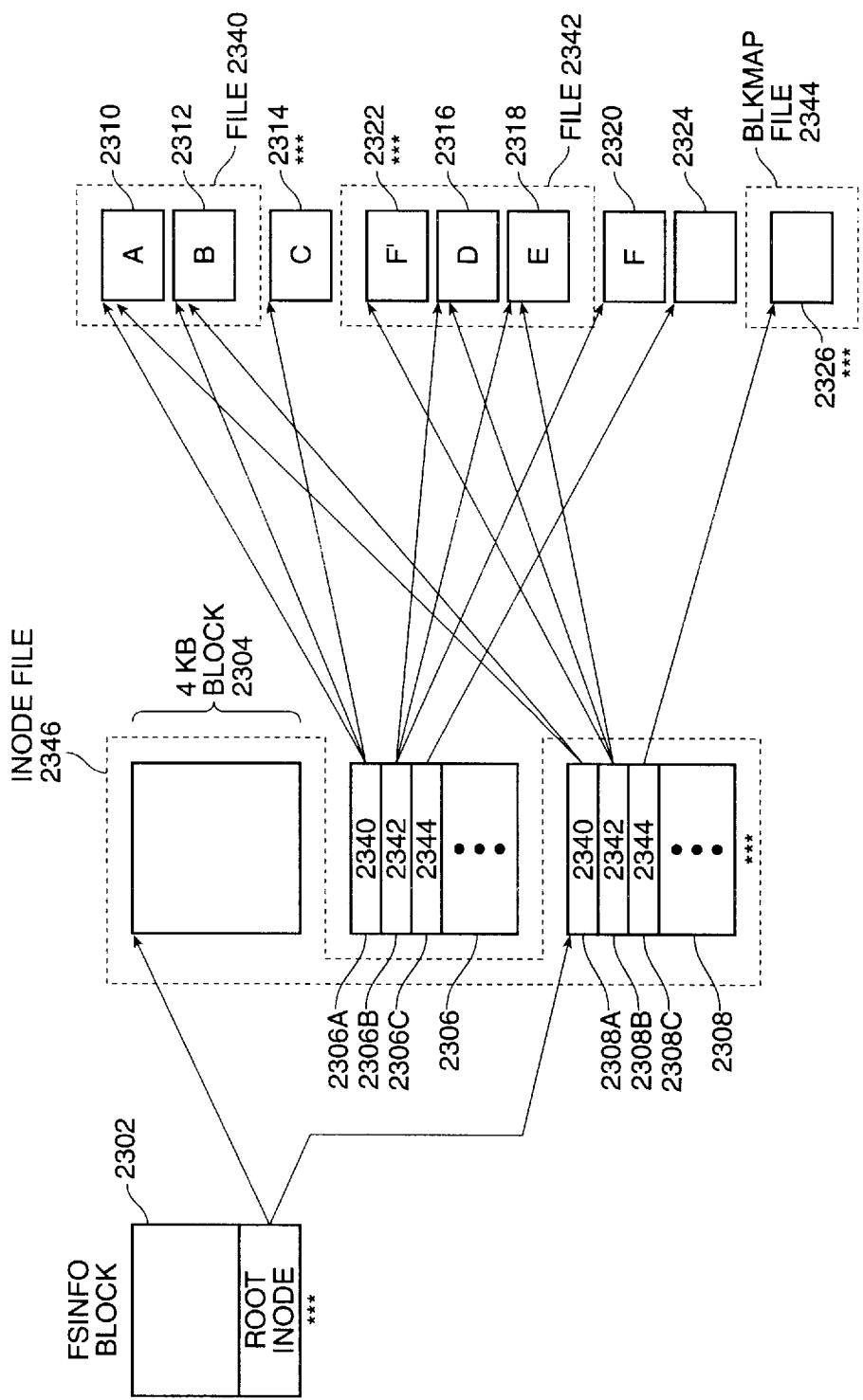

Referring to FIG. 5, in step 540, the file system information block 2302 is flushed to disk; this is performed twice. Thus, fsinfo block 2302 is dirtied and then written to disk (indicated by a triple asterisk) in FIG. 17L. In FIG. 17L, a single fsinfo block 2302 is illustrated. As shown in the diagram, fsinfo block 2302 now references block 2304 and 2308 of the inode file 2346. In FIG. 17L, block 2306 is no longer part of the inode file 2346 in the active file system. Similarly, file 2340 referenced by inode 2308A of inode file 2346 comprises blocks 2310 and 2312. Block 2314 is no longer part of file 2340 in this consistency point. File 2342 comprises blocks 2316, 2318, and 2322 in the new consistency point whereas block 2320 is not part of file 2342. Further, block 2308 of inode file 2346 references a new blkmap file 2344 comprising block 2326.

As shown in FIG. 17L, in a consistency point, the active file system is updated by copying the inode of the inode file 2346 into fsinfo block 2302. However, the blocks 2314, 2320, 2324, and 2306 of the previous consistency point remain on disk. These blocks are never overwritten when updating the file system to ensure that both the old consistency point 1830 and the new consistency point 1831 exist on disk in FIG. 20 during step 540

SNAPSHOTS

The WAFL system supports snapshots. A snapshot is a read-only copy of an entire file system at a given instant when the snapshot is created. A newly created snapshot refers to exactly the same disk blocks as the active file system does. Therefore, it is created in a small period of time and does not consume any additional disk space. Only as data blocks in the active file system are modified and written to new locations on disk does the snapshot begin to consume extra space.

WAFL supports up to 20 different snapshots that are numbered 1 through 20. Thus, WAFL allows the creation of multiple "clones" of the same file system. Each snapshot is represented by a snapshot inode that is similar to the representation of the active file system by a root inode. Snapshots are created by duplicating the root data structure of the file system. In the preferred embodiment, the root data structure is the root inode. However, any data structure representative of an entire file system could be used. The snapshot inodes reside in a fixed location in the inode file. The limit of 20 snapshots is imposed by the size of the blkmap entries. WAFL requires two steps to create a new snapshot N: copy the root inode into the inode for snapshot N; and, copy bit 0 into bit N of each blkmap entry in the blkmap file. Bit 0 indicates the blocks that are referenced by the tree beneath the root inode.

The result is a new file system tree rooted by snapshot inode N that references exactly the same disk blocks as the root inode. Setting a corresponding bit in the blkmap for each block in the snapshot prevents snapshot blocks from being freed even if the active file system no longer uses the snapshot blocks. Because WAFL always writes new data to unused disk locations, the snapshot tree does not change even though the active file system changes. Because a newly created snapshot tree references exactly the same blocks as the root inode, it consumes no additional disk space. Over time, the snapshot references disk blocks that would otherwise have been freed. Thus, over time the snapshot and the active file system share fewer and fewer blocks, and the space consumed by the snapshot increases. Snapshots can be deleted when they consume unacceptable numbers of disk blocks.

The list of active snapshots along with the names of the snapshots is stored in a meta-data file called the snapshot directory. The disk state is updated as described above. As with all other changes, the update occurs by automatically advancing from one consistency point to another. Modified blocks are written to unused locations on the disk after which a new root node describing the updated file system is written.

Overview of Snapshots

Figure 18A:
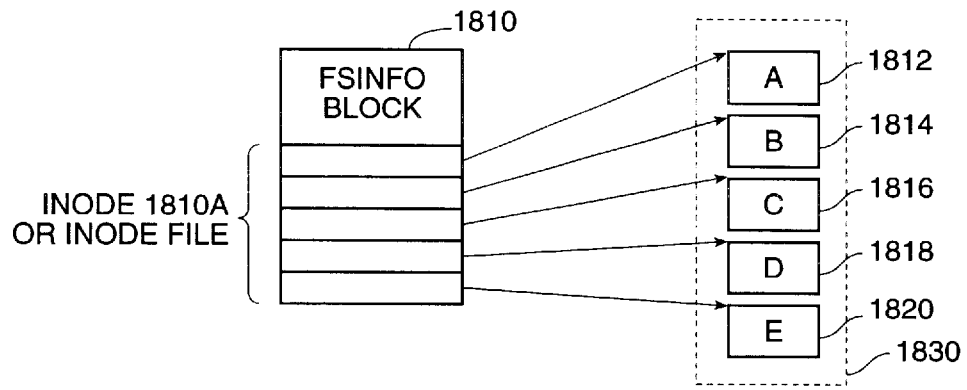
FIGS. 18A, 18B and 18C are diagrams illustrating generation of a snapshot.

FIG. 18A is a diagram of the file system 1830, before a snapshot is taken, where levels of indirection have been removed to provide a simpler overview of the WAFL file system. The file system 1830 represents the file system 1690 of FIG. 16. The file system 1830 is comprised of blocks 1812–1820. The inode of the inode file is contained in fsinfo block 1810. While a single copy of the fsinfo block 1810 is shown in FIG. 18A, it should be understood that a second copy of fsinfo block exists on disk. The inode 1810A contained in the fsinfo block 1810 comprises 16 pointers that point to 16 blocks having the same level of indirection. The blocks 1812–1820 in FIG. 18A represent all blocks in the file system 1830 including direct blocks, indirect blocks, etc. Though only five blocks 1812–1820 are shown, each block may point to other blocks.

Figure 18B:
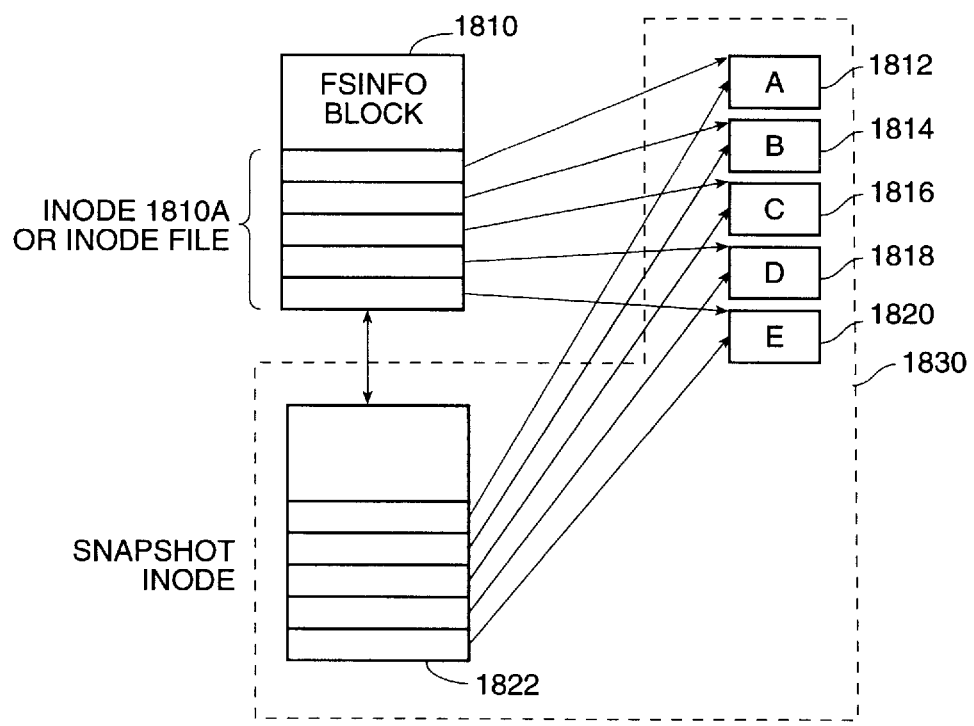

FIG. 18B is a diagram illustrating the creation of a snapshot. The snapshot is made for the entire file system 1830 by simply copying the inode 1810A of the inode file that is stored in fsinfo block 1810 into the snapshot inode 1822. By copying the inode 1810A of the inode file, a new file of inodes is created representing the same file system as the active file system. Because the inode 1810A of the inode file itself is copied, no other blocks 1812–1820 need to be duplicated. The copied inode or snapshot inode 1822, is then copied into the inode file, which dirties a block in the inode file. For an inode file comprised of one or more levels of indirection, each indirect block is in turn dirtied. This process of dirtying blocks propagates through all the levels of indirection. Each 4 KB block in the inode file on disk contains 32 inodes where each inode is 128 bytes long.

The new snapshot inode 1822 of FIG. 18B points back to the highest level of indirection blocks 1812–1820 referenced by the inode 1810A of the inode file when the snapshot 1822 was taken. The inode file itself is a recursive structure because it contains snapshots of the file system 1830. Each snapshot 1822 is a copy of the inode 1810A of the inode file that is copied into the inode file.

Figure 18C:
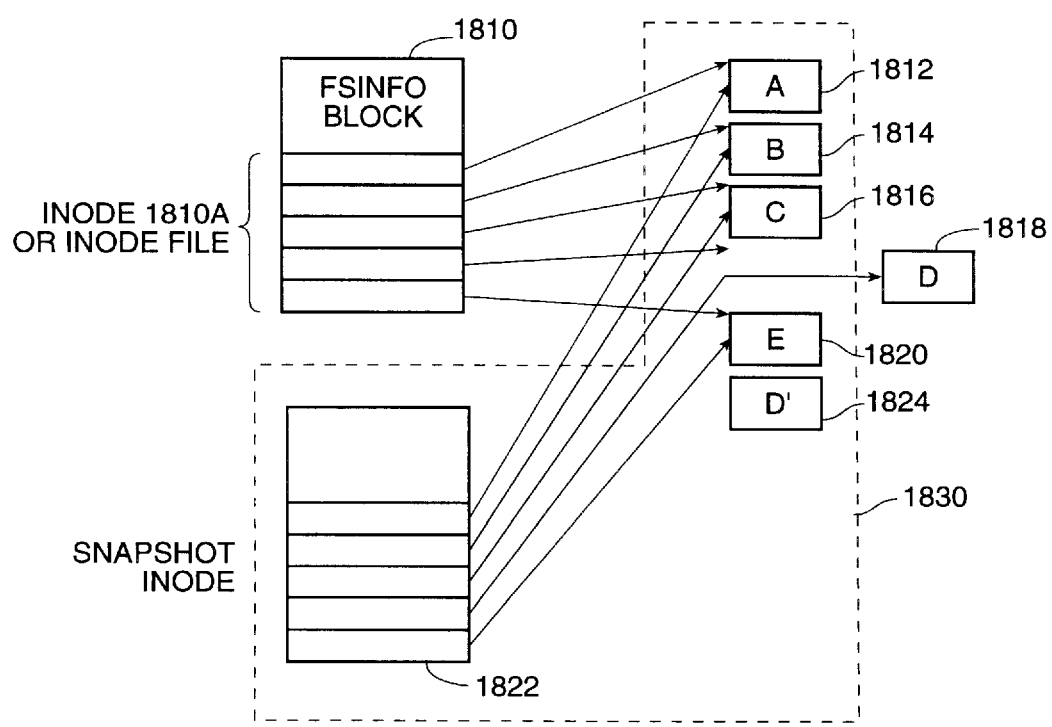

FIG. 18C is a diagram illustrating the active file system 1830 and a snapshot 1822 when a change to the active file system 1830 subsequently occurs after the snapshot 1822 is taken. As illustrated in the diagram, block 1818 comprising data "D" is modified after the snapshot was taken (in FIG. 18B), and therefore a new block 1824 containing data "$D_{prime}$" is allocated for the active file system 1830. Thus, the active file system 1830 comprises blocks 1812–1816 and 1820–1824 but does not contain block 1818 containing data "D". However, block 1818 containing data "D" is not overwritten because the WAFL system does not overwrite blocks on disk. The block 1818 is protected against being overwritten by a snapshot bit that is set in the blkmap entry for block 1818. Therefore, the snapshot 1822 still points to the unmodified block 1818 as well as blocks 1812–1816 and 1820. The present invention, as illustrated in FIGS. 18A–18C, is unlike prior art systems that create "clones" of a file system where a clone is a copy of all the blocks of an inode file on disk. Thus, the entire contents of the prior art inode files are duplicated requiring large amounts (MB) of disk space as well as requiring substantial time for disk I/O operations.

As the active file system 1830 is modified in FIG. 18C, it uses more disk space because the file system comprising blocks 1812–1820 is not overwritten. In FIG. 18C, block 1818 is illustrated as a direct block. However, in an actual file system, block 1818 may be pointed to by indirect blocks as well. Thus, when block 1818 is modified and stored in a new disk location as block 1824, the corresponding direct and indirect blocks are also copied and assigned to the active file system 1830.

Figure 19:
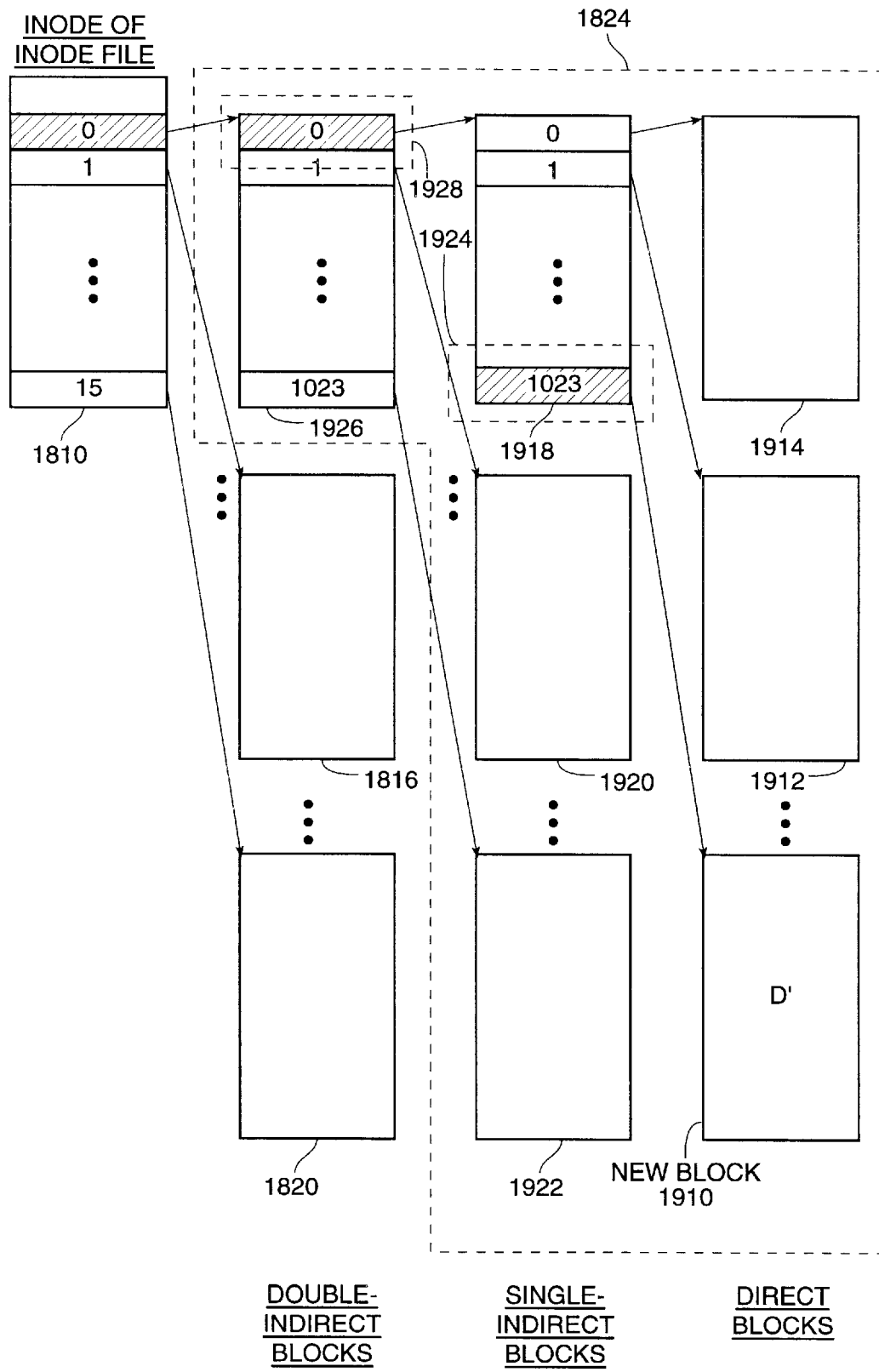
FIG. 19 is a diagram illustrating changes to an inode file.

FIG. 19 is a diagram illustrating the changes that occur in block 1824 of FIG. 18C. Block 1824 of FIG. 18C is represented within dotted line 1824 in FIG. 19. FIG. 19 illustrates several levels of indirection for block 1824 of FIG. 18C. The new block 1910 that is written to disk in FIG. 18C is labeled 1910 in FIG. 19. Because block 1824 comprises a data block 1910 containing modified data that is referenced by double indirection, two other blocks 1918 and 1926 are also modified. The pointer 1924 of single-indirect block 1918 references new block 1910, therefore block 1918 must also be written to disk in a new location. Similarly, pointer 1928 of indirect block 1926 is modified because it points to block 1918. Therefore, as shown in FIG. 19, modifying a data block 1910 can cause several indirect blocks 1918 and 1926 to be modified as well. This requires blocks 1918 and 1926 to be written to disk in a new location as well.

Because the direct and indirect blocks 1910, 1918 and 1926 of data block 1824 of FIG. 18C have changed and been written to a new location, the inode in the inode file is written to a new block. The modified block of the inode file is allocated a new block on disk since data cannot be overwritten.

As shown in FIG. 19, block 1910 is pointed to by indirect blocks 1926 and 1918, respectively. Thus when block 1910 is modified and stored in a new disk location, the corresponding direct and indirect blocks are also copied and assigned to the active file system. Thus, a number of data structures must be updated. Changing direct block 1910 and indirection blocks 1918 and 1926 causes the blkmap file to be modified.

The key data structures for snapshots are the blkmap entries where each entry has multiple bits for a snapshot. This enables a plurality of snapshots to be created. A snapshot is a picture of a tree of blocks that is the file system (1830 of FIG. 18). As long as new data is not written onto blocks of the snapshot, the file system represented by the snapshot is not changed. A snapshot is similar to a consistency point.

The file system of the present invention is completely consistent as of the last time the fsinfo blocks 1810 and 1870 were written. Therefore, if power is interrupted to the system, upon restart the file system 1830 comes up in a consistent state. Because 8–32 MB of disk space are used in typical prior art "clone" of a 1 GB file system, clones are not conducive to consistency points or snapshots as is the present invention.

Figure 22:
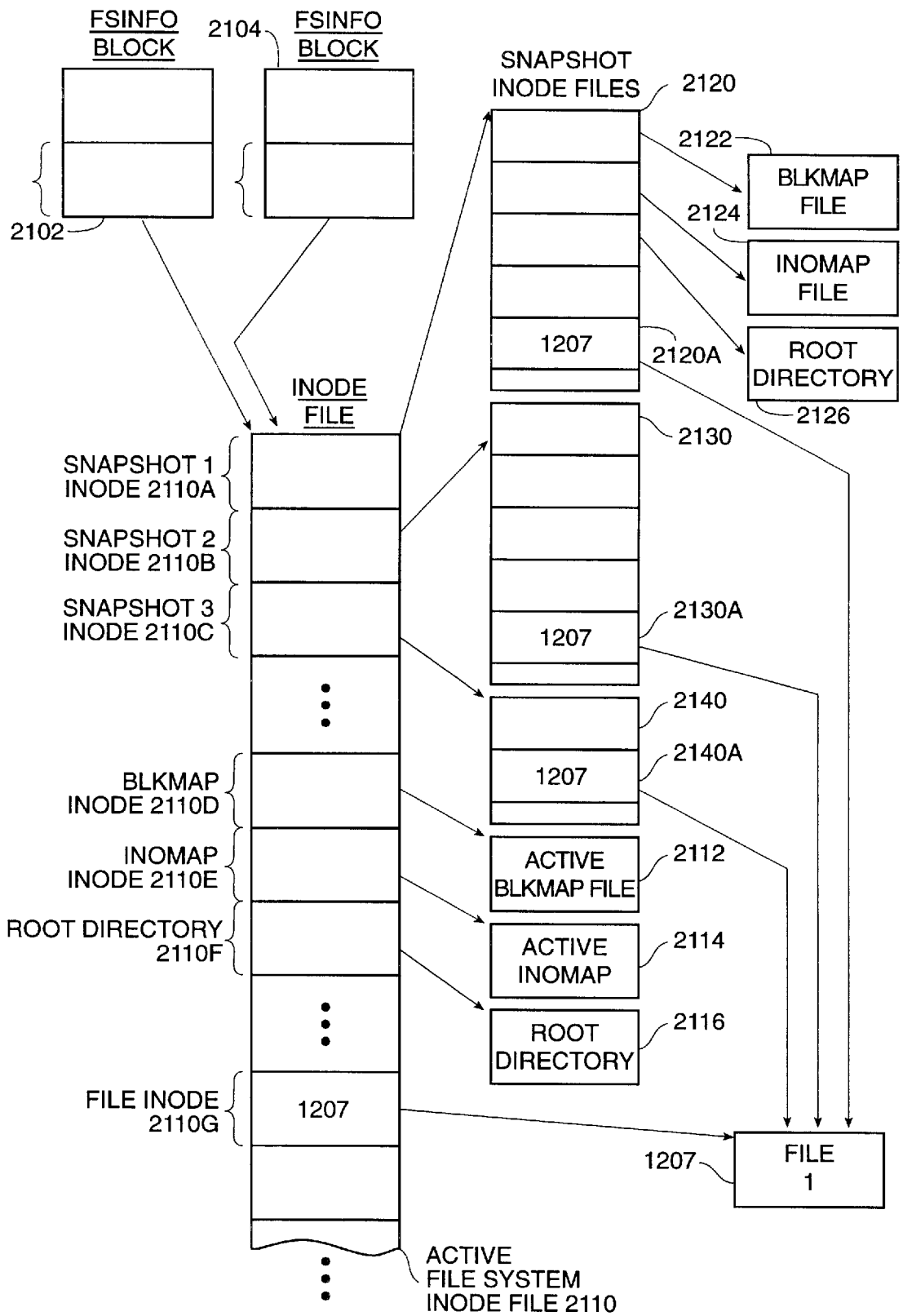
FIG. 22 is a diagram illustrating an active WAFL file system having three snapshots that each reference a common file.

Referring to FIG. 22, two previous snapshots 2110A and 2110B exist on disk. At the instant when a third snapshot is created, the root inode pointing to the active file system is copied into the inode entry 2110C for the third snapshot in the inode file 2110. At the same time in the consistency point that goes through, a flag indicates that snapshot 3 has been created. The entire file system is processed by checking if BIT0 for each entry in the blkmap file is set (1) or cleared (0). All the BIT0 values for each blkmap entry are copied into the plane for snapshot three. When completed, every active block 2110–2116 and 1207 in the file system is in the snapshot at the instant it is taken.

Blocks that have existed on disk continuously for a given length of time are also present in corresponding snapshots 2110A–2110B preceding the third snapshot 2110C. If a block has been in the file system for a long enough period of time, it is present in all the snapshots. Block 1207 is such a block. As shown in FIG. 22, block 1207 is referenced by inode 2210G of the active inode file, and indirectly by snapshots 1, 2 and 3.

The sequential order of snapshots does not necessarily represent a chronological sequence of file system copies. Each individual snapshot in a file system can be deleted at any given time, thereby making an entry available for subsequent use. When BIT0 of a blkmap entry that references the active file system is cleared (indicating the block has been deleted from the active file system), the block cannot be reused if any of the snapshot reference bits are set. This is because the block is part of a snapshot that is still in use. A block can only be reused when all the bits in the blkmap entry are set to zero.

Algorithm for Generating a Snapshot

Creating a snapshot is almost exactly like creating a regular consistency point as shown in FIG. 5. In step 510, all dirty inodes are marked as being in the consistency point. In step 520, all regular files are flushed to disk. In step 530, special files (i.e., the inode file and the blkmap file) are flushed to disk. In step 540, the fsinfo blocks are flushed to disk. In step 550, all inodes that were not in the consistency point are processed. FIG. 5 is described above in detail. In fact, creating a snapshot is done as part of creating a consistency point. The primary difference between creating a snapshot and a consistency point is that all entries of the blkmap file have the active FS-bit copied into the snapshot bit. The snapshot bit represents the corresponding snapshot in order to protect the blocks in the snapshot from being overwritten. The creation and deletion of a snapshot is performed in step 530 because that is the only point where the file system is completely self-consistent and about to go to disk.

Figure 7:
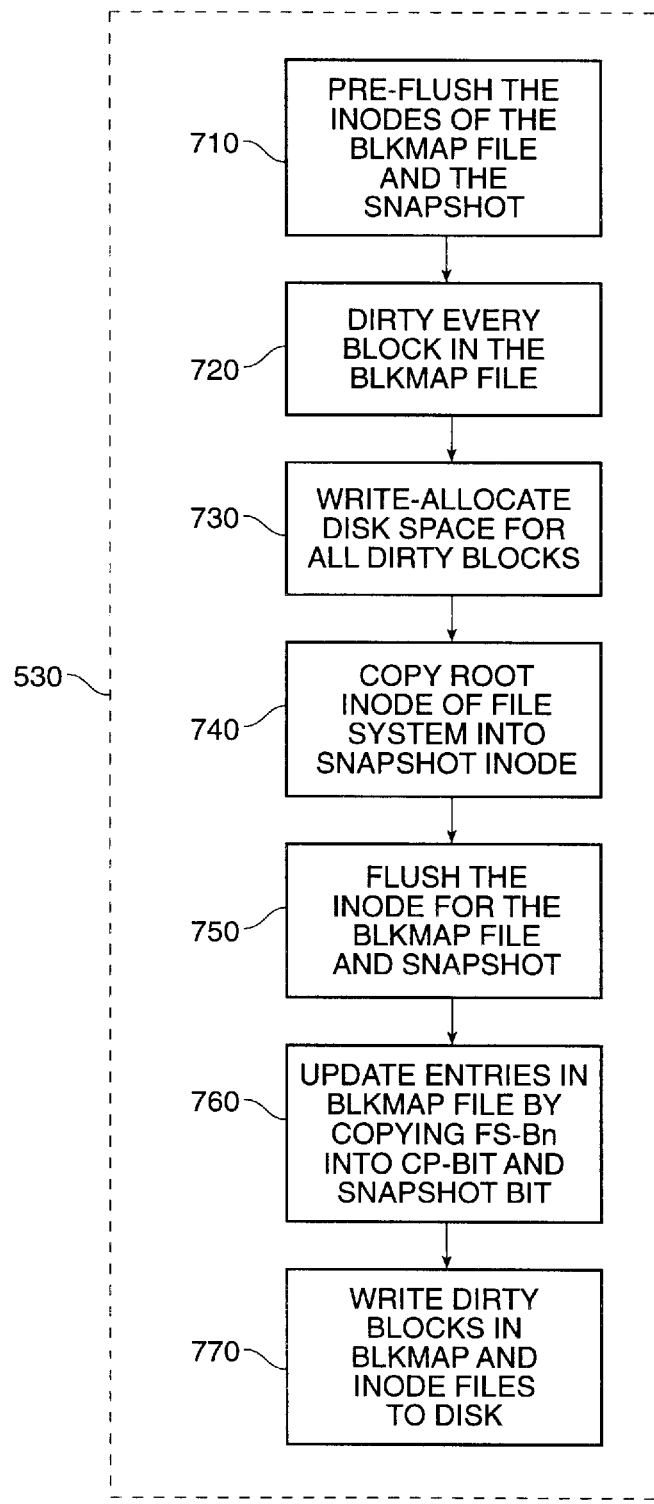
FIG. 7 is a flow diagram illustrating step 530 of FIG. 5 for creating a snapshot.

Different steps are performed in step 530 then illustrated in FIG. 6 for a consistency point when a new snapshot is created. The steps are very similar to those for a regular consistency point. FIG. 7 is a flow diagram illustrating the steps that step 530 comprises for creating a snapshot. As described above, step 530 allocates disk space for the blkmap file and the inode file and copies the active FS-bit into the snapshot bit that represents the corresponding snapshot in order to protect the blocks in the snapshot from being overwritten.

In step 710, the inodes of the blkmap file and the snapshot being created are pre-flushed to disk. In addition to flushing the inode of the blkmap file to a block of the inode file (as in step 610 of FIG. 6 for a consistency point), the inode of the snapshot being created is also flushed to a block of the inode file. This ensures that the block of the inode file containing the inode of the snapshot is dirty.

In step 720, every block in the blkmap file is dirtied. In step 760 (described below), all entries in the blkmap file are updated instead of just the entries in dirty blocks. Thus, all blocks of the blkmap file must be marked dirty here to ensure that step 730 write-allocates disk space for them.

In step 730, disk space is allocated for all dirty blocks in the inode and blkmap files. The dirty blocks include the block in the inode file containing the inode of the blkmap file, which is dirty, and the block containing the inode for the new snapshot.

In step 740, the contents of the root inode for the file system are copied into the inode of the snapshot in the inode file. At this time, every block that is part of the new consistency point and that will be written to disk has disk space allocated for it. Thus, duplicating the root inode in the snapshot inode effectively copies the entire active file system. The actual blocks that will be in the snapshot are the same blocks of the active file system.

In step 750, the inodes of the blkmap file and the snapshot are copied to into the inode file.

In step 760, entries in the blkmap file are updated. In addition to copying the active FS-bit to the CP-bit for the entries, the active FS-bit is also copied to the snapshot bit corresponding to the new snapshot.

In step 770, all dirty blocks in the blkmap and inode files are written to disk.

Finally, at some time, snapshots themselves are removed from the file system in step 760. A snapshot is removed from the file system by clearing its snapshot inode entry in the inode file of the active file system and clearing each bit corresponding to the snapshot number in every entry in the blkmap file. A count is performed also of each bit for the snapshot in all the blkmap entries that are cleared from a set value, thereby providing a count of the blocks that are freed (corresponding amount of disk space that is freed) by deleting the snapshot. The system decides which snapshot to delete on the basis of the oldest snapshots. Users can also choose to delete specified snapshots manually.

The present invention limits the total number of snapshots and keeps a blkmap file that has entries with multiple bits for tracking the snapshots instead of using pointers having a COW bit as in Episode. An unused block has all zeroes for the bits in its blkmap file entry. Over time, the BIT0 for the active file system is usually turned on at some instant. Setting BIT0 identifies the corresponding block as allocated in the active file system. As indicated above, all snapshot bits are initially set to zero. If the active file bit is cleared before any snapshot bits are set, the block is not present in any snapshot stored on disk. Therefore, the block is immediately available for reallocation and cannot be recovered subsequently from a snapshot.

Generation of a Snapshot

As described previously, a snapshot is very similar to a consistency point. Therefore, generation of a snapshot is described with reference to the differences between it and the generation of a consistency point shown in FIGS. 17A–17L. FIGS. 21A–21F illustrate the differences for generating a snapshot.

FIGS. 17A–17D illustrate the state of the WAFL file system when a snapshot is begun. All dirty inodes are marked as being in the consistency point in step 510 and regular files are flushed to disk in step 520. Thus, initial processing of a snapshot is identical to that for a consistency point. Processing for a snapshot differs in step 530 from that for a consistency point. The following describes processing of a snapshot according to FIG. 7.

The following description is for a second snapshot of the WAFL file system. A first snapshot is recorded in the blkmap entries of FIG. 17C. As indicated in entries 2324A–2324M, blocks 2304–2306, 2310–2320, and 2324 are contained in the first snapshot. All other snapshot bits (BIT1–BIT20) are assumed to have values of 0 indicating that a corresponding snapshot does not exist on disk. FIG. 21A illustrates the file system after steps 510 and 520 are completed.

In step 710, inodes 2308C and 2308D of snapshot 2 and blkmap file 2344 are pre-flushed to disk. This ensures that the block of the inode file that is going to contain the snapshot 2 inode is dirty. In FIG. 21B, inodes 2308C and 2308D are pre-flushed for blkmap file 2344 and snapshot 2. Buffer 2308 is already marked with an asterisk because inodes 2308A and 2308B are dirty in FIG. 21A.

In step 720, the entire blkmap file 2344 is dirtied as illustrated in FIG. 21B, where block 2326 is marked with an asterisk. This will cause the entire blkmap file 2344 to be allocated disk space in step 730. In step 730, disk space is allocated for dirty blocks 2308 and 2326 for inode file 2346 and blkmap file 2344 as shown in FIG. 21C. This is indicated by a double asterisk () beside blocks 2308 and 2326. This is different from generating a consistency point where disk space is allocated only for blocks having entries that have changed in the blkmap file 2344 in step 620 of FIG. 6. Blkmap file 2344 of FIG. 21C comprises a single block 2324. However, when blkmap file 2344 comprises more than one block, disk space is allocated for all the blocks in step 730**.

In step 740, the root inode for the new file system is copied into inode 2308D for snapshot 2. In step 750, the inodes 2308C and 2308D of blkmap file 2344 and snapshot 2 are flushed to the inode file as illustrated in FIG. 21D. The diagram illustrates that snapshot 2 inode 2308D references blocks 2304 and 2308 but not block 2306.

Figure 21E:
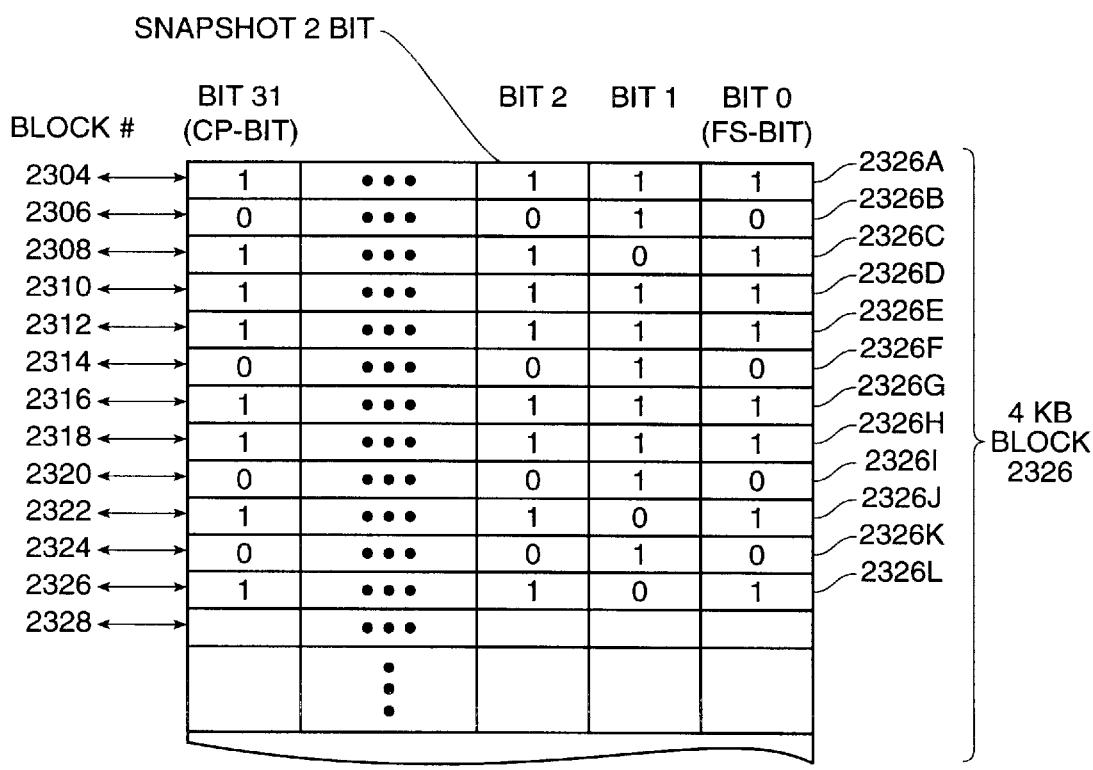
FIGS. 21A, 21B, 21C, 21D, 21E and 21F are detailed diagrams illustrating the generation of a snapshot.
Figure 21A:
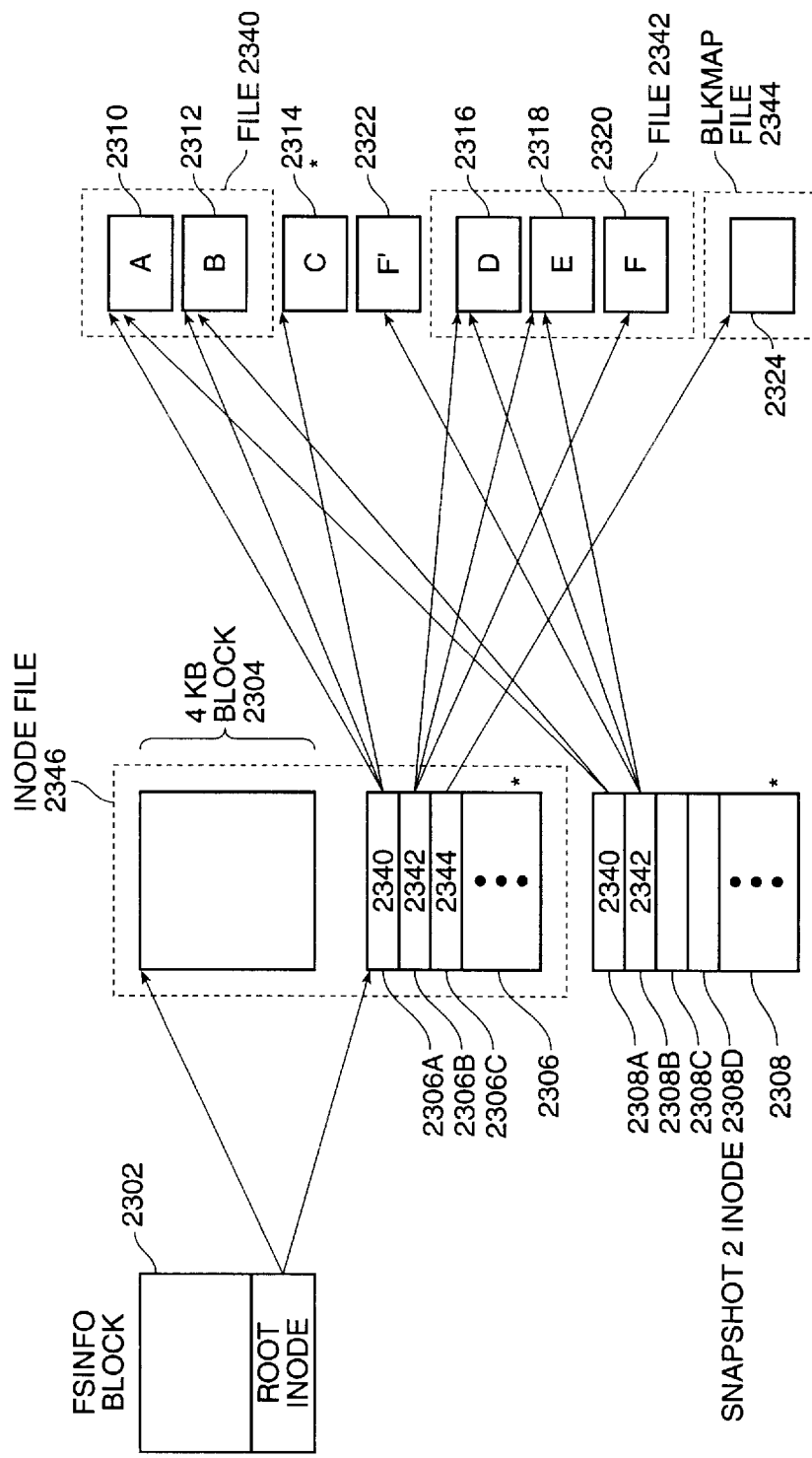
Figure 21B:
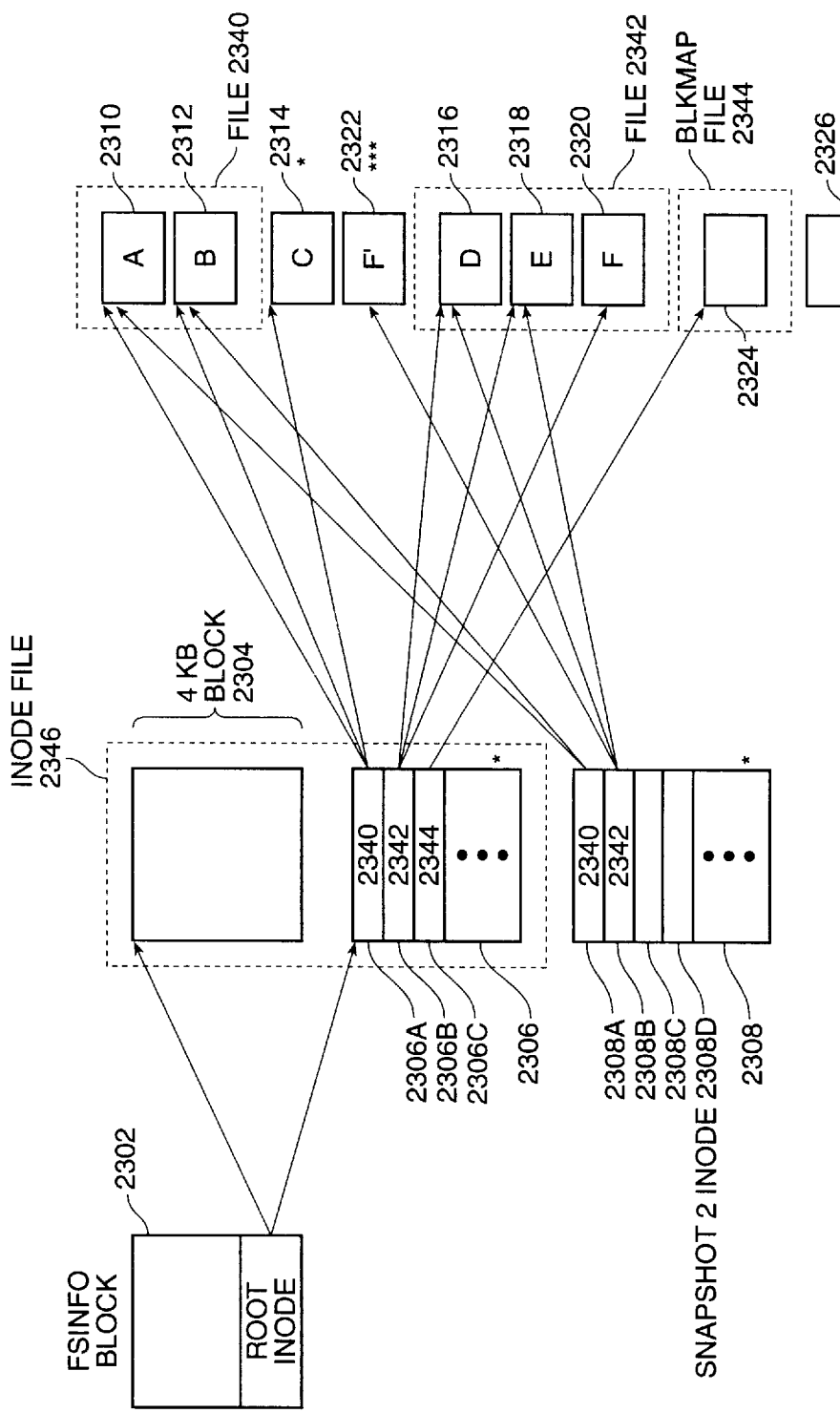
Figure 21C:
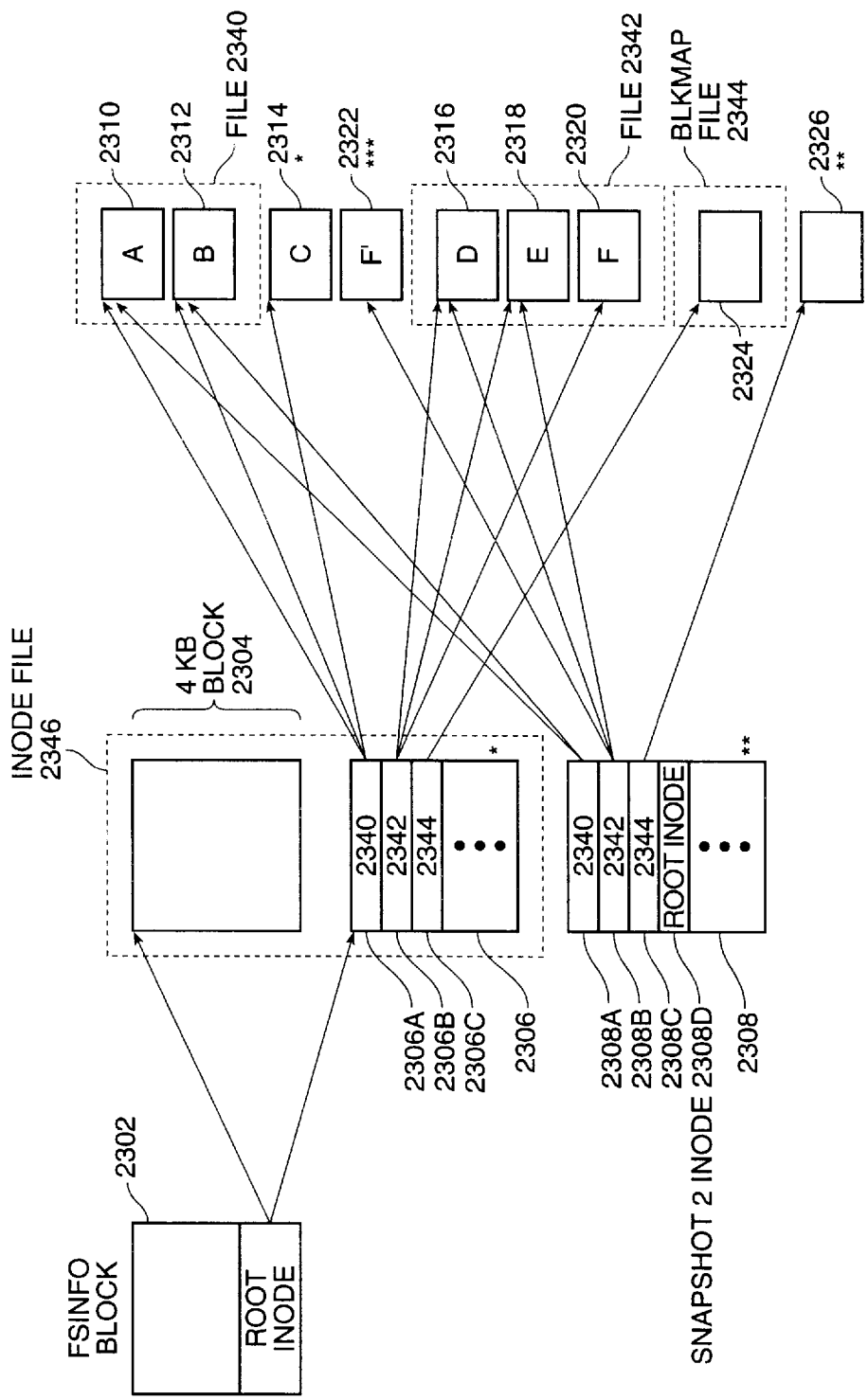
Figure 21D:
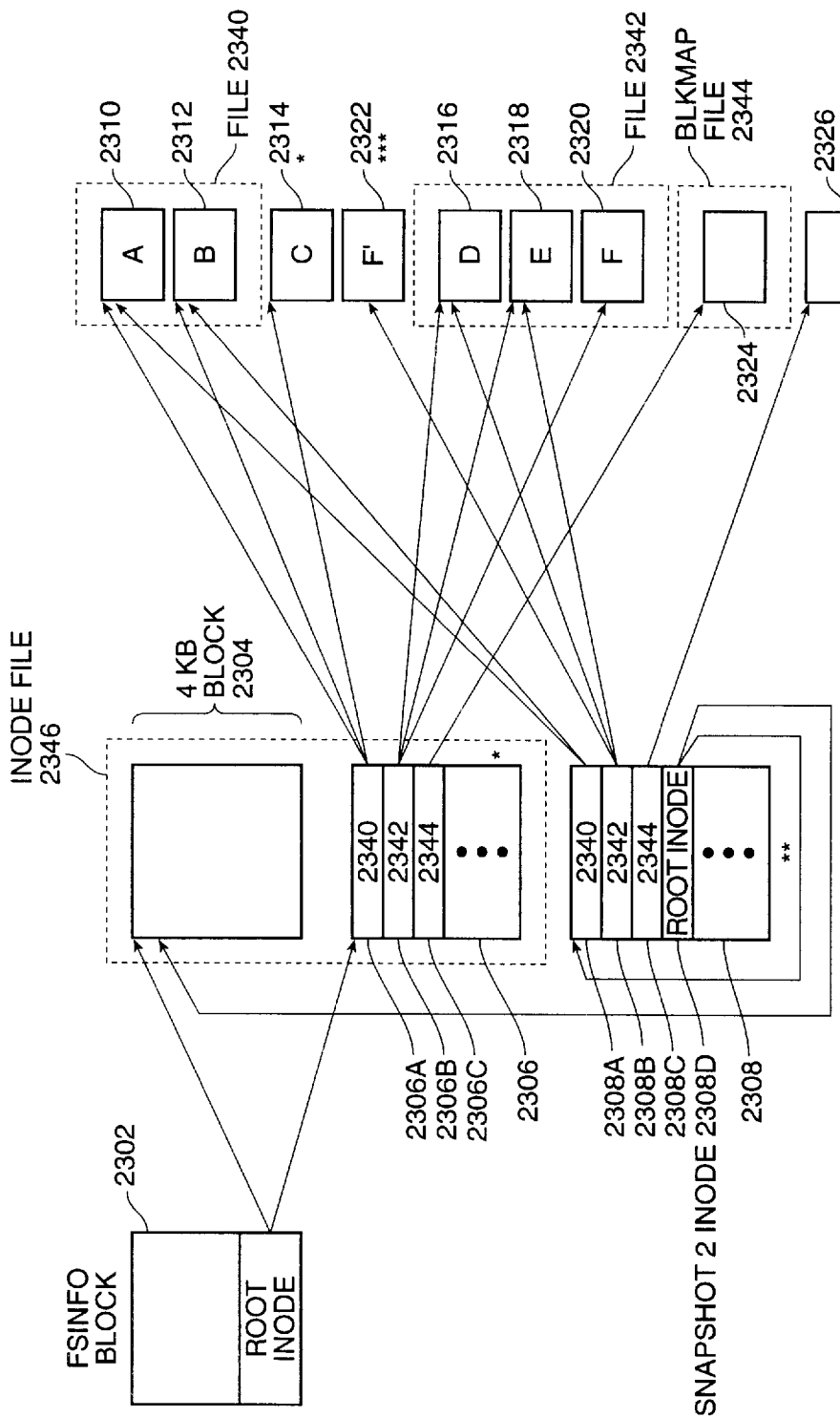
Figure 21F:
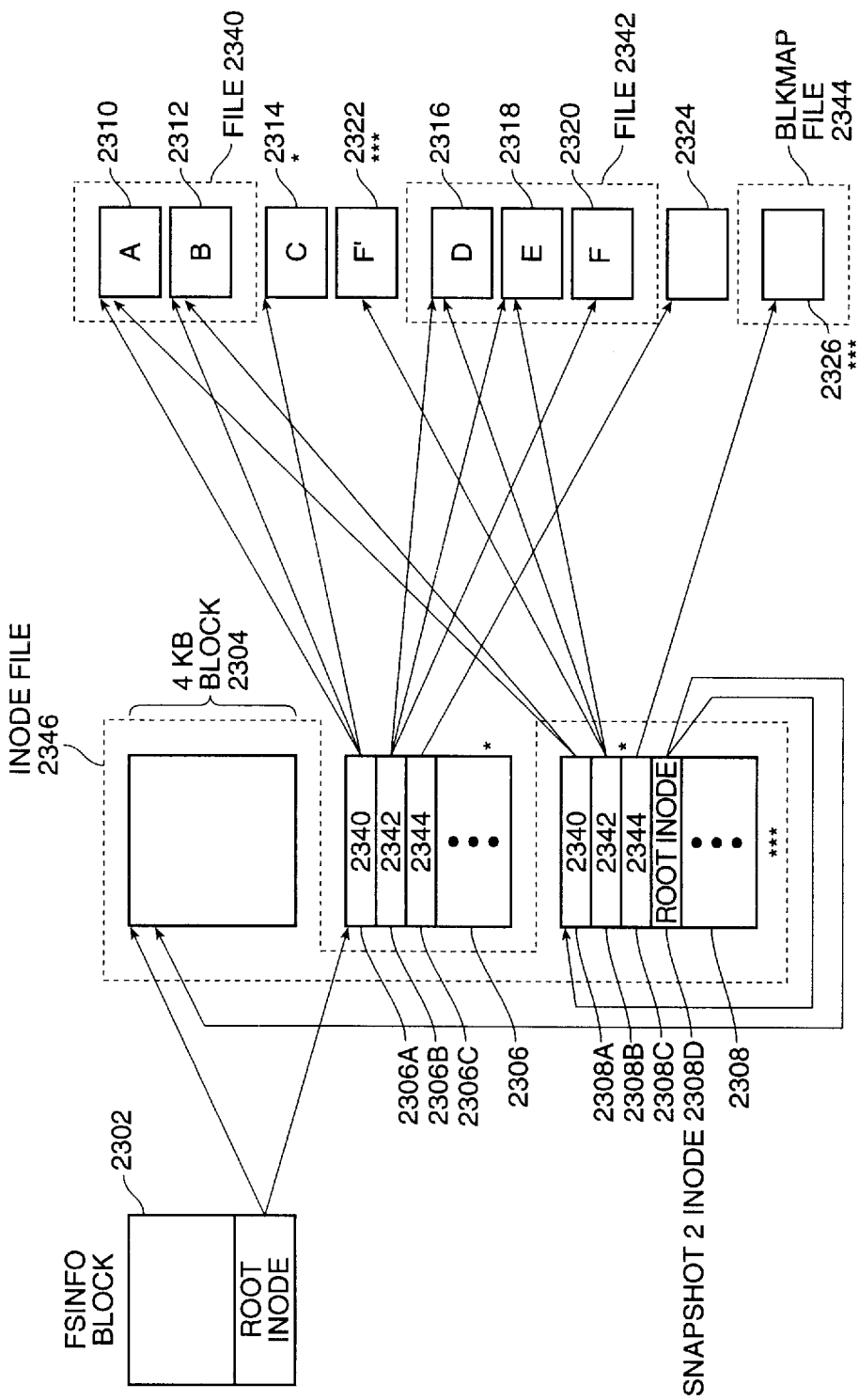

In step 760, entries 2326A–2326L in block 2326 of the blkmap file 2344 are updated as illustrated in FIG. 21E. The diagram illustrates that the snapshot 2 bit (BIT2) is updated as well as the FS-BIT and CP-BIT for each entry 2326A–2326L. Thus, blocks 2304, 2308–2312, 2316–2318, 2322, and 2326 are contained in snapshot 2 whereas blocks 2306, 2314, 2320, and 2324 are not. In step 770, the dirty blocks 2308 and 2326 are written to disk, as indicated in FIG. 21F.

Further processing of snapshot 2 is identical to that for generation of a consistency point illustrated in FIG. 5. In step 540, the two fsinfo blocks are flushed to disk. Thus, FIG. 21F represents the WAFL file system in a consistent state after this step. Files 2340, 2342, 2344, and 2346 of the consistent file system, after step 540 is completed, are indicated within dotted lines in FIG. 21F. In step 550, the consistency point is completed by processing inodes that were not in the consistency point.

Access Time Overwrites

Unix file systems must maintain an "access time" (atime) in each inode. Atime indicates the last time that the file was read. It is updated every time the file is accessed. Consequently, when a file is read the block that contains the inode in the inode file is rewritten to update the inode. This could be disadvantageous for creating snapshots because, as a consequence, reading a file could potentially use up disk space. Further, reading all the files in the file system could cause the entire inode file to be duplicated. The present invention solves this problem.

Because of atime, a read could potentially consume disk space since modifying an inode causes a new block for the inode file to be written on disk. Further, a read operation could potentially fail if a file system is full which is an abnormal condition for a file system to have occur.

Figure 23A:
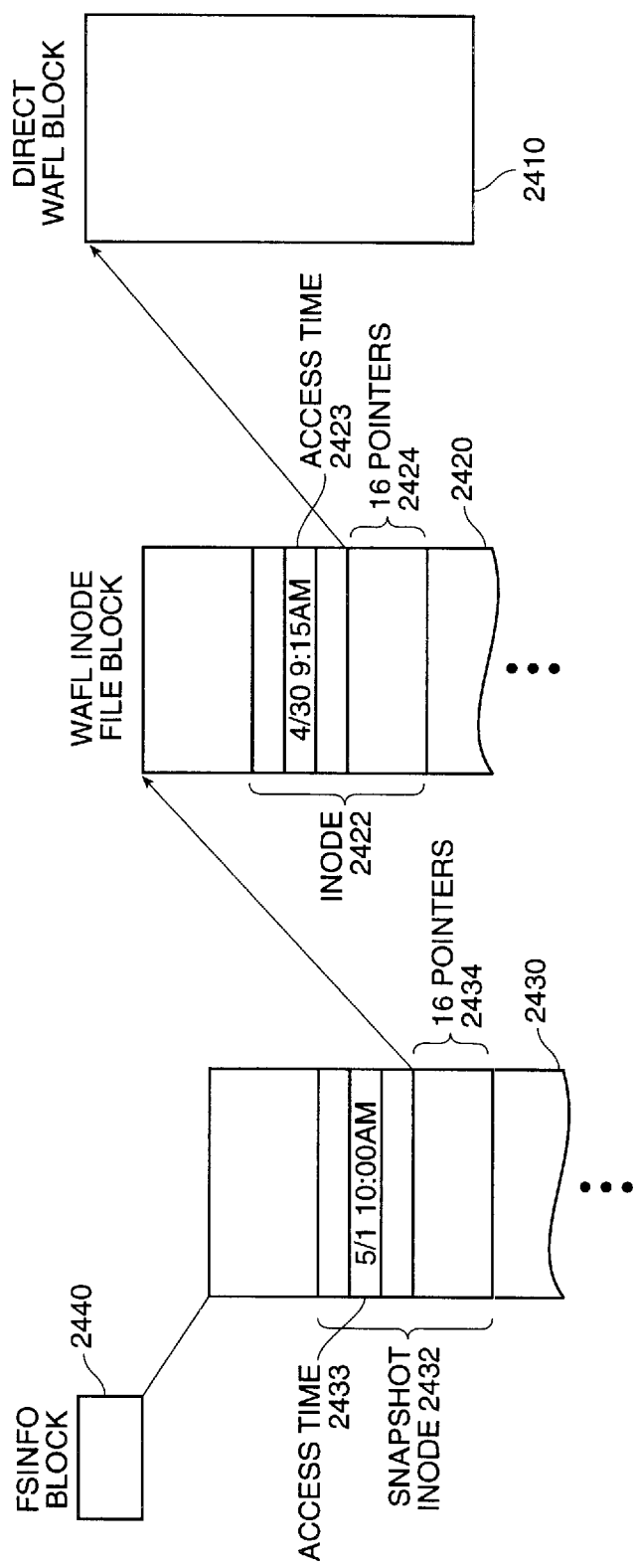
FIGS. 23A and 23B are diagrams illustrating the updating of atime.
Figure 23B:
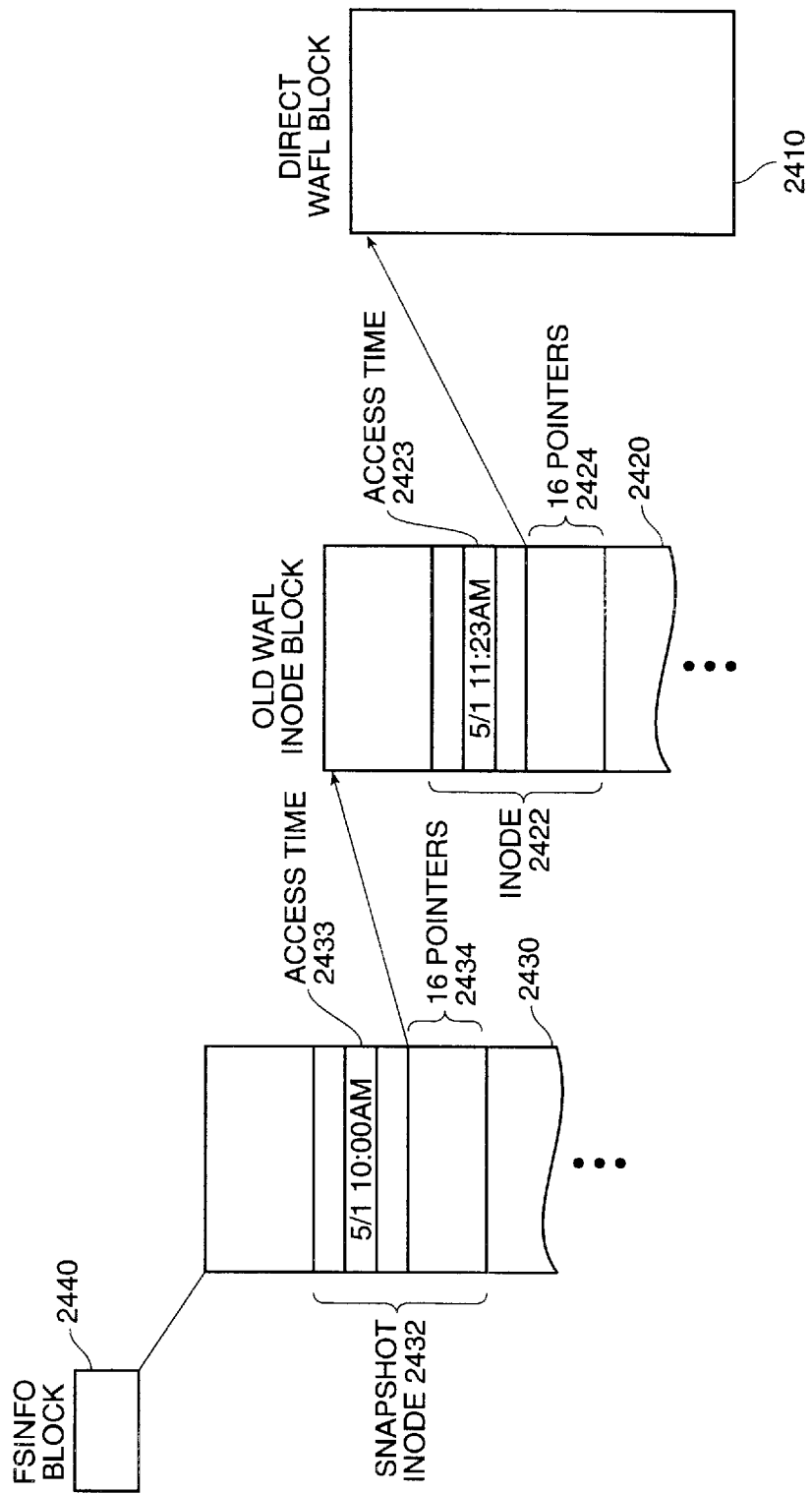

In general, data on disk is not overwritten in the WAFL file system so as to protect data stored on disk. The only exception to this rule is atime overwrites for an inode as illustrated in FIGS. 23A–23B. When an "atime overwrites" occurs, the only data that is modified in a block of the inode file is the atime of one or more of the inodes it contains and the block is rewritten in the same location. This is the only exception in the WAFL system; otherwise new data is always written to new disk locations.

In FIG. 23A, the atimes 2423 and 2433 of an inode 2422 in an old WAFL inode file block 2420 and the snapshot inode 2432 that references block 2420 are illustrated. Inode 2422 of block 2420 references direct block 2410. The atime 2423 of inode 2422 is "4/30 9:15 PM" whereas the atime 2433 of snapshot inode 2432 is "5/1 10:00 AM". FIG. 23A illustrates the file system before direct buffer 2410 is accessed.

FIG. 23B illustrates the inode 2422 of direct block 2410 after direct block 2410 has been accessed. As shown in the diagram, the access time 2423 of inode 2422 is overwritten with the access time at which direct block 2410 was accessed. Thus, the access time 2423 of inode 2422 for direct block 2410 is "5/1 11:23 AM".

Allowing inode file blocks to be overwritten with new atimes produces a slight inconsistency in the snapshot. The atime of a file in a snapshot can actually be later than the time that the snapshot was created. In order to prevent users from detecting this inconsistency, WAFL adjusts the atime of all files in a snapshot to the time when the snapshot was actually created instead of the time a file was last accessed. This snapshot time is stored in the inode that describes the snapshot as a whole. Thus, when accessed via the snapshot, the access time 2423 for inode 2422 is always reported as "5/1 10:00AM". This occurs both before the update when it may be expected to be "4/30 9:15PM", and after the update when it may be expected to be "5/1 11:23AM". When accessed through the active file system, the times are reported as "4/30 9:15PM" and "5/1 11:23AM" before and after the update, respectively.

In this manner, a method is disclosed for maintaining a file system in a consistent state and for creating read-only copies of the file system.

We claim:

1. A method for recording a plurality of data about a plurality of blocks of data stored in storage means comprising the steps of:

maintaining a means for recording multiple usage bits per block of said storage means, wherein one bit of said multiple bits per block for each of said blocks indicates a block's membership in an active file system and one or more bits indicated membership in one or more read-only copies of a file system; and storing in said means for recording multiple usage bits per block multiple bits for each of a plurality of said blocks of said storage means.

2. A method for maintaining a file system stored in non-volatile storage means at successive consistency points said file system comprising blocks of data, said blocks of data comprising blocks of regular file data and blocks of meta-data file data referencing said blocks of data of said file system, said meta file data comprising a file system information structure comprising data describing said file system at a first consistency point said computer system further comprising memory means, said method comprising the steps of:

maintaining a plurality of modified blocks of regular file data and meta-data file data in said memory means, said modified blocks of data comprising blocks of data modified from said first consistency point;

designating as dirty blocks of meta-data file data referencing said modified blocks of regular file data and meta-data file data, said dirty blocks of meta-data file data comprising blocks of meta-data file data to be included in a second consistency point;

copying said modified blocks of regular file data referenced by said dirty blocks of meta-data file data to free blocks of said non-volatile storage means;

copying blocks comprising said modified blocks of meta-data file data referenced by said dirty blocks of meta-data file data to free blocks of said non-volatile storage means;

modifying a copy of said file system information structure maintained in said memory means to reference said dirty blocks of meta-data file data:

copying said modified file system information structure to said non-volatile storage means.

3. The method of claim 2 wherein said blocks of meta-file data comprise one or more blocks of inode file data and one or more blocks of blockmap file data and wherein said step of copying said modified blocks of meta-data file data to free blocks of said non-volatile storage means further comprises the steps of:

copying an inode referencing one or more blocks of blockmap file data to a block of inode file data maintained in said memory means;

allocating free blocks of said non-volatile storage means for said block of inode file data and one or more modified blocks of blockmap file data:

updating said inode referencing said one or more blocks of blockmap file data to reference said one or more free blocks of said non-volatile storage means allocated to said one or more modified blocks of blockmap file data;

copying said updated inode to said block of inode file data;

updating said one or more blocks of blockmap file data;

writing said updated one or more blocks of blockmap file data and said block of inode file data to said allocated free blocks of said non-volatile storage means.

4. A method for maintaining a file system comprising blocks of data stored in blocks of a non-volatile storage means at successive consistency points comprising the steps of:

storing a first file system information structure for a first consistency point in said non-volatile storage means, said first file system information structure comprising data describing a layout of said file system at said first consistency point of said file system;

writing blocks of data of said file system that have been modified from said first consistency point as of the commencement of a second consistency point to free blocks of said non-volatile storage means;

storing in said non-volatile storage means a second file system information structure for said second consistency point, said second file system information structure comprising data describing a layout said file system at said second consistency point of said file system.

5. The method of claim 4 wherein said step of storing said first file system information structure in said non-volatile storage means comprises the step of:

storing first and second copies of said first file system information structure at first and second locations respectively of said non-volatile storage means;

and wherein said step of storing said second file system information structure in said non-volatile storage means comprises the steps of:

overwriting said first copy of said first file system information structure with a first copy of said second file system information structure; and overwriting said second copy of said first file system information structure with a second copy of said second file system information structure.

6. The method of claim 5 wherein said first and second locations of said non-volatile storage means comprise fixed predetermined locations of said non-volatile storage means.

7. The method of claim 5 wherein each copy of said file system information structure comprises means for determining a most recent version of said file system information structure and means for determining validity of said file system information structure, further comprising the steps of:

after a system failure, reading said first and second copies of said file system information structure from said first and second locations of said non-volatile storage means;

determining a most recent valid file system information structure from said first and second copies of said file system information structure.

8. A method for creating a plurality of read-only copies of a file system stored in blocks of a non-volatile storage means, said file system comprising meta-data identifying blocks of said non-volatile storage means used by said file system, comprising the steps of:

storing meta-data for successive states of said file system in said non-volatile storage means;

making a copy of said meta-data at each of a plurality of said states of said file system;

for each of said copies of said meta-data at a respective state of said file system, marking said blocks of said non-volatile storage means identified in said meta-data as comprising a respective read-only copy of said file system.

9. The method of claim 8 wherein said step of marking said blocks comprising a respective read-only copy of said file system comprises placing an appropriate entry in a means for recording multiple usage bits per block of said non-volatile storage means.

10. The method of claim 9 wherein said means for recording multiple usage bits per block of said non-volatile storage means comprises a blockmap comprising multiple bit entries for each block.

11. The method of claim 8 wherein said meta-data comprises pointers to a hierarchical tree of blocks comprising said file system.

12. The method of claim 8 wherein said meta-data comprises structures representing files of said file system.

13. The method of claim 12 wherein said structures representing files of said file system comprise inodes.

14. The method of claim 8 further comprising the step of:

preventing overwriting of said blocks marked as belonging to a read-only copy of said file system.

15. The method of claim 8 comprising the step of unmarking said blocks marked as belonging to a read only copy of said file system when said read only copy of said file system is no longer needed.

16. The method of claim 8 wherein a plurality of said blocks marked as belonging to a read-only copy of said file system comprise data ancillary to said file system, said method further including the steps of:

allowing said ancillary data to be overwritten; and otherwise preventing overwriting of said blocks marked as comprising a read only copy of said file system.

17. The method of claim 16 wherein said ancillary data comprises access time data.

18. The method of claim 8 wherein said meta-data comprises a root structure referencing structures representing files of said file system, and wherein said copies of said meta-data comprise copies of said root structure.

19. The method of claim 18 wherein said root structure comprises a root inode.

20. The method of claim 8 further comprising the step of using one or more of said read-only copies of said file system to back-up said blocks comprising one or more consistency points of said file system.

* * * * *

UNITED STATES PATENT AND TRADEMARK OFFICE
CERTIFICATE OF CORRECTION

PATENT NO : 5, 819, 292
DATED : October 6, 1998
INVENTOR(S) : David Hitz, Michael Malcolm, James Lau, Byron Rakitzis It is certified that error appears in the above-identified patent and that said Letters Patent is hereby corrected as shown below:

In the claims, on page 24, replace claim 1 with the following:

1. A method for recording a plurality of data about a plurality of blocks of data stored in storage means comprising the steps of:

maintaining a means for recording multiple usage bits per block of said storage means;

storing, in said means for recording multiple usage bits per block, multiple bits for each of said plurality of said blocks of said storage means; and reusing at least one of said plurality of blocks of data in response to at least one of said multiple usage bits.

Signed and Sealed this

Fourteenth Day of March, 2000

Attest:

Q. TODD DICKINSON

*Attesting Officer*  *Commissioner of Patents and Trademarks*

(12) EX PARTE REEXAMINATION CERTIFICATE (9473rd)
United States Patent
Hitz et al.

(10) Number: US 5,819,292 C1
(45) Certificate Issued: Jan. 11, 2013

(54) METHOD FOR MAINTAINING CONSISTENT STATES OF A FILE SYSTEM AND FOR CREATING USER-ACCESSIBLE READ-ONLY COPIES OF A FILE SYSTEM

(75) Inventors: David Hitz, Sunnyvale, CA (US); Michael Malcolm, Los Altos, CA (US); James Lau, Cupertino, CA (US); Byron Rakitzis, Mountain View, CA (US)

(73) Assignee: Network Appliance, Inc., Mtn. View, CA (US)

Reexamination Request:
No. 90/008,903, Dec. 26, 2007
No. 90/009,103, Apr. 4, 2008

Reexamination Certificate for:
Patent No.: 5,819,292
Issued: Oct. 6, 1998
Appl. No.: 08/454,921
Filed: May 31, 1995

Certificate of Correction issued Mar. 14, 2000.

Related U.S. Application Data

(63) Continuation of application No. 08/071,643, filed on Jun. 3, 1993, now abandoned.

(51) Int. Cl.
*G06F 17/00* (2006.01)

(52) U.S. Cl. ... 707/999.202; 707/999.203; 714/E11.136

(58) Field of Classification Search ........................ None
See application file for complete search history.

(56) References Cited

To view the complete listing of prior art documents cited during the proceedings for Reexamination Control Numbers 90/008,903 and 90/009,103, please refer to the USPTO's public Patent Application Information Retrieval (PAIR) system under the Display References tab.

*Primary Examiner* — Woo H Choi

(57) ABSTRACT

A method is disclosed for maintaining consistent states of a file system. The file system progresses from one self-consistent state to another self-consistent state. The set of self-consistent blocks on disk that is rooted by a root inode is referred to as a consistency point. The root inode is stored in a file system information structure. To implement consistency points, new data is written to unallocated blocks on disk. A new consistency point occurs when the file system information structure is updated by writing a new root inode into it. Thus, as long as the root inode is not updated, the state of the file system represented on disk does not change. The method also creates snapshots that are user-accessible read-only copies of the file system. A snapshot uses no disk space when it is initially created. It is designed so that many different snapshots can be created for the same file system. Unlike prior art file systems that create a done by duplicating an entire inode file and all indirect blocks, the method of the present invention duplicates only the inode that describes the inode file. A multi-bit free-block map file is used to prevent data referenced by snapshots from being overwritten on disk.

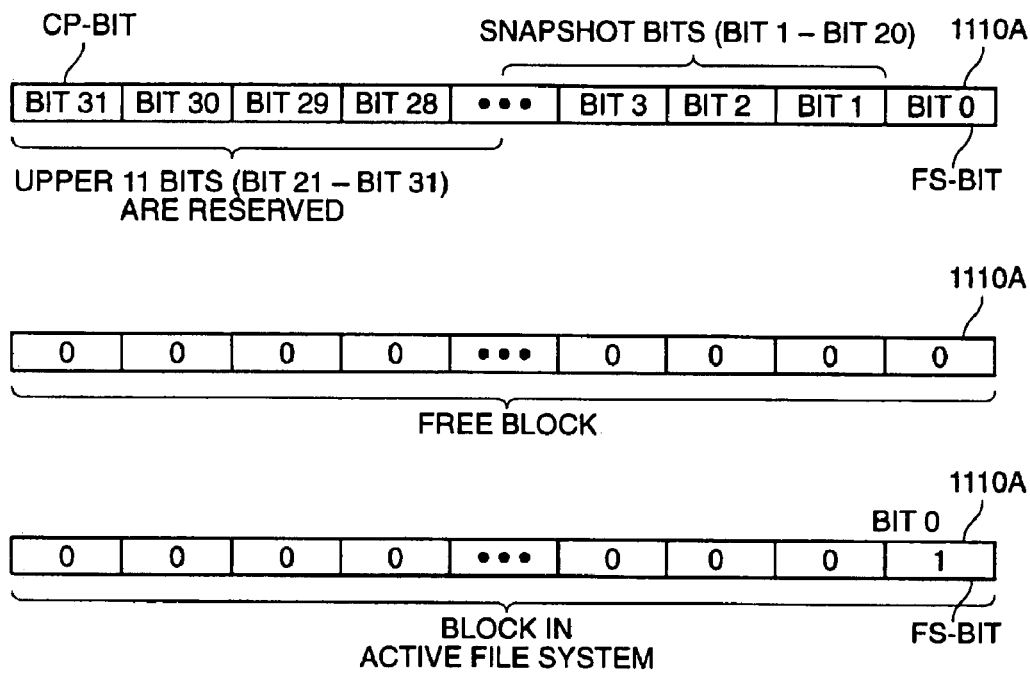

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 8, 11-15 and 20 are cancelled.

Claim 1 is determined to be patentable as amended.

New claims 21 and 22 are added and determined to be patentable.

Claims 2, 3, 5-7, 9, 10 and 16-19 were not reexamined.

1. A method for recording a plurality of data about a plurality of blocks of data stored in *non-volatile* storage means comprising the steps of:
   maintaining a means for recording multiple usage bits per block of said *non-volatile* storage means, *wherein the multiple usage bits comprise a plurality of bits that indicate membership in a plurality of read-only copies of a file system*;
   storing, in said means for recording multiple usage bits per block, multiple bits for each of said plurality of said blocks of said *non-volatile* storage means; and
   reusing at least one of said plurality of blocks of data in response to at least one of said multiple usage bits.

*21. A method for maintaining a file system comprising blocks of data stored in blocks of a non-volatile storage means at successive consistency points comprising the steps of:*
   *storing a first file system information structure for a first consistency point in said non-volatile storage means, said first file system information structure comprising data describing a layout of said file system at said first consistency point of said file system,*
   *wherein said first file system information structure comprises a first generation count,*
   *wherein said data describing a layout of said file system is read from a predetermined fixed location in said non-volatile storage means during booting of the file system;*
   *writing blocks of data of said file system that have been modified from said first consistency point as of the commencement of a second consistency point to free blocks of said non-volatile storage means, wherein at least one of said free blocks is reused;*
   *storing in said non-volatile storage means a second file system information structure for said second consistency point, said second file system information structure comprising data describing a layout of said file system at said second consistency point of said file system,*
   *wherein said second file system information structure comprises a second generation count that is different from first said generation count, and*
   *wherein said step of storing said second file system information structure completes after said step of writing blocks of data of said file system that have been modified.*

*22. A method for maintaining an active file system comprising blocks of data stored in blocks of a non-volatile storage means at successive consistency points comprising the steps of:*
   *storing a first file system information structure for a first consistency point in said non-volatile storage means, said first file system information structure comprising data describing a layout of said file system at said first consistency point of said file system,*
   *wherein said first file system information structure comprises a first timestamp and a first generation count,*
   *wherein said data describing a layout of said file system is read from a predetermined fixed location in said non-volatile storage means during booting of the file system;*
   *writing blocks of data of said file system that have been modified from said first consistency point as of the commencement of a second consistency point to free blocks of said non-volatile storage means, wherein at least one of said free blocks is reused;*
   *storing in said non-volatile storage means a second file system information structure for said second consistency point, said second file system information structure comprising data describing a layout of said file system at said second consistency point of said file system,*
   *wherein said second file system information structure comprises a second timestamp and a second generation count that is different from first said generation count, and*
   *wherein said step of storing said second file system information structure completes after said step of writing blocks of data of said file system that have been modified.*

\* \* \* \* \*